(12) United States Patent
Okita et al.

(10) Patent No.: US 9,043,621 B2
(45) Date of Patent: May 26, 2015

(54) POWER-SAVING NETWORK MANAGEMENT SERVER, NETWORK SYSTEM, AND METHOD OF DETERMINING SUPPLY OF POWER

(75) Inventors: Hideki Okita, Yokohama (JP); Masahiro Yoshizawa, Kawasaki (JP); Machiko Asaie, Koshigaya (JP); Ken Naono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1118 days.

(21) Appl. No.: 13/062,387

(22) PCT Filed: Jan. 19, 2010

(86) PCT No.: PCT/JP2010/050866
§ 371 (c)(1),
(2), (4) Date: Mar. 4, 2011

(87) PCT Pub. No.: WO2010/084978
PCT Pub. Date: Jul. 29, 2010

(65) Prior Publication Data
US 2011/0161695 A1 Jun. 30, 2011

(30) Foreign Application Priority Data
Jan. 21, 2009 (JP) .................................. 2009-011249

(51) Int. Cl.
*G06F 1/26* (2006.01)
*G06F 1/32* (2006.01)
(Continued)

(52) U.S. Cl.
CPC ............ *G06F 1/3278* (2013.01); *G06F 1/3209* (2013.01); *H04L 12/10* (2013.01);
(Continued)

(58) Field of Classification Search
CPC ... G06F 1/3287; G06F 1/3051; G06F 1/3055; G06F 11/3051; G06F 1/30551
USPC .................................. 713/300, 310, 320, 324
See application file for complete search history.

(56) References Cited

U.S. PATENT DOCUMENTS 7,313,101 B2 12/2007 Rhine et al.
7,653,738 B2 1/2010 Ikeda et al.
(Continued)

FOREIGN PATENT DOCUMENTS

JP 7-336381 A 12/1995
JP 2004-208296 A 7/2004
(Continued)

OTHER PUBLICATIONS

Y. Ikeda et al., Energy-Efficient Cluster Interconnects with Managed Switch, IEICE Technical Report CPSY2005-33~43 [Computer System], Dec. 9, 2005, vol. 105, No. 487, pp. 7-12.
(Continued)

*Primary Examiner* — Kim Huynh
*Assistant Examiner* — Brandon Kinsey
(74) *Attorney, Agent, or Firm* — Mattingly & Malur, PC

(57) ABSTRACT

A power-saving network management server, which is coupled to a network system including a network device and manages a state of power to the network device, wherein the power-saving network management server is configured to: store network configuration information and task allocation information; determine starting or stopping of the power supply to the port of the network device based on the updated network configuration information and task allocation information; store a determination result of the starting or stopping of the power supply to the port as a port determination result; and control the power supply to the port of the network device based on the port determination result.

17 Claims, 39 Drawing Sheets

(51) Int. Cl.
  *H04L 12/24* (2006.01)
  *H04L 12/10* (2006.01)
  *H04L 12/44* (2006.01)

(52) U.S. Cl.
  CPC ........... *H04L 12/44* (2013.01); *H04L 41/0806* (2013.01); *H04L 41/0833* (2013.01); *Y02B 60/32* (2013.01); *Y02B 60/126* (2013.01)

(56) References Cited

U.S. PATENT DOCUMENTS

| | | | |
|---|---|---|---|
| 2004/0120330 A1 | 6/2004 | Rhine et al. | |
| 2006/0031447 A1* | 2/2006 | Holt et al. | 709/223 |
| 2006/0031454 A1* | 2/2006 | Ewing et al. | 709/223 |
| 2006/0053324 A1* | 3/2006 | Giat et al. | 713/300 |
| 2006/0282685 A1* | 12/2006 | Bahali et al. | 713/300 |
| 2007/0214248 A1 | 9/2007 | Ikeda et al. | |
| 2007/0271475 A1 | 11/2007 | Hatasaki et al. | |
| 2007/0276548 A1* | 11/2007 | Uzunovic et al. | 700/297 |
| 2009/0265569 A1* | 10/2009 | Yonezawa et al. | 713/324 |
| 2009/0287949 A1* | 11/2009 | Bradicich et al. | 713/340 |
| 2010/0115415 A1* | 5/2010 | Hickey | 715/736 |

FOREIGN PATENT DOCUMENTS

| | | |
|---|---|---|
| JP | 2005-123715 A | 5/2005 |
| JP | 2007-243791 A | 9/2007 |
| JP | 2007-281628 A | 10/2007 |
| JP | 2007-310791 A | 11/2007 |

OTHER PUBLICATIONS

Chinese Office Action received in Chinese Application No. 201080002491.3 dated Mar. 15, 2013.

* cited by examiner

CONNECTION INFORMATION FOR SW001

| PORT ID | POWER STATE | ADJACENT DEVICE IDENTIFIER | ADJACENT DEVICE TYPE | ADJACENT DEVICE SPECIFIC INFORMATION | LINK STATE |
|---|---|---|---|---|---|
| 1 | ON | Null | Null | Null | DOWN |
| 2 | ON | Null | Null | Null | DOWN |
| ⋮ | ⋮ | ⋮ | ⋮ | ⋮ | ⋮ |
| 32 | ON | SW005 | SWITCH | P2 | UP |

*FIG. 6*

CONNECTION INFORMATION FOR SW002

| PORT ID | POWER STATE | ADJACENT DEVICE IDENTIFIER | ADJACENT DEVICE TYPE | ADJACENT DEVICE SPECIFIC INFORMATION | LINK STATE |
|---|---|---|---|---|---|
| 1 | ON | Null | Null | Null | DOWN |
| 2 | ON | Null | Null | Null | DOWN |
| ⋮ | ⋮ | ⋮ | ⋮ | ⋮ | ⋮ |
| 32 | ON | SW004 | SWITCH | P2 | UP |

*FIG. 7*

CONNECTION INFORMATION FOR SW003

| PORT ID | POWER STATE | ADJACENT DEVICE IDENTIFIER | ADJACENT DEVICE TYPE | ADJACENT DEVICE SPECIFIC INFORMATION | LINK STATE |
|---|---|---|---|---|---|
| 1 | ON | Null | Null | Null | DOWN |
| 2 | ON | Null | Null | Null | DOWN |
| ⋮ | ⋮ | ⋮ | ⋮ | ⋮ | ⋮ |
| 32 | ON | SW004 | SWITCH | P3 | UP |

*FIG. 8*

CONNECTION INFORMATION FOR SW004

| PORT ID | POWER STATE | ADJACENT DEVICE IDENTIFIER | ADJACENT DEVICE TYPE | ADJACENT DEVICE SPECIFIC INFORMATION | LINK STATE |
|---|---|---|---|---|---|
| 1 | ON | Null | Null | Null | DOWN |
| 2 | ON | SW002 | SWITCH | P32 | UP |
| 3 | ON | SW003 | SWITCH | P32 | UP |
| ⋮ | ⋮ | ⋮ | ⋮ | ⋮ | ⋮ |
| 24 | ON | SW000 | SWITCH | P2 | UP |

*FIG. 9*

CONNECTION INFORMATION FOR SW005

| PORT ID | POWER STATE | ADJACENT DEVICE IDENTIFIER | ADJACENT DEVICE TYPE | ADJACENT DEVICE SPECIFIC INFORMATION | LINK STATE |
|---|---|---|---|---|---|
| 1 | ON | Null | Null | Null | DOWN |
| 2 | ON | SW001 | SWITCH | P32 | UP |
| ⋮ | ⋮ | ⋮ | ⋮ | ⋮ | ⋮ |
| 24 | ON | SW000 | SWITCH | P1 | UP |

*FIG. 10*

CONNECTION INFORMATION FOR SW000

| PORT ID | POWER STATE | ADJACENT DEVICE IDENTIFIER | ADJACENT DEVICE TYPE | ADJACENT DEVICE SPECIFIC INFORMATION | LINK STATE |
|---|---|---|---|---|---|
| 1 | ON | SW005 | SWITCH | P24 | UP |
| 2 | ON | SW004 | SWITCH | P24 | UP |
| ⋮ | ⋮ | ⋮ | ⋮ | ⋮ | ⋮ |
| 24 | ON | Null | Null | Null | DOWN |

*FIG. 11*

CONNECTION INFORMATION FOR SW000

| PORT ID (1081) | POWER STATE (1082) | ADJACENT DEVICE IDENTIFIER (1083) | ADJACENT DEVICE TYPE (1084) | ADJACENT DEVICE SPECIFIC INFORMATION (1085) | LINK STATE (1086) |
|---|---|---|---|---|---|
| 1 | ON | SW005 | SWITCH | P24 | UP |
| 2 | ON | SW004 | SWITCH | P24 | UP |
| ⋮ | ⋮ | ⋮ | ⋮ | ⋮ | ⋮ |
| 24 | ON | WAN1 | NETWORK | IP-VPN | UP |

SERVER NFORMATION

| SERVER ID | SERVER TYPE | SWITCH ID | PORT ID |
|---|---|---|---|
| SVR001 | VIRTUAL | SW001 | 1 |
| SVR002 | VIRTUAL | SW001 | 2 |
| SVR003 | PHYSICAL | SW001 | 3 |
| SVR004 | PHYSICAL | SW001 | 4 |
| SVR005 | VIRTUAL | SW001 | 5 |
| SVR006 | VIRTUAL | SW001 | 6 |
| SVR007 | PHYSICAL | SW001 | 7 |
| SVR008 | PHYSICAL | SW001 | 8 |

*FIG. 15*

SERVER RESOURCE INFORMATION

| LOGICAL SERVER ID | SERVER ID | VIRTUAL MACHINE ID |
|---|---|---|
| LGC001 | SVR001 | VTL001 |
| LGC002 | SVR001 | VTL002 |
| LGC003 | SVR002 | VTL001 |
| LGC004 | SVR002 | VTL002 |
| LGC005 | SVR003 | Null |
| LGC006 | SVR004 | Null |
| LGC007 | SVR005 | VTL001 |
| LGC008 | SVR005 | VTL002 |
| LGC009 | SVR006 | VTL001 |
| LGC0010 | SVR006 | VTL002 |
| LGC0011 | SVR007 | Null |
| LGC0012 | SVR008 | Null |

*FIG. 18*

TASK INFORMATION

| LOGICAL SERVER ID (1071) | TASK TYPE (1072) | TASK ID (1073) | USER ID (1074) |
|---|---|---|---|
| LGC001 | Web | TASK1 | USR001 |
| LGC001 | Web | TASK2 | USR001 |
| LGC002 | Web | TASK3 | USR001 |
| LGC003 | Web | TASK4 | USR001 |
| LGC004 | DB | TASK5 | USR001 |
| ⋮ | ⋮ | ⋮ | ⋮ |

*FIG. 20*

POWER INFORMATION

| SWITCH ID | FORWARDER POWER | PORT POWER |
|---|---|---|
| SW001 | 80W | 1W |
| SW002 | 80W | 1W |
| SW003 | 80W | 1W |
| SW004 | 80W | 1W |
| ⋮ | ⋮ | ⋮ |

| PORT ID | PORT SELECTION STATE | ON/UNUSED SELECTION RESULT |
|---|---|---|
| 1 | SHUTDOWN NOT ALLOWED | IN-USE |
| 2 | SHUTDOWN NOT ALLOWED | IN-USE |
| 3 | SHUTDOWN NOT ALLOWED | IN-USE |
| 4 | SHUTDOWN NOT ALLOWED | IN-USE |
| 5 | SHUTDOWN ALLOWED | ON/UNUSED |
| 6 | SHUTDOWN ALLOWED | ON/UNUSED |
| 7 | SHUTDOWN ALLOWED | ON/UNUSED |
| 8 | SHUTDOWN ALLOWED | ON/UNUSED |
| 9 | SHUTDOWN ALLOWED | SHUTDOWN |
| 10 | SHUTDOWN ALLOWED | SHUTDOWN |
| 11 | SHUTDOWN ALLOWED | SHUTDOWN |
| 12 | SHUTDOWN ALLOWED | SHUTDOWN |
| ⋮ | ⋮ | ⋮ |
| 32 | SWITCH-CONNECTED | IN-USE |

*FIG. 25*

| SWITCH ID | POWER STATE | FORWARDER SELECTION STATE | ON/UNUSED SELECTION RESULT |
|---|---|---|---|
| SW000 | ON | SHUTDOWN NOT ALLOWED | IN-USE |
| SW001 | ON | SHUTDOWN ALLOWED | IN-USE |
| SW002 | ON | SHUTDOWN ALLOWED | ON/UNUSED |
| SW003 | ON | SHUTDOWN ALLOWED | ON/UNUSED |
| SW004 | ON | SHUTDOWN NOT ALLOWED | IN-USE |
| SW005 | ON | SHUTDOWN NOT ALLOWED | IN-USE |
| ⋮ | ⋮ | ⋮ | ⋮ |

*FIG. 26*

```
<?xml version="1.0" encoding="UTF-8"?>

<ns:serverChangeNotification
    xmlns:ns="http://www.crl.hitachi.co.jp/"
    id="200809022031"
    eventType="move"
    sender="MNG002">

<ns:srcServer>
        <ns:logicalServer id="LGC004">
            <ns:phisicalServer id="SVR003"/>
            <ns:virtualMachine id="VTL007"/>
        </ns:logicalServer>
    </ns:srcServer>
    <ns:dstServer>
        <ns:logicalServer id="LGC004">
            <ns:phisicalServer id="SVR001"/>
            <ns:virtualMachine id="VTL002"/>
        </ns:logicalServer>
    </ns:dstServer>
</ns:serverChangeNotification>
```
⎫
⎬ M3506
⎭

FIG. 36

```
<?xml version="1.0" encoding="UTF-8"?>

<ns:serverChangeNotification
    xmlns:ns="http://www.crl.hitachi.co.jp/"
    id="200809022038"
    eventType="allocation"
    sender="MNG002">

<ns:logicalServer id="LGC013">
        <ns:virtualMachine id="VTL003"/>
        <ns:phisicalServer id="SVR001"/>
    </ns:logicalServer>
</ns:serverChangeNotification>
```

— M3804

FIG. 39

POWER-SAVING NETWORK MANAGEMENT SERVER, NETWORK SYSTEM, AND METHOD OF DETERMINING SUPPLY OF POWER

BACKGROUND OF THE INVENTION

This invention relates to an operation management system which aims to reduce power consumption of an information communication system.

BACKGROUND OF THE INVENTION

With an increasingly vocal demand for reduction in operating costs of corporate IT systems, use of a data center that accommodates the corporate IT systems is increasing. A system of the data center is formed of a plurality of servers and network devices, and is therefore large in power consumption. In the data center, there occurs addition or deletion of a server due to the start or termination of use of a service by a customer as well as an expansion of a scale of the data center and a change in network configuration due to an increase in the number of users. It is demanded that the data center handle the above-mentioned change in configuration and suppress the power consumption.

With regard to servers among the components of a data center system, there is a method involving consolidating task execution processes onto a small number of servers in agreement with the lowering of task load and shutting down power to a server on which no process is running (see, for example, JP 2007-310791 A). JP 2007-310791 A discloses a method for satisfying the demanded performance and reducing power consumption of a server system by migrating a task process on the server onto a plurality of servers or consolidating task processes onto a single server in agreement with an increase/decrease of the task load and by shutting down power supply to the server on which no task process is running.

Further, with regard to a network among the components of the data center system, there is a conventional technology for lowering an operating frequency of a forwarder of a switch when a volume of traffic decreases (see, for example, JP 07-336381 A). JP 07-336381 A discloses a switch configuring method for lowering power consumption by suppressing the operation of the forwarder that relays frames between ports when there is no frame reaching the port of the switch. Further, there is a network system configuring method involving shifting to a power-saving operation mode in agreement with the volume of traffic while decreasing a shutdown time period of a frame transfer (see, for example, JP 2005-123715 A).

SUMMARY OF THE INVENTION

However, with the method disclosed in JP 07-336381 A, in a case where a server and a switch are linked up, traffic flows on a link even if the server is not performing a task, and hence it is unknown whether or not a task is allocated to the server connected to the switch. Therefore, according to the method disclosed in JP 07-336381 A, it is necessary to maintain the switch in a standby state in order to detect fluctuations in traffic.

In the conventional method, as described above, power is also supplied to the server to which no task is allocated, which cannot produce a sufficient power-saving effect. There is another problem of becoming less resistant to the fluctuations in traffic if the power consumption in the standby state is reduced in order to enhance the power-saving effect.

Further, in a case where virtual machines that execute the tasks are consolidated among a plurality of servers, a layout of the virtual machines that execute the tasks is unknown, and hence it cannot be determined whether or not shutdown of the power supply to the port connected to the server is allowed only based on the presence/absence of a link up. Therefore, the port being energized even though the server is not being used (hereinafter, referred to as "energized/unused port") cannot be shut down, which cannot produce a sufficient power-saving effect.

An object of this invention is to solve the above-mentioned problems inherent in the conventional technologies. In other words, the object is to provide a power-saving network management server that controls power supply to a port and a forwarder of a switch so as to achieve power savings without exerting an influence on a server that executes tasks within a data center system.

A representative example of this invention is as follows. A power-saving network management server, which is coupled to a network system including a plurality of network devices, manages a state of power to the plurality of network devices, with the network system being coupled to a server. The power-saving network management server is configured to: store network configuration information for managing a coupling state of the plurality of network devices and the server, and task allocation information for managing allocation of a task to the server; determine whether a shutdown of the power supply to the port of each of the plurality of network devices based on the network configuration information and the task allocation information; generate displaying information for displaying a determination result as to the shutdown propriety of the power supply to the port of a plurality of network devices based on a port determination results which are a result of the shutdown propriety of the power supply to the port of each of the plurality of network devices; and output the displaying information.

According to this invention, the power-saving network management server can extract the port connected to the server that is not being used for a task from among all the ports provided to the network device, calculate dump power within the network system, and shut down the power supply to the extracted port. Accordingly, it is possible to suppress power consumption of the network system.

Further, based on a result of the above-mentioned extraction, it is possible to extract the network device that is not being used for the connecting to the server executing a task from among the network devices within the network system, calculate the dump power within the network system, and shut down the power supply to the forwarder of the extracted network device. Accordingly, it is possible to further suppress the power consumption of the network system.

BRIEF DESCRIPTION OF THE DRAWINGS

The present invention can be appreciated by the description which follows in conjunction with the following figures, wherein:

FIG. 6 is a diagram illustrating a connection information on a switch SW001 which has been subjected to the processing of Step S0505 according to the first embodiment of this invention;

FIG. 7 is a diagram illustrating the connection information on a switch SW002 which has been subjected to the processing of Step S0505 according to the first embodiment of this invention;

FIG. 8 is a diagram illustrating the connection information on a switch SW003 which has been subjected to the processing of Step S0505 according to the first embodiment of this invention;

FIG. 9 is a diagram illustrating the connection information on a switch SW004 which has been subjected to the processing of Step S0505 according to the first embodiment of this invention;

FIG. 10 is a diagram illustrating the connection information on a switch SW005 which has been subjected to the processing of Step S0505 according to the first embodiment of this invention;

FIG. 11 is a diagram illustrating the connection information on a switch SW000 which has been subjected to the processing of Step S0505 according to the first embodiment of this invention;

FIG. 13 is a diagram illustrating the connection information on the switch SW000 according to the first embodiment of this invention;

FIG. 15 is a diagram illustrating an example of server information according to the first embodiment of this invention;

FIG. 18 is a diagram illustrating an example of server resource information according to the first embodiment of this invention;

FIG. 20 is a diagram illustrating an example of task information according to the first embodiment of this invention;

FIG. 21 is a diagram illustrating an example of power information according to the first embodiment of this invention;

FIG. 25 is a diagram illustrating an example of a shutdown port selection result according to the first embodiment of this invention;

FIG. 26 is a diagram illustrating an example of the shutdown forwarder selection result according to the first embodiment of this invention;

FIG. 36 is a diagram illustrating contents of server migration according to the second embodiment of this invention;

FIG. 39 is a diagram illustrating a contents of server activation according to the third embodiment of this invention.

DETAILED DESCRIPTION OF THE PREFERRED EMBODIMENTS

First Embodiment

First, a first embodiment of this invention is described. In the first embodiment of this invention, based on an allocated state of a task process on a server provided to a network of a data center to be managed, a power-saving network management server creates a configuration of optimal power supply to a port and a forwarder of a switch included in the network in order to achieve power savings.

Figure 1:
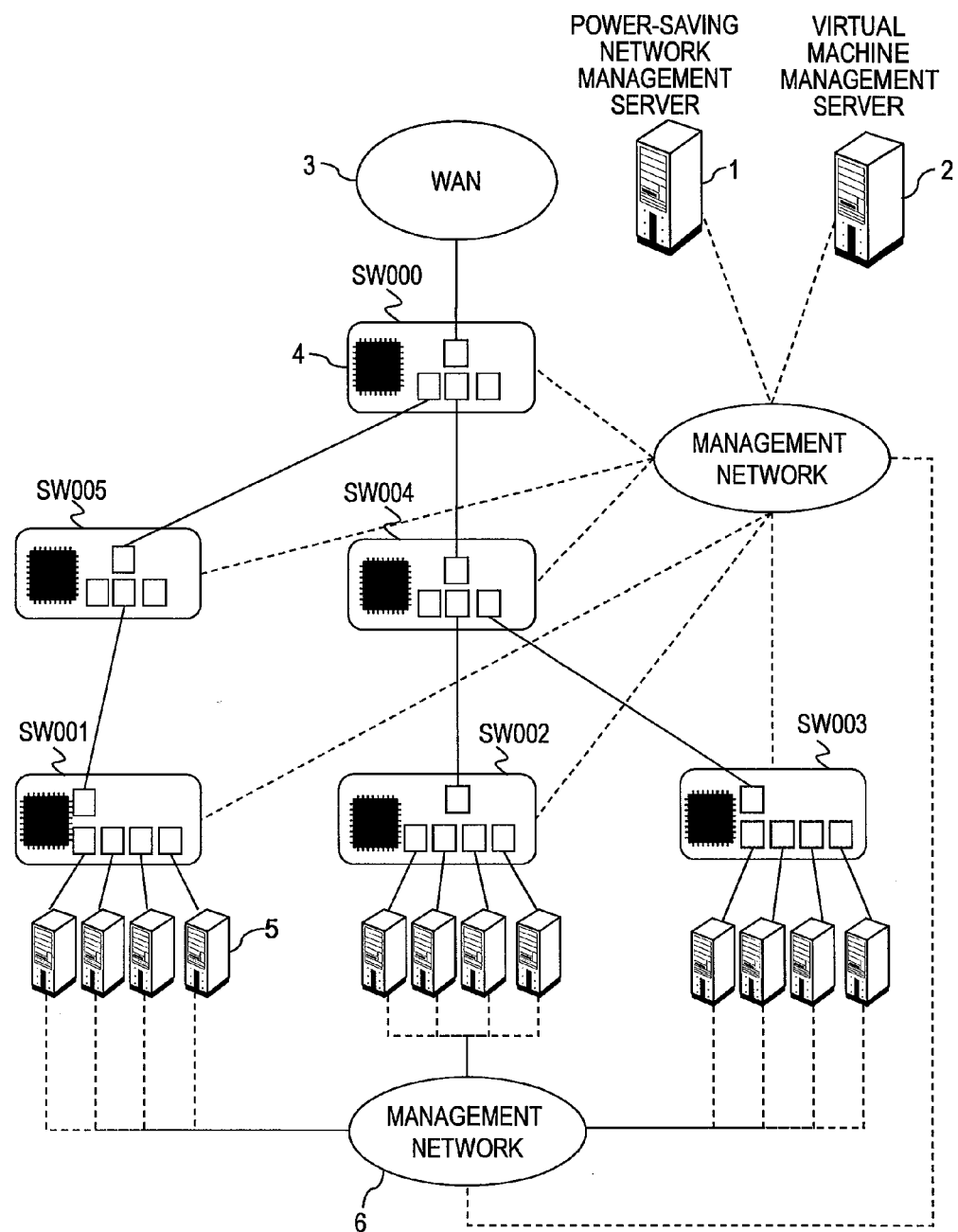
FIG. 1 is a diagram illustrating an example of a configuration of a network system within a data center system according to a first embodiment of this invention.

FIG. 1 is a diagram illustrating an example of a configuration of a network system within a data center system according to the first embodiment of this invention.

The network system includes a power-saving network management server 1, a virtual machine management server 2, a wide area network (WAN) 3, a plurality of switches 4, a plurality of servers 5, and a management network 6.

The virtual machine management server 2 controls and manages virtual machines. The WAN 3 is a network for connecting the network system to an external portion. The management network 6 is a network for controlling the switches 4 and the servers 5, and is connected to the power-saving network management server 1, the virtual machine management server 2, the switches 4, and the servers 5.

The switches 4 are each connected to the WAN 3, the switch 4, or the server 5, thereby forming a network. Each of the servers 5 is connected to the switch 4, and can execute various tasks.

Here, the servers 5 include a physical server and the virtual machine. The physical server is obtained by building one server in one physical casing. The virtual machine is a virtual server created by the virtual machine management server 2. Specifically, the virtual machine management server 2 constructs a virtual environment on one physical casing, and creates one or more virtual machines on the physical casing on which the virtual environment has been constructed. For example, a hypervisor or a host OS that is stored in a memory or the like of the physical casing provides a virtual environment, and one or more virtual machines are created on the physical casing. Hereinafter, the physical casing on which the virtual environment has been constructed is referred to as "virtualized server".

The physical server or the virtual machine is provided to a user as a logical server. The user executes various tasks by using the logical server.

Figure 2:
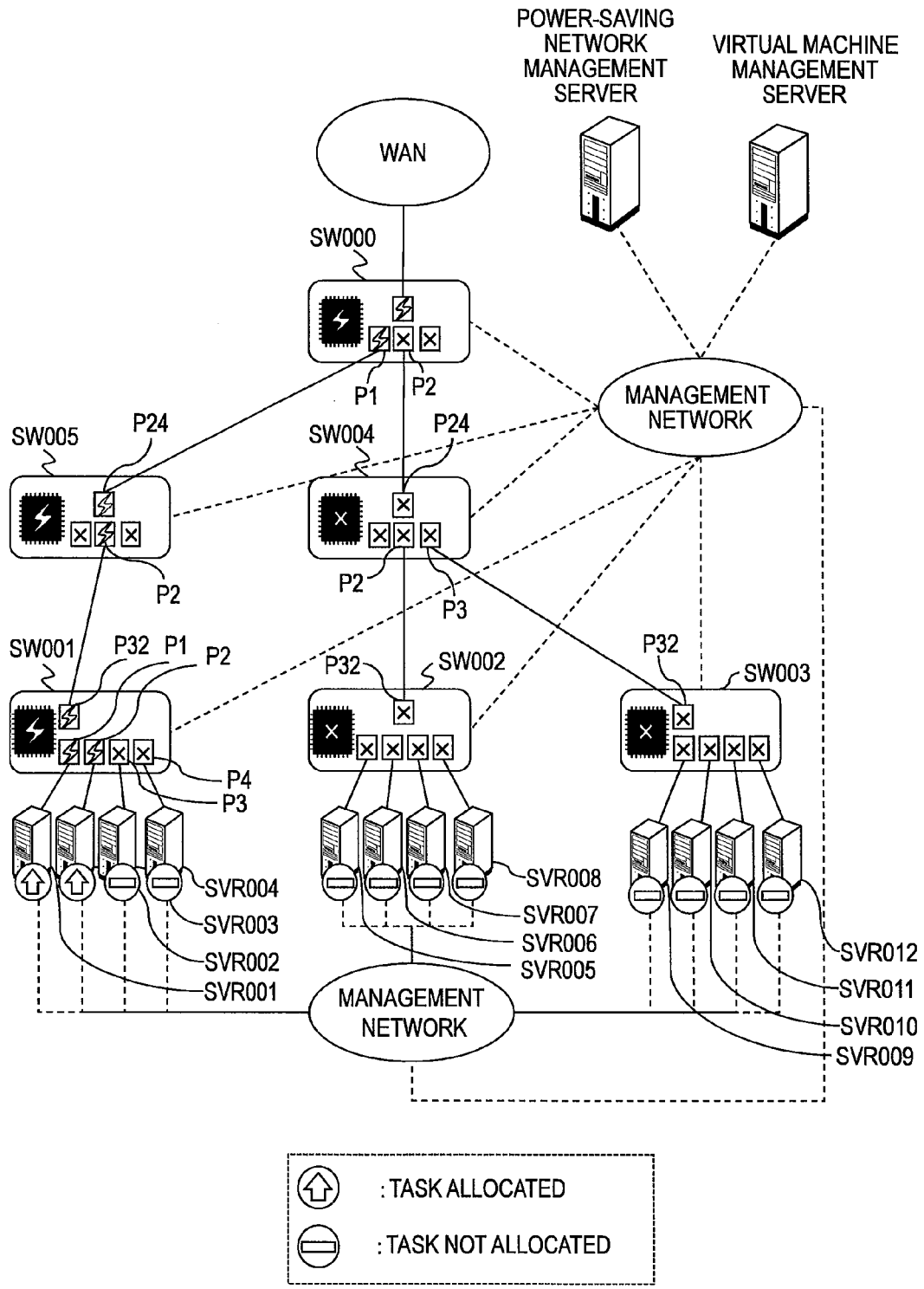
FIG. 2 is a diagram illustrating an example of a result of shutdown determination executed by a power-saving network management server according to the first embodiment of this invention.

FIG. 2 is a diagram illustrating an example of a result of shutdown determination executed by the power-saving network management server 1 according to the first embodiment of this invention.

In the example illustrated in FIG. 2, servers SVR001 and SVR002 have a customer's task being allocated thereto, and hence the task is being executed thereon in actuality. Servers SVR003 to SVR012 have no customer's task being allocated thereto, and hence no task is being executed thereon in actuality.

In this case, when the power-saving network management server 1 executes the shutdown determination, it is determined that the shutdown of the power supply to the port is not allowed with regard to a port P1 of a switch SW001 connected to the server SVR001 to which a task is allocated, a port P2 of the switch SW001 connected to the server SVR002 to which a task is allocated, and a port P32 connected to a switch SW005.

Meanwhile, it is determined that the shutdown of the power supply to the port is allowed with regard to a port P3 for the server SVR003 to which no task is allocated and a port P4 for the server SVR004 to which no task is allocated.

Here, the wording "the shutdown of the power supply to the port is allowed" means that it is allowed to shut down the power supply to the port. Hereinafter, the shutdown of the power supply to the port is referred to as "shutdown of the port".

Further, no task is allocated to the servers SVR005 to SVR0012 connected to switches SW002 and SW003, and hence it is determined that the shutdown of the port is allowed with regard to the ports connected to the respective servers SVR005 to SVR0012 as well. In addition, it is determined that the shutdown of the power supply to the forwarder is allowed with regard to the forwarders of the switches SW002 and SW003.

Here, the wording "the shutdown of the power supply to the forwarder is allowed" means that it is allowed to realize a state in which only minimum power necessary for the forwarder to operate is supplied. Hereinafter, the shutdown of the power supply to the forwarder is referred to as "shutdown of the forwarder".

With regard to a switch SW004, it is determined that the forwarders of the switches SW002 and SW003 connected to the switch SW004 are allowed to be shut down, and hence it is determined that ports connected to the respective switches 4 are allowed to be shut down. Further, it is determined that the shutdown of the forwarder of the switch SW004 is allowed.

The switch SW005 is connected to the switch SW001 being energized, and hence it is determined that the shutdown of the port connected to the switch SW001 is not allowed.

A switch SW000 is a switch 4 located on a path connecting the switch SW005 being energized and the WAN 3, and hence the port connected to the switch SW005 and the port connected to the WAN 3 are energized.

Among the ports of the switch SW000, it is determined that the shutdown is allowed with regard to a port P2 connected to the switch SW004 for which it is determined that the shutdown of the forwarder is allowed.

It should be noted that details of the shutdown determination are described later with reference to FIGS. 22, 23A, and 23B.

Figure 3:
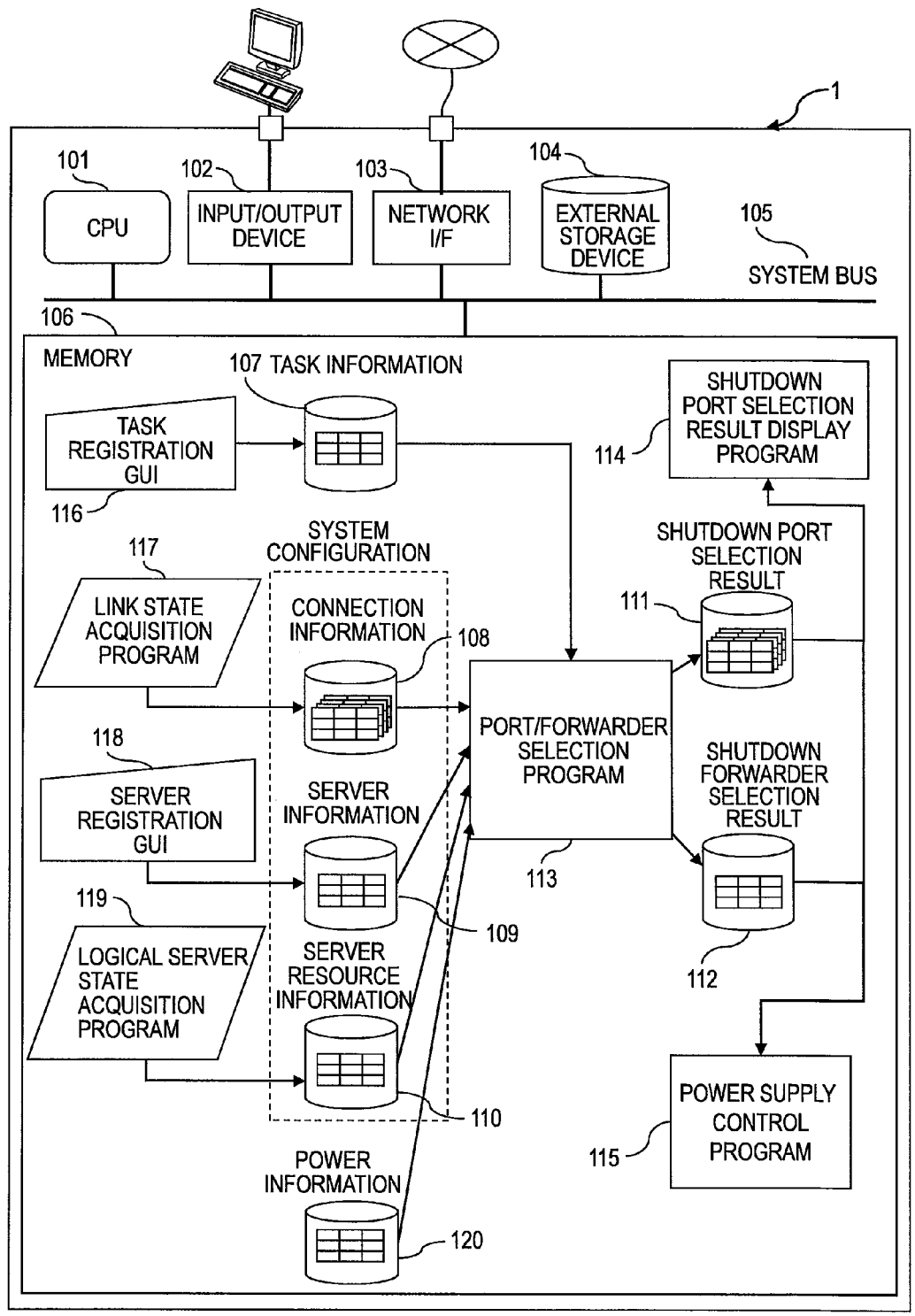
FIG. 3 is a block diagram illustrating an example of a configuration of the power-saving network management server according to the first embodiment of this invention.

FIG. 3 is a block diagram illustrating an example of a configuration of the power-saving network management server 1 according to the first embodiment of this invention.

The power-saving network management server 1 includes a CPU 101, an input/output device 102, a network interface 103, an external storage device 104, and a memory 106. The CPU 101, the input/output device 102, the network interface 103, the external storage device 104, and the memory 106 are connected to one another via a system bus 105.

A program stored in the external storage device 104 is expanded in the memory 106, and the CPU 101 executes the program expanded in the memory 106.

Specifically, expanded on the memory 106 are a port/forwarder selection program 113, a shutdown port selection result display program 114, a power supply control program 115, a task registration GUI 116, a link state acquisition program 117, a server registration GUI 118, and a logical server state acquisition program 119.

The port/forwarder selection program 113 is a program for executing the shutdown determination. The shutdown port selection result display program 114 is a program for displaying a result of the shutdown selection. The power supply control program 115 is a program for controlling and managing the power supply to the switches 4 and the servers 5.

The task registration GUI 116 is a program for performing a connecting setting on the network and an allocation setting on a task with respect to the server 5. The link state acquisition program 117 is a program for acquiring adjacent device information (see FIG. 5) from the switch 4. The server registration GUI 118 is a program for setting the connecting between the servers 5 and the switches 4. The logical server state acquisition program 119 is a program for setting a logical server to be allocated to the customer.

Further, as configuration on the system, the memory 106 stores task information 107, connection information 108, server information 109, and server resource information 110. Further, the memory 106 stores power information 120, a shutdown port selection result 111, and a shutdown forwarder selection result 112.

The task information 107 stores the information set by executing the task registration GUI 116. The connection information 108 stores the information set by executing the link state acquisition program 117.

The server information 109 stores the information set by executing the server registration GUI 118. The server resource information 110 stores the information set by executing the logical server state acquisition program 119.

The power information 120 stores information related to the power consumption of the switches 4.

The shutdown port selection result 111 stores the shutdown selection regarding the power supply to the ports of the respective switches 4 among the results of the shutdown determination executed by the port/forwarder selection program 113. Details of the shutdown port selection result 111 are described later with reference to FIG. 25.

The shutdown forwarder selection result 112 stores the result of the shutdown selection regarding forwarders 409 (see FIG. 4) of all the switches 4 within the network among the results of the shutdown determination executed by the port/forwarder selection program 113. Details of the shutdown forwarder selection result 112 are described later with reference to FIG. 24.

The input/output device 102 is a device for inputting information from the external portion. The network interface 103 is an interface for connecting to the management network. The external storage device 104 stores various kinds of programs and information for implementing functions of the power-saving network management server 1.

Figure 4:
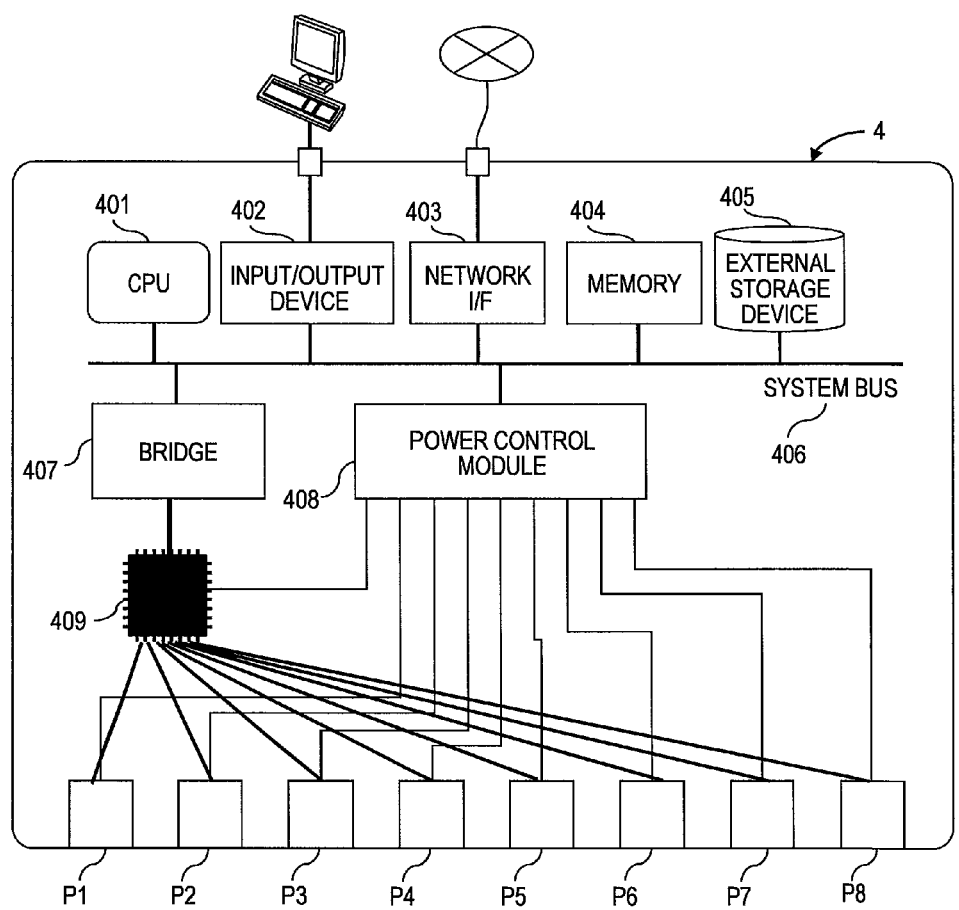
FIG. 4 is a block diagram illustrating an example of a configuration of a switch according to the first embodiment of this invention.

FIG. 4 is a block diagram illustrating an example of a configuration of the switch 4 according to the first embodiment of this invention.

The switch 4 includes a CPU 401, an input/output device 402, a network interface 403, a memory 404, an external storage device 405, a bridge 407, a power control module 408, a plurality of ports P1 to P8, and the forwarder 409.

The CPU 401, the input/output device 402, the network interface 403, the memory 404, the external storage device 405, the bridge 407, and the power control module 408 are connected to one another via a system bus 406. The forwarder 409 is connected to the bridge 407 and the power control module 408, and the respective ports P1 to P8 are connected to the power control module 408 and the forwarder 409.

A program stored in the external storage device 405 is expanded in the memory 404, and the CPU 401 executes the expanded program. The input/output device 402 is a device for inputting information from the external portion.

The network interface 403 is an interface for connecting to the management network. The external storage device 405 stores various kinds of programs and information for implementing the switch 4. The bridge 407 is a device for connecting the forwarder 409 and the respective components (for example, CPU 401).

The power control module 408 controls energization of the forwarder 409 and the ports P1 to P8. The power control module 408 can control the energization of the forwarder 409 and the ports P1 to P8 according to an instruction received from the power-saving network management server 1.

The forwarder 409 is a device that transfers a frame received from the network interface 403 or the ports P1 to P8 according to destination information included in the frame.

The ports P1 to P8 are each a network interface for connecting to another device (for example, WAN 3, switch 4, or server 5).

Figure 5:
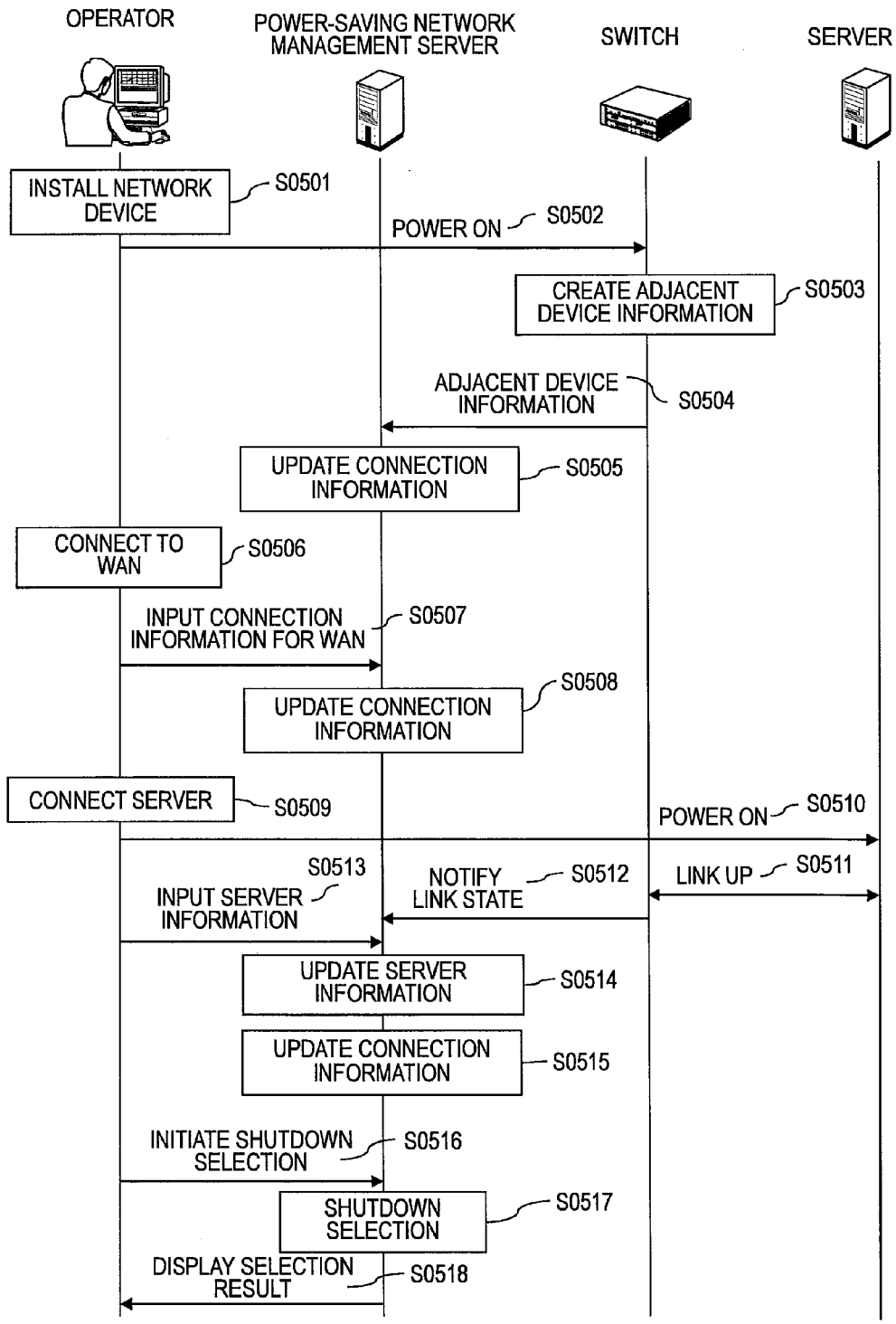
FIG. 5 is a sequence diagram illustrating a flow of a shutdown selection process executed by the power-saving network management server according to the first embodiment of this invention.

FIG. 5 is a sequence diagram illustrating a flow of a shutdown determination process executed by the power-saving network management server 1 according to the first embodiment of this invention.

An operator of the data center system first installs the switch 4 (S0501), powers on the installed switch 4 (S0502), and connects the switch 4 to the management network 6 to which the power-saving network management server 1 is connected.

The powered-on switch 4 exchanges respective identifiers with an adjacent device (for example, switch 4) connected to the switch 4 to create a list of the identifiers of adjacent devices connected to itself and the ports connected to the adjacent devices, and manages the created list as the adjacent device information (S0503).

The switch 4 transmits the adjacent device information to the power-saving network management server 1 (S0504).

The power-saving network management server 1 that has received the adjacent device information updates the connection information 108 based on the received adjacent device information (S0505).

Subsequently, the operator connects a wide area network (WAN 3) line for connecting the network to the external portion to the switch 4 within the network (S0506), and registers connecting information on the WAN line with the connection information 108 via the server registration GUI 118 (S507).

The power-saving network management server 1 updates the connection information based on the registered contents (S0508).

Subsequently, the operator connects the server 5 to the switch 4 within the network (S0509), and powers on the connected server 5 (S0510).

As a result, a link between the switch 4 and the server 5 comes to a link up state (S0511).

The switch 4 notifies the power-saving network management server 1 of link state information indicating a link state of the switch 4 (S0512).

The operator inputs information on the server 5 connected to the switch 4 via the server registration GUI 118 (S0513).

Specifically, the operator selects any one of the physical server and the virtualized server as the server 5 connected to the switch 4.

In a case where the virtualized server is selected, the operator inputs information for creating a virtual machine on the virtualized server.

The information for creating a virtual machine on the virtualized server is transmitted to the virtual machine management server 2. Based on the received information, the virtual machine management server 2 creates a virtual machine on the virtualized server, and manages the created virtual machine. It should be noted that the virtual machine management server 2 retains information indicating a correlation between identifiers of virtualized servers and identifiers of virtual machines, and the power-saving network management server 1 can acquire, from the virtual machine management server 2, the information indicating the correlation between the identifiers of the virtualized servers and the identifiers of the virtual machines.

In addition, the operator inputs information necessary for task allocation in order to set the logical server that performs a task. The description given above is the processing performed in Step S0513.

The power-saving network management server 1 updates the server information 109 and the connection information 108 based on the acquired link state information and the input connecting information between the switch 4 and the server 5 (S0514 and S0515).

In Steps S0501 to S0515, the forwarder 409 and all the ports of the installed switch 4 are being energized.

When the processing for connecting the switch 4 and the server 5 and updating the configuration on the network system is ended, the operator transmits an initiation of the shutdown selection process of the power supply to the switch 4 within the network system to power-saving network management server 1 (S0516).

The power-saving network management server 1 that has received the initiation from the operator executes the shutdown selection (S0517). Specifically, the power-saving network management server 1 determines whether or not the shutdown of the ports and the forwarder 409 of the switch 4 is allowed based on the connection information 108, the server information 109, and the server resource information 110.

The selection results are respectively stored in the shutdown port selection result 111 and the shutdown forwarder selection result 112.

The power-saving network management server 1 generates data for displaying the selection results from the shutdown port selection result 111 and the shutdown forwarder selection result 112.

The power-saving network management server 1 displays the generated data for displaying the selection results to the operator as the determination results (S0518).

It should be noted that, in this embodiment, the shutdown determination is executed according to the instruction from the operator, but the power-saving network management server 1 may periodically execute the shutdown determination.

Alternatively, in Step S0513, the power-saving network management server 1 may receive the information on the server 5 connected to the switch 4, which has been input by the operator, via the virtual machine management server 2.

FIG. 6 is a diagram illustrating the connection information 108 on the switch SW001 which has been subjected to the processing of Step S0505 according to the first embodiment of this invention. FIG. 7 is a diagram illustrating the connection information 108 on the switch SW002 which has been subjected to the processing of Step S0505 according to the first embodiment of this invention. FIG. 8 is a diagram illustrating the connection information 108 on the switch SW003 which has been subjected to the processing of Step S0505 according to the first embodiment of this invention. FIG. 9 is a diagram illustrating the connection information 108 on the switch SW004 which has been subjected to the processing of Step S0505 according to the first embodiment of this invention. FIG. 10 is a diagram illustrating the connection information 108 on the switch SW005 which has been subjected to the processing of Step S0505 according to the first embodiment of this invention. FIG. 11 is a diagram illustrating the connection information 108 on the switch SW000 which has been subjected to the processing of Step S0505 according to the first embodiment of this invention.

The power-saving network management server 1 manages the connection information 108 for each of the switches 4.

The connection information 108 includes a port ID 1081, a power state 1082, an adjacent device identifier 1083, an adjacent device type 1084, adjacent device specific information 1085, and a link state 1086.

The port ID 1081 stores an identifier for uniquely identifying the port provided to the switch 4 included within the data center system. The power state 1082 stores a state of the power supply to the port corresponding to the port ID 1081. For example, "on" is stored when power is being supplied to the port, and "shut down" is stored when the power is not being supplied to the port.

The adjacent device identifier 1083 stores an identifier for uniquely identifying an adjacent device connected to the port corresponding to the port ID 1081 within the data center system. It should be noted that, in this embodiment, the WAN is also treated as the adjacent device. The adjacent device type 1084 stores a device type of the adjacent device connected to the port corresponding to the port ID 1081. For example, "switch" is stored when the switch 4 is connected, and "server" is stored when the server 5 is connected.

The adjacent device specific information 1085 stores information specific to the adjacent device connected to the port corresponding to the port ID 1081. For example, when the adjacent device is the switch 4, the port ID 1081 of the switch 4 being the corresponding device is stored.

The link state 1086 stores a link state with respect to the adjacent device connected to the port corresponding to the port ID 1081. For example, when the identifier of the switch 4 is stored in the adjacent device identifier 1083, the link state 1086 stores "UP" indicating the state of a link up. Further, when the adjacent device identifier 1083 is "Null", the link state 1086 stores "DOWN" indicating the state of a link down.

It should be noted that, when the server 5 is connected to the port and is in an operational state, in other words, when the power to the server 5 is in an on state, the link state 1086 stores "UP". Further, when the server 5 is connected to the port and is not in an operational state, in other words, when the power to the server 5 is in an off state, the link state 1086 stores "DOWN".

It is clear from connection information 108-1 illustrated in FIG. 6 that the port of the switch SW001 whose port ID 1081 is "32" is connected to the port P2 of the switch SW005.

It is clear from connection information 108-2 illustrated in FIG. 7 that the port of the switch SW002 whose port ID 1081 is "32" is connected to the port P2 of the switch SW004.

It is clear from connection information 108-3 illustrated in FIG. 8 that the port of the switch SW003 whose port ID 1081 is "32" is connected to the port P2 of the switch SW004.

It is clear from connection information 108-4 illustrated in FIG. 9 that the port of the switch SW004 whose port ID 1081 is "2" is connected to the port P32 of the switch SW002. In addition, it is clear that the port of the switch SW004 whose port ID 1081 is "3" is connected to the port P32 of the switch SW003. In addition, it is clear that the port of the switch SW004 whose port ID 1081 is "24" is connected to the port P2 of the switch SW000.

It is clear from connection information 108-5 illustrated in FIG. 10 that the port of the switch SW005 whose port ID 1081 is "2" is connected to the port P32 of the switch SW001. In addition, it is clear that the port of the switch SW005 whose port ID 1081 is "24" is connected to the port P1 of the switch SW000.

It is clear from connection information 108-0 illustrated in FIG. 11 that the port of the switch SW000 whose port ID 1081 is "1" is connected to the port P24 of the switch SW005. In addition, it is clear that the port of the switch SW000 whose port ID 1081 is "2" is connected to the port P24 of the switch SW004.

Figure 12:
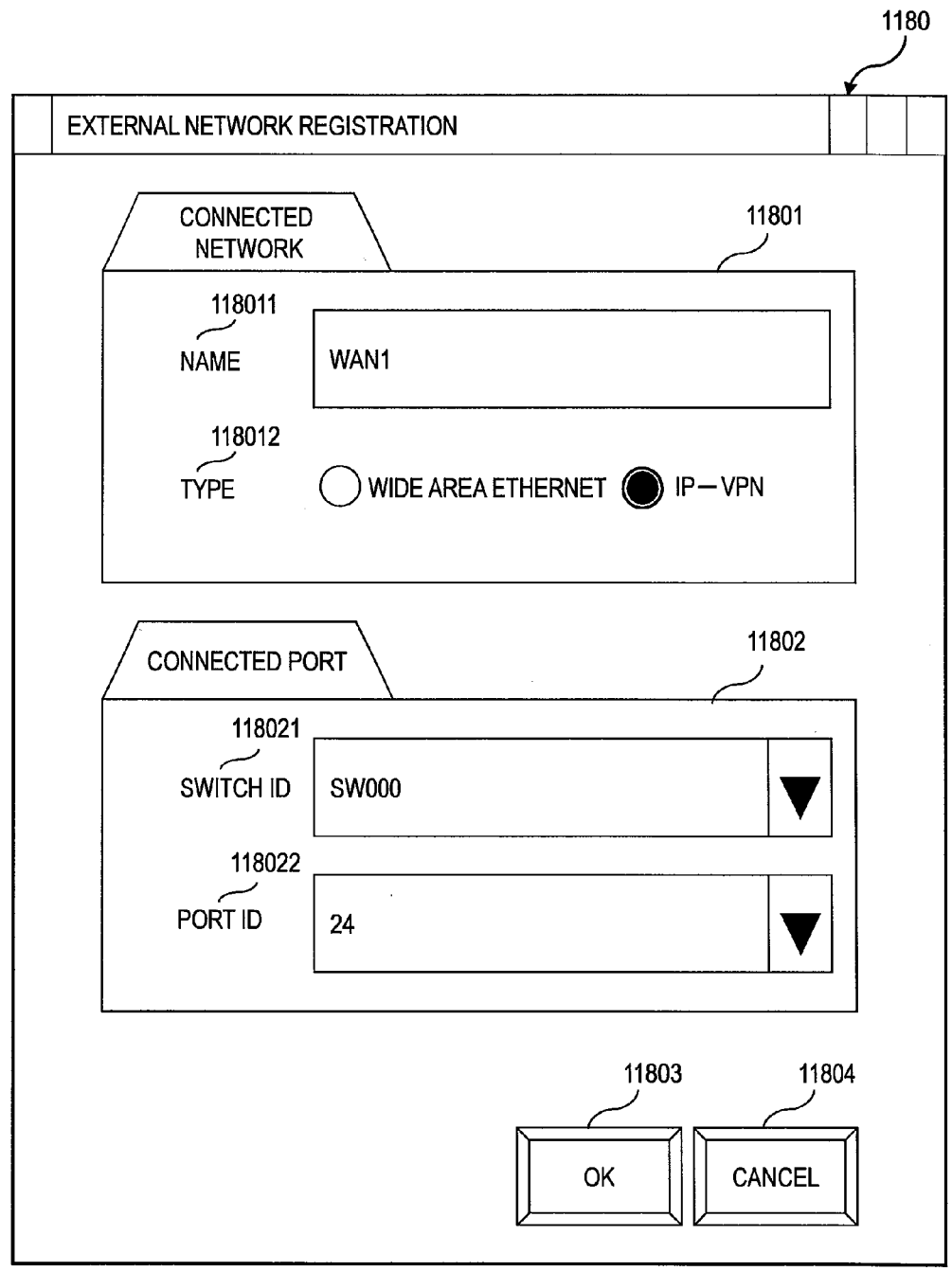
FIG. 12 is a diagram illustrating an example of an external network registration GUI according to the first embodiment of this invention.

FIG. 12 is a diagram illustrating an example of an external network registration GUI 1180 according to the first embodiment of this invention.

The external network registration GUI 1180 is used when the operator connects the switch 4 to the external network (WAN 3) in the processing of Step S0506.

The external network registration GUI 1180 is realized by execution of the server registration GUI 118.

The external network registration GUI 1180 is formed of a dialog window including a connected network area 11801, a connected port 11802, an OK 11803, and a CANCEL 11804.

The connected network area 11801 is an area for inputting information related to the external network (WAN 3) connected to the switch 4. The connected network area 11801 includes a name 118011 and a type 118012.

The name 118011 is an area for inputting an identifier that uniquely identifies the external network (WAN 3) within the data center system. The type 118012 is an area for inputting a type of the connected external network (WAN 3).

In the example illustrated in FIG. 12, a wide area Ethernet (registered trademark) for providing an Ethernet (registered trademark) connecting between a customer's site and the logical server in the data center and an IP-VPN for providing an IP connecting between the customer's site and the logical server in the data center are displayed within the dialog window as options for the type of the external network (WAN 3).

The connected port 11802 is an area for inputting a location in which the external network (WAN 3) is connected, in other words, the switch 4 to be connected to the external network (WAN 3).

The connected port 11802 includes a switch ID 118021 and a port ID 118022.

The switch ID 118021 is an area for inputting an identifier that uniquely identifies the switch 4 to be connected to the external network (WAN 3) within the data center system. The port ID 118022 is an area for inputting the identifier that uniquely identifies the port within the switch 4.

Only the switch 4 located within the network is displayed in the switch ID 118021. This can prevent the operator from performing an erroneous input. Further, a registered port that has already been registered with the server information 109 is not displayed in the port ID 118022, and only the port to which nothing is connected is displayed therein. This can prevent the operator from performing an erroneous input.

The OK 11803 is an operation button for enabling settings input in the connected network area 11801 and the connected port 11802. The CANCEL 11804 is an operation button for disabling the settings input in the connected network area 11801 and the connected port 11802.

The information input by using the external network registration GUI 1180 is transmitted to the power-saving network management server 1. The power-saving network management server 1 that has received the information input by using the external network registration GUI 1180 updates the connection information 108 based on the received information.

FIG. 13 is a diagram illustrating the connection information 108-0 on the switch SW000 according to the first embodiment of this invention.

The example illustrated in FIG. 13 indicates a state after, in the processing of Step S0506, the operator uses the external network registration GUI 1180 to input the contents of external network connecting.

Compared to FIG. 11, it is clear from FIG. 13 that "WAN 1" whose connected network type is "IP-VPN" is connected to the port whose port ID 1081 is "24".

Figure 14:
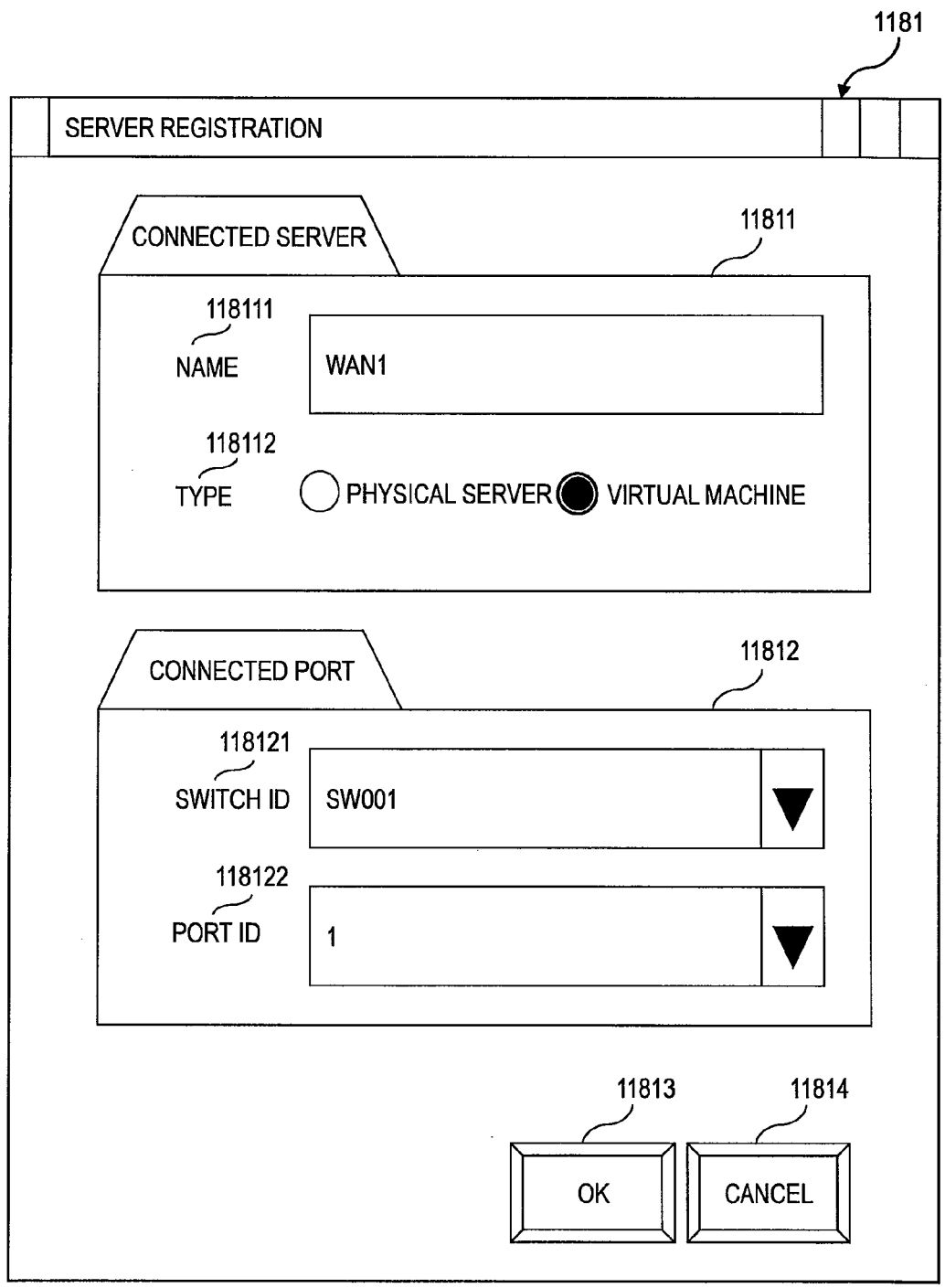
FIG. 14 is a diagram illustrating an example of a server registration GUI according to the first embodiment of this invention.

FIG. 14 is a diagram illustrating an example of a server registration GUI 1181 according to the first embodiment of this invention.

The server registration GUI 1181 is used when the operator connects the server 5 to the switch 4 in the processing of Step S0509.

The server registration GUI 1181 is realized by the execution of the server registration GUI 118.

The server registration GUI 1181 is formed of a dialog window including a connected server area 11811, a connected port 11812, an OK 11813, and a CANCEL 11814.

The connected server area 11811 is an area for inputting information related to the server 5 connected to the switch 4. The connected server area 11811 includes a name 118111 and a type 118112.

The name 118111 is an area for inputting an identifier that uniquely identifies the server 5 within the data center system. The type 118112 is an area for inputting a configuration type of the logical server provided by the server 5.

In the example illustrated in FIG. 14, the physical server and the virtualized machine are displayed within the dialogue window as options.

The connected port 11812 is an area for inputting a location in which the server 5 is connected, in other words, the switch 4 to be connected to the external network (WAN 3).

The connected port 11812 includes a switch ID 118121 and a port ID 118222. The switch ID 118121 and the port ID 118122 are the same as the switch ID 118021 and the port ID 118022 illustrated in FIG. 12.

Only the switch 4 located within the network is displayed in the switch ID 118121. This can prevent the operator from performing an erroneous input. Further, the registered port that has already been registered with the server information 109 is not displayed in the port ID 118122, and only the port to which nothing is connected is displayed therein. This can prevent the operator from performing an erroneous input.

The OK 11813 is an operation button for enabling settings input in the connected server area 11811 and the connected port 11812. The CANCEL 11814 is an operation button for disabling the settings input in the connected server area 11811 and the connected port 11812.

The information input by using the server registration GUI 1181 is transmitted to the power-saving network management server 1. The power-saving network management server 1 that has received the information input by using the server registration GUI 1181 updates the connection information 108 and the server information 109 based on the received information.

It should be noted that, in this embodiment, the operator uses the GUI executed by the power-saving network management server 1 to input the information necessary for the server connecting, but this invention is not limited thereto and may employ another embodiment. For example, an agent operating on the server 5 connected to the network notifies a management agent on the connected switch 4 of the identifier of the server 5 and a connecting manner of the server 5. The switch 4 of the connecting destination that has received the notification notifies the power-saving network management server 1 of the identifier of the switch 4 itself and the identifier of the port connected to the server 5 along with the notification received from the server 5. The power-saving network management server 1 that has received the notification from the management agent on the switch 4 updates the connection information 108 and the server information 109 based on the information included in the notification.

FIG. 15 is a diagram illustrating an example of the server information 109 according to the first embodiment of this invention.

The example illustrated in FIG. 15 indicates a state after, in the processing of Step S0509, the operator uses the server registration GUI 1181 to input the information for connecting the server 5.

The server information 109 includes a server ID 1091, a server type 1092, a switch ID 1093, and a port ID 1094.

The server ID 1091 stores an identifier for uniquely identifying the server within the data center system. The server type 1092 stores the configuration type of the logical server provided by the connected server 5. Specifically, "physical" is stored in the server type 1092 when the server 5 is the physical server, and "virtual" is stored in the server type 1092 when the server 5 is the virtualized server.

The switch ID 1093 stores an identifier for uniquely identifying the switch 4 to which the server 5 is connected within the data center system. The port ID 1094 stores the identifier for uniquely identifying the port within the switch 4 to which the server 5 is connected.

In the example illustrated in FIG. 15, it is clear that the servers SVR001 to SVR008 are connected to ports 1 to 8 of the switch SW001, respectively. Further, it is clear that, among the eight servers 5 connected to the switch SW001, the servers SVR001, SVR002, SVR005, and SVR006 are the virtualized servers and that the servers SVR003, SVR004, SVR007, and SVR008 are the physical servers.

Figure 16:
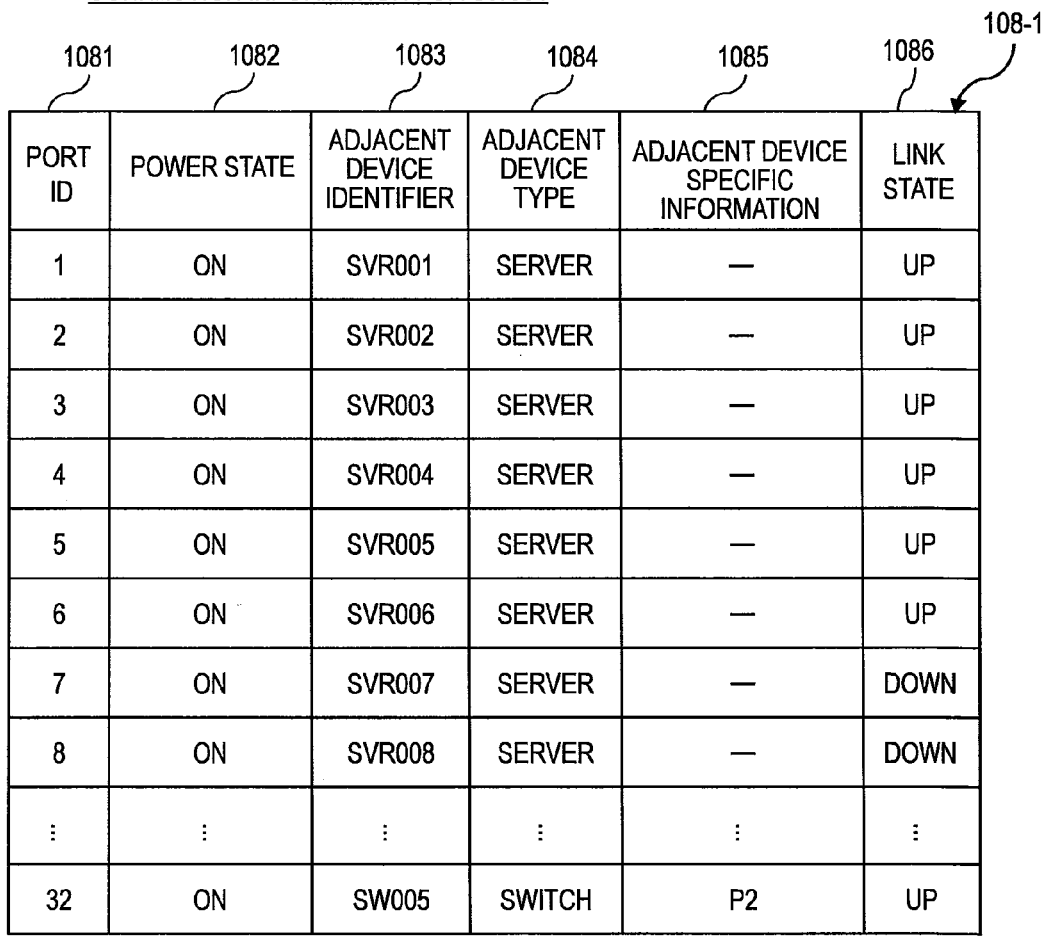
FIG. 16 is a diagram illustrating the connection information of the switch SW000 that has been subjected to the processing of Step S0509 according to the first embodiment of this invention.

FIG. 16 is a diagram illustrating the connection information 108-1 of the switch SW000 that has been subjected to the processing of Step S0509 according to the first embodiment of this invention.

The example illustrated in FIG. 16 indicates a state after, in the processing of Step S0509, the operator uses the server registration GUI 1181 to input the information for connecting the server 5. It is clear that the servers SVR001 to SVR008 are connected to the ports 1 to 8 of the switch SW001, respectively.

Further, it is clear that the servers 5 connected to the ports 1 to 6 are in a link up state, in other words, are the servers 5 being energized. Further, it is clear that the servers 5 connected to the ports 7 and 8 are in a link down state, in other words, are the servers 5 shut down.

Figure 17:
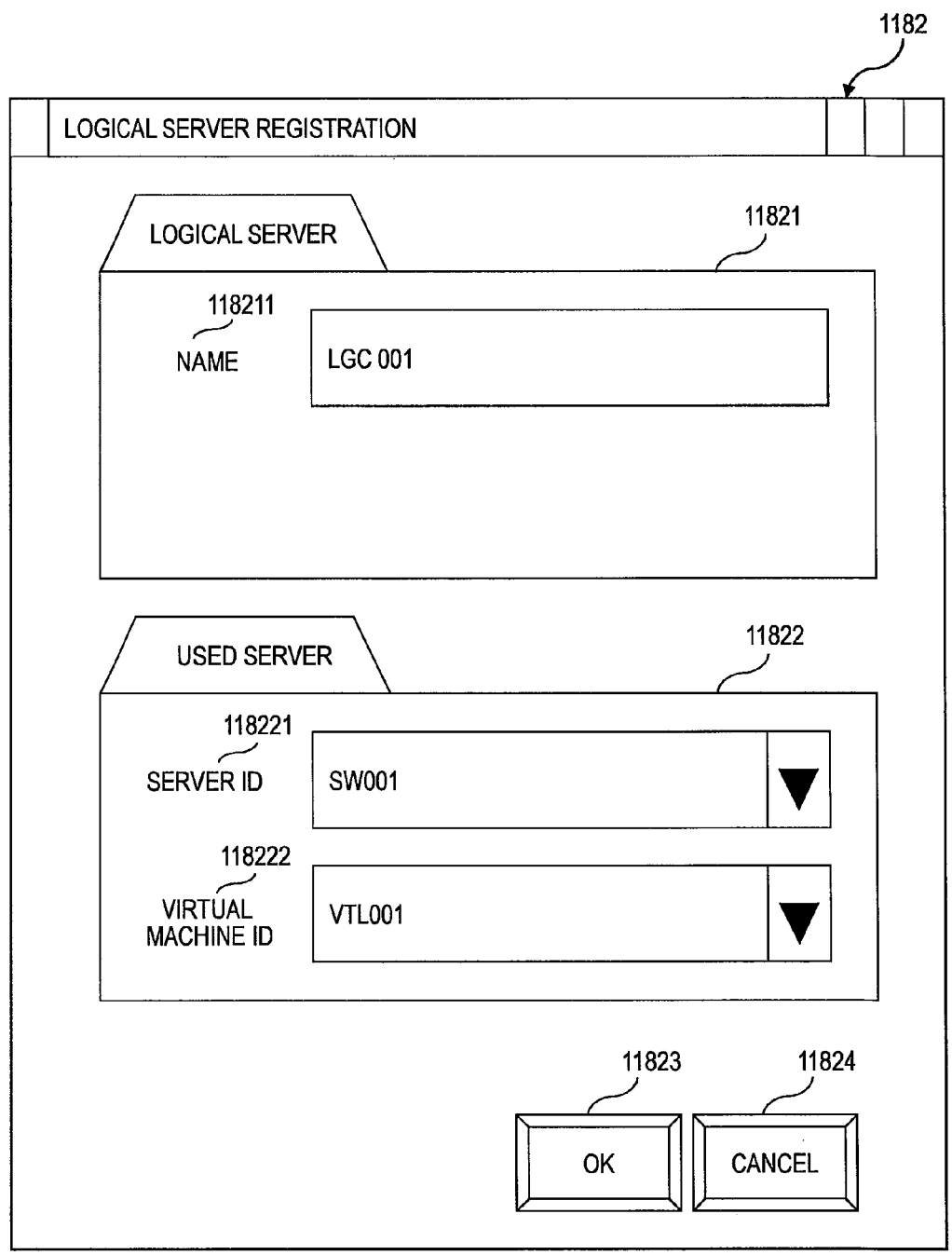
FIG. 17 is a diagram illustrating an example of a logical server registration GUI according to the first embodiment of this invention.

FIG. 17 is a diagram illustrating an example of a logical server registration GUI 1182 according to the first embodiment of this invention.

The logical server registration GUI 1182 is used when the operator creates the logical server in the processing of Step S0509.

The logical server registration GUI 1182 is realized by the execution of the server registration GUI 118.

The logical server registration GUI 1182 is formed of a dialog window including a logical server area 11821, a used server area 11822, an OK 11823, and a CANCEL 11824.

The logical server area 11821 is an area for inputting information related to the logical server provided to the customer. The logical server area 11821 includes a name 118211. The name 118211 is an area for inputting an identifier that uniquely identifies the logical server provided to the customer within the data center system.

The used server area 11822 is an area for inputting information related to the server 5 for use as the logical server. The used server area 11822 includes a server ID 118221 and a virtual machine ID 118222.

The server ID 118221 is an area for inputting an identifier for uniquely identifying the server 5 for use as the logical server within the data center system. The virtual machine ID 118222 is an area for inputting an identifier for uniquely identifying the virtual machine within the virtualized server when the server 5 for use as the logical server is the virtualized server.

Only the server 5 located within the network is displayed in the server ID 118221. This can prevent the operator from performing an erroneous input. Further, only the virtual machine created on the virtualized server is displayed in the virtual machine ID 118222. This can prevent the operator from performing an erroneous input.

The OK 11823 is an operation button for enabling settings input in the logical server area 11821 and the used server area 11822. The CANCEL 11824 is an operation button for disabling the settings input in the logical server area 11821 and the used server area 11822.

The power-saving network management server 1 executes the logical server state acquisition program 119 to thereby acquire the information input by using the logical server registration GUI 1182. The power-saving network management server 1 updates the server resource information 110 based on the acquired information.

FIG. 18 is a diagram illustrating an example of the server resource information 110 according to the first embodiment of this invention.

The example illustrated in FIG. 18 indicates a state after, in the processing of Step S0509, the operator uses the logical server registration GUI 1182 to input the information for registering the logical server.

The server resource information 110 includes a logical server ID 1101, a server ID 1102, and a virtual machine ID 1103.

The logical server ID 1101 stores an identifier for uniquely identifying the logical server provided to the customer within the data center system. The server ID 1102 stores the identifier for uniquely identifying the server 5 within the data center system. The virtual machine ID 1103 stores an identifier for uniquely identifying the virtual machine created on the virtualized server within the virtualized server.

In the example illustrated in FIG. 18, it is clear that there exist logical servers LGC001 to LGC012. Further, it is clear that eight of the twelve logical servers LGC001 to LGC012 are the virtual machines.

Specifically, it is clear that two virtual machines are created on each of the servers SVR001, SVR002, SVR005, and SVR006.

Figure 19:
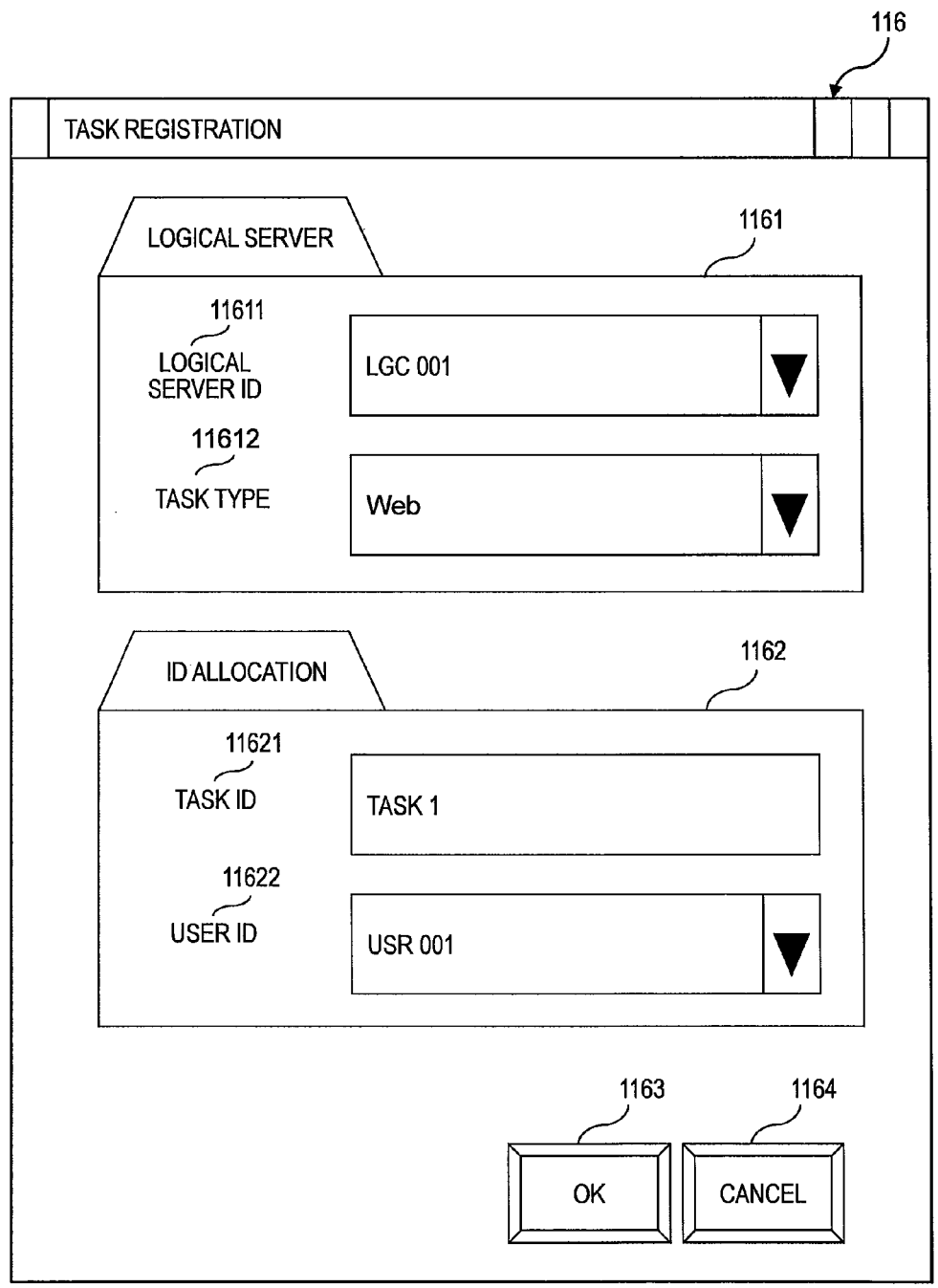
FIG. 19 is a diagram illustrating an example of the task registration GUI according to the first embodiment of this invention.

FIG. 19 is a diagram illustrating an example of the task registration GUI 116 according to the first embodiment of this invention.

The task registration GUI 116 is used, in the processing of Step S509, when the operator allocates a task to the logical server.

The operator uses the task registration GUI 116 to allocate a specific task to the logical server.

The task registration GUI 116 is formed of a dialog window including a logical server area 1161, an ID allocation area 1162, an OK 1163, and a CANCEL 1164.

The logical server area 1161 is an area for inputting information related to the logical server to which a task is allocated. The logical server area 1161 includes a logical server ID 11611 and a task type 11612.

The logical server ID 11611 is an area for inputting an identifier for uniquely identifying the logical server within the data center system. The task type 11612 is an area for inputting a type of the task allocated to the logical server. In the example of FIG. 19, a task "Web" is allocated to the logical server whose logical server area 1161 is "LGC001".

The ID allocation area 1162 is an area for inputting information related to the customer. The ID allocation area 1162 includes a task ID 11621 and a user ID 11622.

The task ID 11621 is an area for inputting an identifier for uniquely identifying the task performed by using the logical server among customers or within a group formed of a plurality of customers. The user ID 11622 is an area for inputting an identifier for uniquely identifying the customer within the data center system.

Only the logical server existing within the network is displayed in the logical server ID 11611. This can prevent the operator from performing an erroneous input. Only the preset task is displayed in the task type 11612. This can prevent the operator from performing an erroneous input. Further, only the customer registered with the data center is displayed in the user ID 11622. This can prevent the operator from performing an erroneous input.

The OK 1163 is an operation button for enabling settings input in the logical server area 1161 and the ID allocation area 1162. The CANCEL 1164 is an operation button for disabling the settings input in the logical server area 1161 and the ID allocation area 1162.

The information input by using the task registration GUI 116 is transmitted to the power-saving network management server 1. The power-saving network management server 1 that has received the information input by using the task registration GUI 116 updates the task information 107 based on the received information.

FIG. 20 is a diagram illustrating an example of the task information 107 according to the first embodiment of this invention.

The example illustrated in FIG. 20 indicates a state after, in the processing of Step S0509, the operator uses the task registration GUI 116 to input information for allocating the task to the logical server.

The task information 107 includes a logical server ID 1071, a task type 1072, a task ID 1073, and a user ID 1074.

The logical server ID 1071 stores the identifier for uniquely identifying the logical server within the data center system. The task type 1072 stores the type of the task allocated to the logical server. The task ID 1073 stores the identifier for uniquely identifying the task executed by using the logical server among customers or within the group formed of a plurality of customers. The user ID 1074 stores the identifier for uniquely identifying the customer within the data center system.

FIG. 21 is a diagram illustrating an example of the power information 120 according to the first embodiment of this invention.

The power information 120 includes a switch ID 1201, a forwarder power 1202, and a port power 1203.

The switch ID 1201 stores the identifier for uniquely identifying the switch 4 provided within the data center system. The forwarder power 1202 stores the power consumption of the forwarder 409 of the switch 4 corresponding to the switch ID 1201. The port power 1203 stores the power consumption of the port of the switch 4 corresponding to the switch ID 1201.

Figure 22:
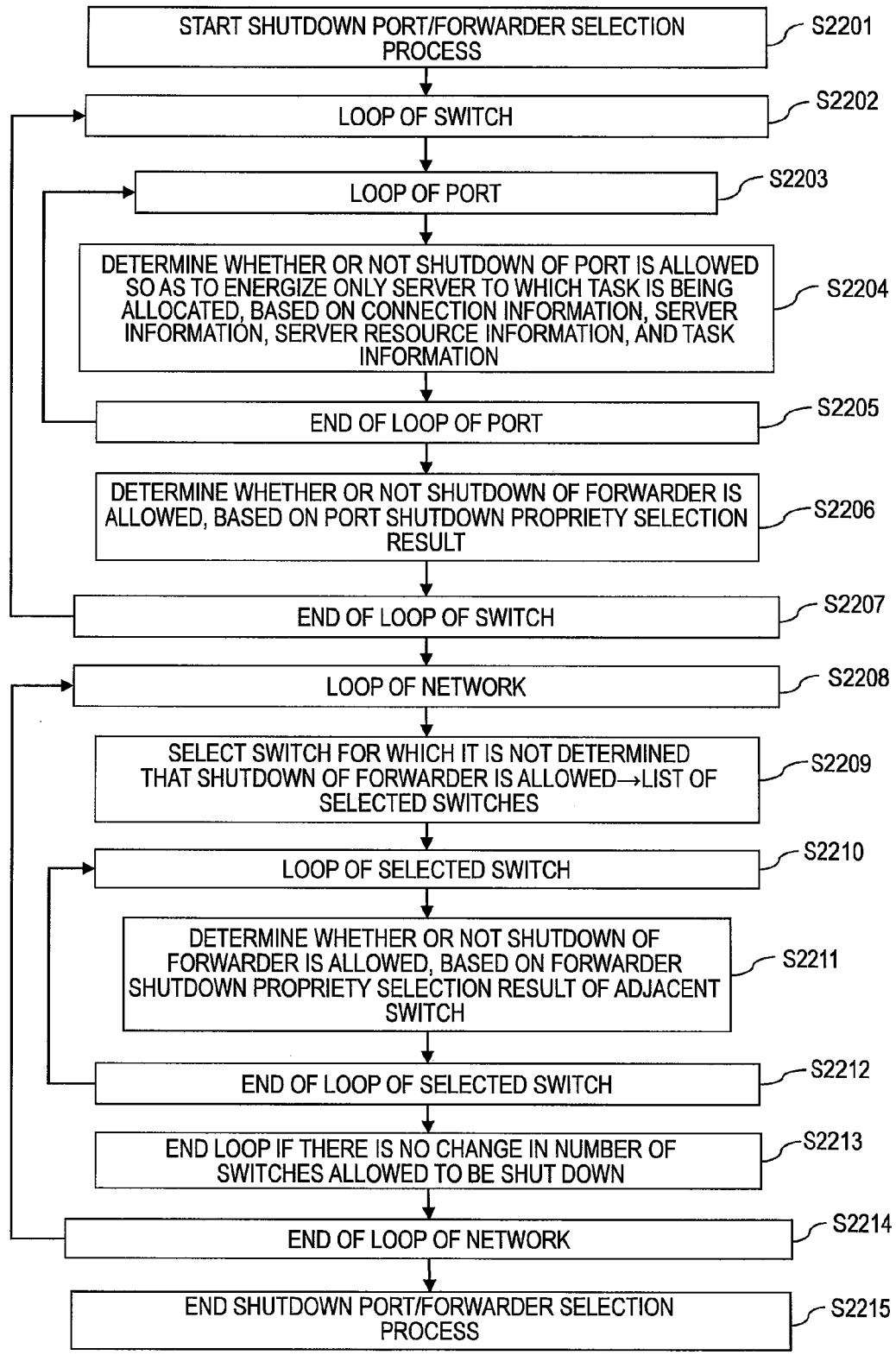
FIG. 22 is a flowchart illustrating a shutdown port/forwarder selection process executed by the power-saving network management server according to the first embodiment of this invention.

FIG. 22 is a flowchart illustrating a shutdown port/forwarder selection process executed by the power-saving network management server 1 according to the first embodiment of this invention.

The shutdown port/forwarder selection process is realized by the power-saving network management server 1 executing the port/forwarder selection program 113.

Figure 23A:
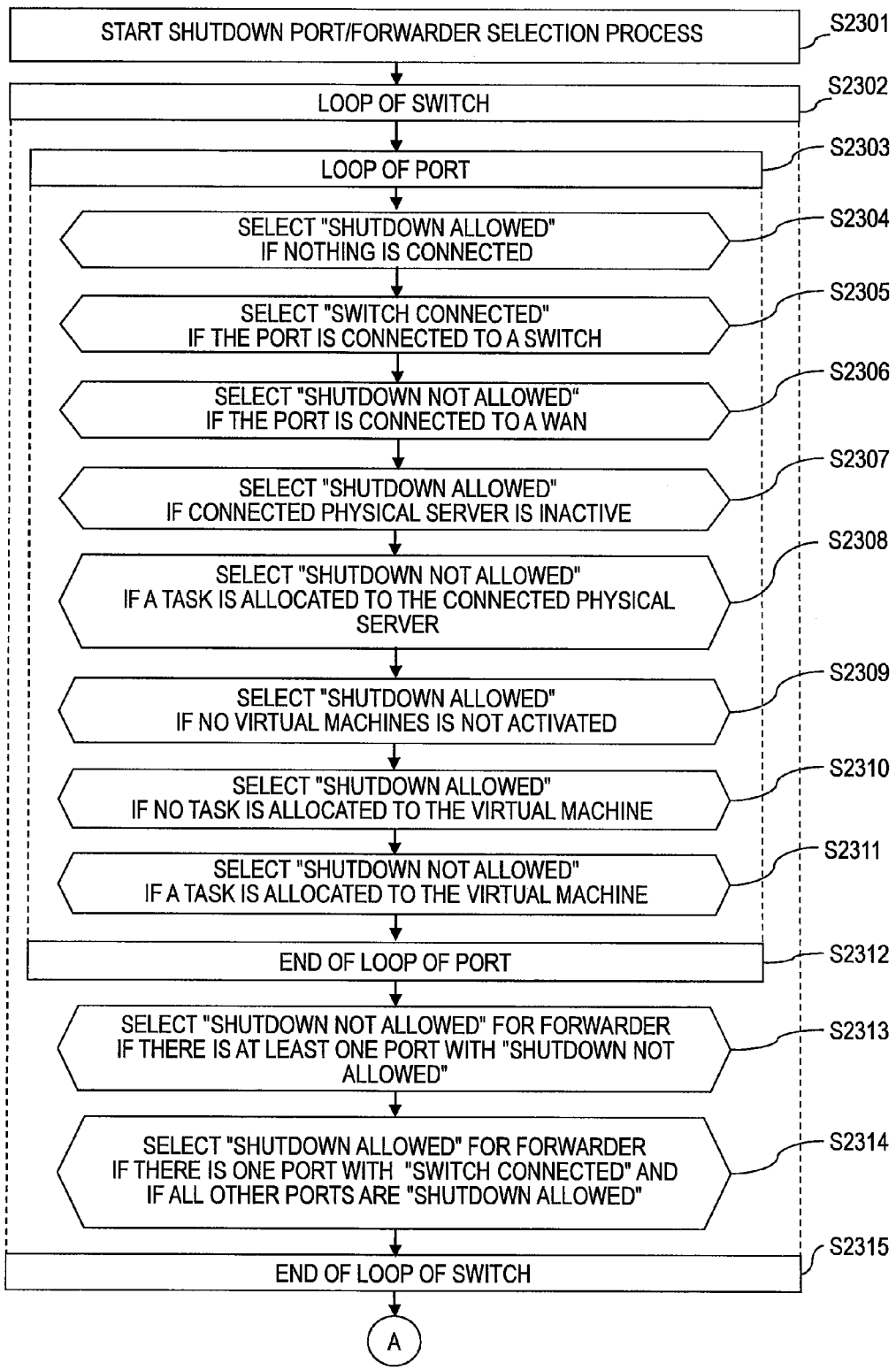
FIGS. 23A and 23B are flowcharts illustrating details of the shutdown port/forwarder selection process according to the first embodiment of this invention.
Figure 23B:
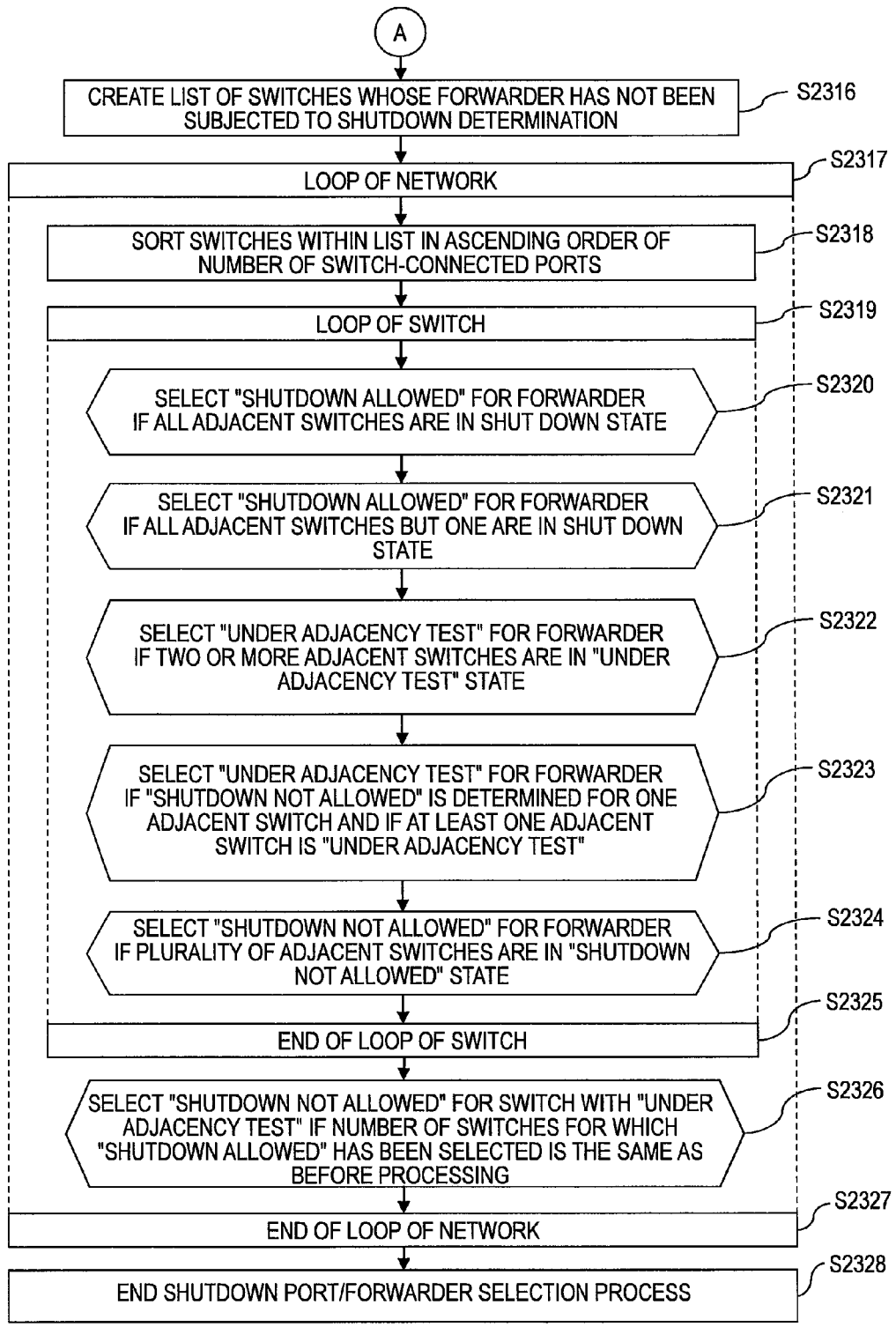

In FIG. 22, a flow of the shutdown port/forwarder selection process is described, and FIGS. 23A and 23B are referenced to describe a specific processing thereof.

The shutdown port/forwarder selection process is classified into two processings. In other words, the first half of the shutdown port/forwarder selection process is a processing for determining whether or not the shutdown of the port and the forwarder 409 of each of the switches 4 is allowed. The second half of the shutdown port/forwarder selection process is a processing for determining whether or not the shutdown of the forwarder 409 of the switch 4 is allowed on a network basis based on the shutdown selection result of the adjacent switch 4.

The power-saving network management server 1 starts the shutdown port/forwarder selection process (S2201).

First, the power-saving network management server 1 starts a loop of the switch (S2202). Specifically, the power-saving network management server 1 selects one arbitrary switch 4 from the connection information 108.

Subsequently, the power-saving network management server 1 starts a loop of the port of the switch 4 selected in Step S2202 (S2203). Specifically, the power-saving network management server 1 selects one arbitrary port from the ports provided to the switch 4 selected in Step S2202.

The power-saving network management server 1 determines whether or not the shutdown of the port is allowed (S2204). Specifically, the power-saving network management server 1 references the connection information 108, the server information 109, the server resource information 110, and the task information 107 to determine whether or not the server to which a task is allocated is connected to the port selected in Step S2203.

When the determination of one port is ended (S2205), the power-saving network management server 1 determines whether or not the processing for all the ports has been ended. If it is not determined that the processing for all the ports has been ended, the power-saving network management server 1 returns to Step S2203 to execute the same processing for another port.

If it is determined that the processing for all the ports has been ended, the power-saving network management server 1 determines whether or not the shutdown of the forwarder 409 of the switch 4 is allowed, based on the selection result of shutdown propriety of the port (S2206).

When the determination as to the shutdown propriety of all the ports and the forwarder 409 of the switch 4 selected in Step S2202 is ended (S2207), the power-saving network management server 1 determines whether or not the determination processing as to the shutdown propriety for all the switches 4 has been ended, and if it is not determined that the determination processing as to the shutdown propriety for all the switches 4 has been ended, returns to Step S2202 to execute the same processing for another switch.

If it is determined that the determination processing as to the shutdown propriety for all the switches 4 has been ended, the power-saving network management server 1 starts a loop of the network (S2208).

First, based on switch-basis selection results of the shutdown propriety, the power-saving network management server 1 extracts all the switches 4 for which it is not determined the shutdown of the forwarder 409 is allowed (S2209).

Subsequently, the power-saving network management server 1 starts a loop of selected the switch (S2210). Specifically, the power-saving network management server 1 selects one arbitrary switch 4 from among the switches 4 extracted in Step S2209.

The power-saving network management server 1 determines whether or not the shutdown of the forwarder of the switch 4 selected in Step S2201 is allowed, based on the selection result of the shutdown propriety of the forwarder 409 of the adjacent switch connected to the switch 4 selected in Step S2210 (S2211).

The power-saving network management server 1 determines whether or not the processing for all the switches 4 extracted in Step S2209 has been ended (S2212), and if it is not determined that the processing for all the switches 4 extracted in Step S2209 has been ended, returns to Step S2210 to execute the same processing for another switch 4.

If it is determined that the processing for all the switches 4 extracted in Step S2209 has been ended, the power-saving network management server 1 references the connection information 108 to determine whether or not there is a change in the number of switches 4 that can be shut down in comparison between before and after the loop of the network (S2213).

If it is not determined that there is a change in the switches 4 that can be shut down in comparison between before and after the loop of the network, the power-saving network management server 1 ends the loop of the network (S2214), and ends the shutdown port/forwarder selection process (S2215).

If it is determined that there is a change in the number of switches 4 that can be shut down in comparison between before and after the loop of the network, the power-saving network management server 1 returns to Step S2208 to execute the same processing.

In the loop of selected the switch (S2201 to S2207), it is determined whether or not the shutdown of the forwarder 409 of at least the switch 4 to which the server 5 or the WAN 3 is connected is allowed. Further, in the loop of the network (S2208 to S2215), it is determined whether or not the shutdown of the forwarder 409 of all the switches 4 is allowed, based on the selection result of the shutdown propriety of the forwarder 409 of the switch 4 on an upper level or a lower level within the network system.

FIGS. 23A and 23B are flowcharts illustrating details of the shutdown port/forwarder selection process according to the first embodiment of this invention.

FIG. 23A is a diagram illustrating details of the first half (S2201 to S2207) of the shutdown port/forwarder selection process. FIG. 23B is a diagram illustrating details of the second half (S2208 to S2215) of the shutdown port/forwarder selection process.

First described are the details of the first half (S2201 to S2207) of the shutdown port/forwarder selection process. Executed in the first half of the shutdown port/forwarder selection process is the determination focusing particularly on the switch 4 connected to the server 5 (for example, SW001, SW002, or SW003 illustrated in FIG. 1) and the switch 4 connected to the WAN 3 (for example, SW000 illustrated in FIG. 1).

The power-saving network management server 1 starts the shutdown port/forwarder selection process (S2301).

The power-saving network management server 1 starts the loop of the switch (S2302). In Step S2302, the power-saving network management server 1 selects one arbitrary switch 4 from the connection information 108.

Subsequently, the power-saving network management server 1 starts the loop of the port of the selected switch 4 (S2303). In Step S2303, the power-saving network management server 1 selects one port from among the ports provided to the selected switch 4.

Hereinafter, the power-saving network management server 1 determines whether or not the shutdown of each of the ports of the selected switch 4 is allowed.

First, the power-saving network management server 1 determines whether or not there is an adjacent device connected to the selected port. Specifically, the power-saving network management server 1 determines whether or not the adjacent device identifier 1083 of the selected port is "Null".

If it is determined that nothing a adjacent device connected to the selected port, the power-saving network management server 1 selects "shutdown allowed" for the selected port and breaks out of the loop (S2304) to advance to Step S2312.

If it is determined that there is a adjacent device connected to the selected port, the power-saving network management server 1 advances to the subsequent determination.

Subsequently, the power-saving network management server 1 determines whether or not the adjacent device connected to the selected port is the switch 4. Specifically, the power-saving network management server 1 determines whether or not the adjacent device identifier 1083 of the selected port is the identifier indicating the switch (for example, SW001).

If it is determined that the adjacent device connected to the selected port is the switch, the power-saving network management server 1 selects "switch connected" for the selected port and breaks out of the loop (S2305) to advance to Step S2312. It should be noted that the port selected as "switch connected" is hereinafter referred to as "switch-connected port".

If it is determined that the adjacent device connected to the selected port is not the switch, the power-saving network management server 1 advances to the subsequent determination.

Subsequently, the power-saving network management server 1 determines whether or not the adjacent device connected to the selected port is the WAN 3. Specifically, the power-saving network management server 1 determines whether or not the adjacent device identifier 1083 of the selected port is "WAN".

If it is determined that the adjacent device connected to the selected port is the WAN 3, the power-saving network management server 1 selects "shutdown not allowed" for the selected port and breaks out of the loop (S2306) to advance to Step S2312.

If it is determined that the adjacent device connected to the selected port is not the WAN 3, the power-saving network management server 1 advances to the subsequent determination.

Subsequently, the power-saving network management server 1 determines whether or not the adjacent device connected to the selected port is the physical server. Specifically, the power-saving network management server 1 references the connection information 108 and the server information 109 on the selected switch 4 to determine whether or not the server ID 1091 is stored in the adjacent device identifier 1083 of the selected port and the server type 1092 corresponding to the server ID 1091 is "physical".

If it is determined that the adjacent device connected to the selected port is the physical server, the power-saving network management server 1 determines whether or not the physical server is activated, in other words, the physical server is in a power-on state. Specifically, the power-saving network management server 1 determines whether or not the link state 1086 of the physical server connected to the selected port is "UP".

If it is determined that the physical server is not activated, the power-saving network management server 1 selects "shutdown allowed" for the selected port and breaks out of the loop (S2307) to advance to Step S2312.

If it is determined that the physical server is activated, the power-saving network management server 1 determines whether or not a task is allocated to the connected physical server.

Specifically, the power-saving network management server 1 references the logical server ID 1101 of an entry of the server ID 1102 corresponding to the physical server, and further references the task type 1072 and the task ID 1073 of an entry corresponding to the logical server ID 1101, to determine whether or not a task is allocated to the physical server connected to the selected port.

If it is not determined that a task is allocated to the connected physical server, the power-saving network management server 1 selects "shutdown allowed" for the selected port and breaks out of the loop to advance to Step S2312.

If it is determined that a task is allocated to the connected physical server, the power-saving network management server 1 selects "shutdown not allowed" for the selected port and breaks out of the loop (S2308) to advance to Step S2312.

If it is not determined that the adjacent device connected to the selected port is the physical server, the power-saving network management server 1 determines that the adjacent device connected to the port is the virtualized server, and determines whether or not all of the virtual machine created on the virtualized server is activated.

Specifically, the power-saving network management server 1 determines whether or not the link state 1086 of the virtualized server connected to the selected port is "DOWN". It should be noted that a case where the link state 1086 is "DOWN" corresponding to the fact that none of the virtual machines created on the virtualized server is activated.

If it is determined that all of the virtual machines created on the virtualized server connected to the selected port is not activated, the power-saving network management server 1 selects "shutdown allowed" for the selected port and breaks out of the loop (S2309) to advance to Step S2312.

If it is determined that at least one of the virtual machines created on the virtualized server connected to the selected port is activated, the power-saving network management server 1 advances to the subsequent determination.

Subsequently, the power-saving network management server 1 determines whether or not a task is allocated to at least one activated virtual machine among the activated virtual machines on the virtualized server.

Specifically, the power-saving network management server 1 references the logical server ID 1101 of an entry of the server ID 1102 corresponding to the virtualized server, and further references the task type 1072 and the task ID 1073 of an entry corresponding to the logical server ID 1101, to determine whether or not a task is allocated to the virtual machine created on the virtualized server connected to the selected port.

If it is determined that no task is allocated to at least one activated virtual machine among the activated virtual machines on the virtualized server, the power-saving network management server 1 selects "shutdown allowed" for the selected port and breaks out of the loop (S2310) to advance to Step S2312.

If it is determined that a task is allocated to at least one activated virtual machine among the activated virtual machines on the virtualized server, the power-saving network management server 1 selects "shutdown not allowed" for the selected port and breaks out of the loop (S2311) to advance to Step S2312.

The power-saving network management server 1 determines whether or not the processing for all the ports of the switch 4 selected in Step S2302 has been ended, and if it is determined that the processing for all the ports of the switch 4 selected in Step S2302 has been ended, ends the loop of the port (S2312) to advance to Step S2313. It should be noted that the result of the shutdown selection of the port is stored in the shutdown port selection result 111.

If it is not determined that the processing for all the ports of the switch 4 selected in Step S2302 has been ended, the power-saving network management server 1 returns to Step S2303 to execute the same processing.

Subsequently, the power-saving network management server 1 references the shutdown port selection result 111 to determine whether or not the shutdown of the forwarder 409 of the switch 4 selected in Step S2303 is allowed.

The power-saving network management server 1 determines whether or not the switch 4 selected in Step S2303 includes at least one port selected as "shutdown not allowed".

If it is determined that the switch 4 selected in Step S2303 includes at least one port selected as "shutdown not allowed", the power-saving network management server 1 selects "shutdown not allowed" for the forwarder 409 of the switch 4 and breaks out of the loop (S2313) to advance to Step S2315.

If it is not determined that the switch 4 selected in Step S2303 includes at least one port selected as "shutdown not allowed", the power-saving network management server 1 advances to the subsequent determination.

Subsequently, the power-saving network management server 1 determines whether or not the switch 4 selected in Step S2303 has one port selected as "switch connected" and the other ports selected as "shutdown allowed".

If it is determined that the above-mentioned determination condition is satisfied, the power-saving network management server 1 selects "shutdown allowed" for the forwarder 409 of the switch 4 selected in Step S2303 and breaks out of the loop (S2314) to advance to Step S2315.

If it is determined that the above-mentioned determination condition is not satisfied, the power-saving network management server 1 advances to Step S2315.

It should be noted that if none of Steps S2313 and 2314 is satisfied, whether or not the shutdown of the forwarder 409 of the switch 4 is allowed is not determined by the loop of the switch. Therefore, if whether or not the shutdown of the forwarder 409 of the switch 4 is allowed cannot be determined by the loop of the switch, the power-saving network management server 1 selects the selection result of the shutdown propriety as "under adjacency test".

The power-saving network management server 1 determines whether or not switch port processing for all the switches 4 has been ended, and if it is determined that the switch port processing for all the switches 4 has been ended, ends the loop of the switch (S2315) to start the loop of the network. It should be noted that the selection result of the shutdown propriety of the forwarder 409 is stored in the shutdown forwarder selection result 112.

If it is not determined that the switch port processing for all the switches 4 has not been ended, the power-saving network management server 1 returns to Step S2301 to execute the same processing.

In the example of FIG. 2, the first half of the shutdown port/forwarder selection process is executed to thereby determine the forwarder 409 of the switch SW000 as "shutdown not allowed", the forwarder 409 of the switch SW001 as "shutdown not allowed", the forwarder 409 of the switch SW002 as "shutdown allowed", and the forwarder 409 of the switch SW003 as "shutdown allowed". Further, whether or not the shutdown of the forwarders 409 of the switches SW004 and SW005 is allowed is not determined here, but is determined by execution of the second half of the shutdown port/forwarder selection process.

Subsequently, the details of the second half (S2208 to S2215) of the shutdown port/forwarder selection process are described. Executed in the second half (S2208 to S2215) of the shutdown port/forwarder selection process is the determination focusing particularly on the shutdown selection of the switch 4 connected to another switch 4 (for example, SW004 or SW005 illustrated in FIG. 1).

The power-saving network management server 1 references the shutdown forwarder selection result 112 and the connection information 108 to extract all the switches 4 whose forwarders 409 have not been selected as "shutdown allowed" and create a list thereof (S2316).

The list includes at least the switch ID and the shutdown forwarder selection result 112. It should be noted that the shutdown forwarder selection results 112 of the switches 4 included in the list all store "under adjacency test".

Subsequently, the power-saving network management server 1 starts the loop of the network (S2317).

The power-saving network management server 1 sorts the entries included in the list created in Step S2316 in ascending order of the number of the switch-connected ports of the switch 4 (S2318).

In a loop of an operation determination switch executed in the subsequent step, there is a case where the determination as to whether or not the shutdown of the forwarder 409 is allowed may be executed a plurality of times for the same switches 4 based on the selection result of the shutdown propriety of the forwarder 409 of the adjacent switch. In the above-mentioned case, it is more likely that the switch 4 having a smaller number of switch-connected ports can produce the selection result at an earlier stage. Accordingly, it is possible to reduce a time period for the determination by execution of the processing of Step S2318.

Subsequently, the power-saving network management server 1 starts the loop of the operation determination switch (S2319). Specifically, the power-saving network management server 1 selects the switches 4 in order from the top of the list sorted in Step S2318, and executes a processing described below.

Subsequently, the power-saving network management server 1 determines whether or not the selection results of the shutdown propriety of the forwarder 409 of all the adjacent switches 4 connected to the switch-connected ports of the selected switch 4 are all "shutdown allowed".

Specifically, based on the switch IDs of the adjacent switches 4 connected to the switch-connected ports, the power-saving network management server 1 references the shutdown forwarder selection result 112 to determine whether or not the selection results of the shutdown propriety of the forwarder 409 of all the adjacent switches 4 connected to the switch-connected ports are "shutdown allowed".

If it is determined that the selection results of the shutdown propriety of the forwarder 409 of all the adjacent switches 4 connected to the switch-connected ports of the selected switch 4 are all "shutdown allowed", the power-saving network management server 1 selects "shutdown allowed" for the forwarder 409 of the selected switch 4 and breaks out of the loop (S2320) to advance to Step S2325.

If it is not determined that the selection results of the shutdown propriety of the forwarder 409 of all the adjacent switches 4 connected to the switch-connected ports of the selected switch 4 are all "shutdown allowed", the power-saving network management server 1 advances to the subsequent determination.

Subsequently, the power-saving network management server 1 determines whether or not the selection results of the shutdown propriety of the forwarders 409 of the adjacent switches 4 connected to all the switch-connected ports but one switch-connected port among the switch-connected ports of the selected switch 4 are "shutdown allowed".

Specifically, based on the switch IDs of the adjacent switches 4 connected to the respective switch-connected ports, the power-saving network management server 1 references the shutdown forwarder selection result 112 to determine whether or not the above-mentioned condition is satisfied.

If it is determined that the above-mentioned determination condition is satisfied, the power-saving network management server 1 selects "shutdown allowed" for the forwarder 409 of the selected switch and breaks out of the loop (S2321) to advance to Step S2325.

If it is not determined that the above-mentioned determination condition is satisfied, the power-saving network management server 1 advances to the subsequent determination.

Subsequently, the power-saving network management server 1 determines whether or not there are two or more switch-connected ports for which the selection result of the shutdown propriety of the forwarder 409 of the adjacent switch 4 connected to the switch-connected port is "under adjacency test".

Specifically, based on the switch IDs of the adjacent switches 4 connected to the respective switch-connected ports, the power-saving network management server 1 references the shutdown forwarder selection result 112 to determine whether or not the above-mentioned determination condition is satisfied.

If it is determined that the above-mentioned determination condition is satisfied, the power-saving network management server 1 maintains "under adjacency test" for the forwarder 409 of the selected switch and breaks out of the loop (S2322) to advance to Step S2325.

If it is not determined that the above-mentioned determination condition is satisfied, the power-saving network management server 1 advances to the subsequent determination.

Subsequently, the power-saving network management server 1 determines whether or not there is one switch-connected port for which the selection result of the shutdown propriety of the forwarder 409 of the adjacent switch 4 connected to the switch-connected port is "shutdown not allowed" and there is at least one switch-connected port for which the selection result of the shutdown propriety of the forwarder 409 of the adjacent switch 4 connected to the switch-connected port is "under adjacency test".

Specifically, based on the switch IDs of the adjacent switches 4 connected to the respective switch-connected ports, the power-saving network management server 1 references the shutdown forwarder selection result 112 to determine whether or not the above-mentioned condition is satisfied.

If it is determined that the above-mentioned determination condition is satisfied, the power-saving network management server 1 maintains "under adjacency test" for the forwarder 409 of the selected switch 4 and breaks out of the loop (S2323) to advance to Step S2325.

If it is not determined that the above-mentioned determination condition is satisfied, the power-saving network management server 1 advances to the subsequent determination.

Subsequently, the power-saving network management server 1 determines whether or not there are two or more switch-connected ports for which the selection result of the shutdown propriety of the forwarder 409 of the adjacent switch 4 connected to the switch-connected port is "shutdown not allowed".

If it is determined that there are two or more switch-connected ports for which the selection result of the shutdown propriety of the forwarder 409 of the adjacent switch 4 connected to the switch-connected port is "shutdown not allowed", the power-saving network management server 1 selects "shutdown not allowed" for the forwarder 409 of the selected switch and breaks out of the loop (S2324) to advance to Step S2325.

If it is not determined that there are two or more switch-connected ports for which the selection result of the shutdown propriety of the forwarder 409 of the adjacent switch 4 connected to the switch-connected port is "shutdown not allowed", the power-saving network management server 1 advances to the subsequent determination.

Subsequently, the power-saving network management server 1 determines whether or not the processing for all the switches 4 included in the list created in Step S2316 has been ended, and if it is determined that the processing for all the switches 4 included in the list created in Step S2316 has been ended, ends the loop of the operation determination switch (S2325) to advance to Step S2326. It should be noted that the results of the determination processing executed in Steps S2319 to S2324 are stored in the list created in Step S2316 and the shutdown forwarder selection result 112.

Subsequently, the power-saving network management server 1 references the shutdown forwarder selection result 112 to determine whether or not there is a change in the number of switches 4 for which the forwarder 409 of the switch 4 has been determined as "shutdown allowed" in comparison between before and after the determination processing executed in Steps S2319 to S2325.

If it is determined that there is a change in the number of switches 4 for which the forwarder 409 of the switch 4 has been selected as "shutdown allowed" in comparison between before and after the determination processing executed in Steps S2319 to S2325, the power-saving network management server 1 selects "shutdown not allowed" for the forwarder 409 that has been selected as "under adjacency test" and breaks out of the loop (S2326), further returning to the loop of the network (S2327) to execute the same processing.

If it is not determined that there is a change in the number of switches 4 for which the forwarder 409 of the switch 4 has been selected as "shutdown allowed" in comparison between before and after the determination processing executed in Steps S2319 to S2325, the power-saving network management server 1 ends the shutdown port/forwarder selection process (S2328).

Figure 24:
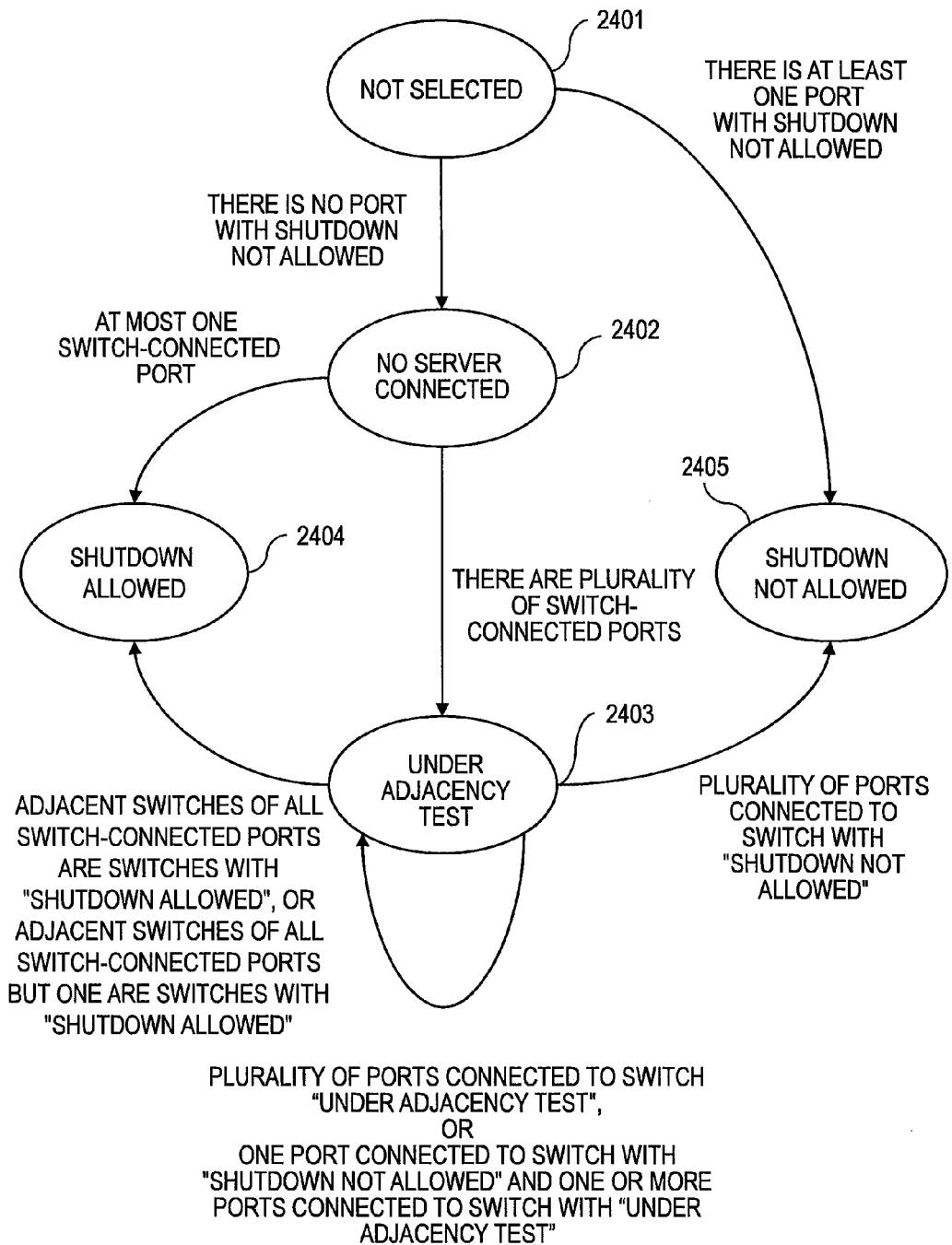
FIG. 24 is a diagram illustrating a transition of a selection state of a shutdown forwarder selection result according to the first embodiment of this invention.

FIG. 24 is a diagram illustrating a transition of a selection state of the shutdown forwarder selection result 112 according to the first embodiment of this invention.

Before the shutdown port/forwarder selection process is executed, the forwarders 409 of all the switches 4 are in a state of "not selected" (2401).

When the shutdown selection processing (S2302 to S2315) for all the ports of the switch 4 is ended, the forwarder 409 of the switch 4 having no port that has been selected as "shutdown not allowed" transitions to a state of "no server connected" (2402).

Further, if there exists at least one port of "shutdown not allowed" (S2313), the forwarder 409 of the selected switch 4 transitions to a state of "shutdown not allowed" (2405).

If it is determined in the processing of Step S2321 that there are a plurality of switch-connected ports, the forwarder 409 of the switch 4 in the state of "no server connected" (2402) transitions to a state of "under adjacency test" (2403).

If it is determined in the processing of Step S2321 that no switch-connected port or only one switch-connected port is provided, the forwarder 409 of the switch 4 transitions to a state of "shutdown allowed" (2404).

Subsequently, when the shutdown port/forwarder selection process is repeatedly executed, if it is determined that the forwarders 409 of the adjacent switches 4 of all the switch-connected ports are "shutdown allowed" (S2330) or if it is determined that the forwarders 409 of the adjacent switches 4 of all the switch-connected ports but one switch-connected port are "shutdown allowed" (S2321), the forwarder 409 of the switch 4 in a state of "under adjacency test" transitions to the state of "shutdown allowed" (2404).

Further, if there are a plurality of ports connected to the switches 4 in the state of "under adjacency test" (2403) (S2322), or if there is one port connected to the switch 4 in the state of "shutdown not allowed" (2405) and there is one or more ports connected to the switches 4 in the state of "under adjacency test" (2403) (S2323), the forwarder 409 of the selected switch 4 maintains the state of "under adjacency test" (S2403).

If a plurality of switches 4 in the state of "shutdown not allowed" (S2405) are connected to the switch 4 in the state of "under adjacency test" (S2324), the selected switch 4 transitions to the state of "shutdown not allowed" (2405).

FIG. 25 is a diagram illustrating an example of the shutdown port selection result 111 according to the first embodiment of this invention.

The example illustrated in FIG. 25 indicates the shutdown port selection result 111 of the switch SW001.

The shutdown port selection result 111 includes a port ID 1111, a port selection state 1112, and an on/unused selection result 1113.

The port ID 1111 is the same as the port ID 1081 illustrated in FIG. 10. The port selection state 1112 stores the selection result of the shutdown propriety of the port. Specifically, the port selection state 1112 stores any one of "shutdown allowed", "shutdown not allowed", and "switch-connected". The port selection state 1112 is updated by execution of the processing of Steps S2302 to S2315.

Based on the selection result of the shutdown propriety of the port, the on/unused selection result 1113 stores information indicating whether or not the port is an on/unused port. Specifically, the on/unused selection result 1113 stores any one of "on/unused" indicating being the on/unused port, "in-use" indicating being the port that is actually being used for connecting the WAN 3, the switch 4, or the server 5, and "shutdown" indicating having the power supply to the port shut down.

The on/unused selection result 1113 is decided by the power-saving network management server 1 comparing the power state 1082 of the connection information 108 and the port selection state 1112. Specifically, if the port selection state 1112 is "shutdown not allowed", the on/unused selection result 1113 stores "in-use". If the port selection state 1112 is "shutdown allowed" and if the power state 1082 is "on", the on/unused selection result 1113 stores "on/unused". Further, if the power state 1082 is "shut down", the on/unused selection result 1113 stores "shutdown".

It should be noted that the on/unused selection of the port is executed after Step S2315.

FIG. 26 is a diagram illustrating an example of the shutdown forwarder selection result 112 according to the first embodiment of this invention.

The shutdown forwarder selection result 112 includes a switch ID 1121, a power state 1122, a forwarder selection state 1123, and an on/unused selection result 1124.

The switch ID 1121 is the same as the switch ID 1093 illustrated in FIG. 15. The power state 1122 is the same as the power state 1082 illustrated in FIG. 6. The power state 1122 stores a selection state of the forwarder 409 of the switch 4 corresponding to the switch ID 1121.

The forwarder selection state 1123 stores the selection result of the shutdown propriety of the forwarder 409. Specifically, the forwarder selection state 1123 stores any one of "shutdown not allowed", "shutdown allowed", and "under adjacency test".

The on/unused selection result 1124 stores the selection result of whether or not the forwarder 409 of the switch 4 corresponding to the switch ID 1121 is on/unused. Specifically, the on/unused selection result 1124 stores any one of "in-use" and "on/unused".

The on/unused selection result 1124 is decided by the power-saving network management server 1 comparing the power state 1122 and the forwarder selection state 1123. Specifically, if the forwarder selection state 1123 is "shutdown not allowed", the on/unused selection result 1124 stores "in-use". Further, if the power state 1122 is "on" and if the forwarder selection state 1123 is "shutdown allowed", the on/unused selection result 1124 stores "on/unused".

It should be noted that the on/unused selection of the forwarder 409 is executed after Step S2327.

Figure 27A:
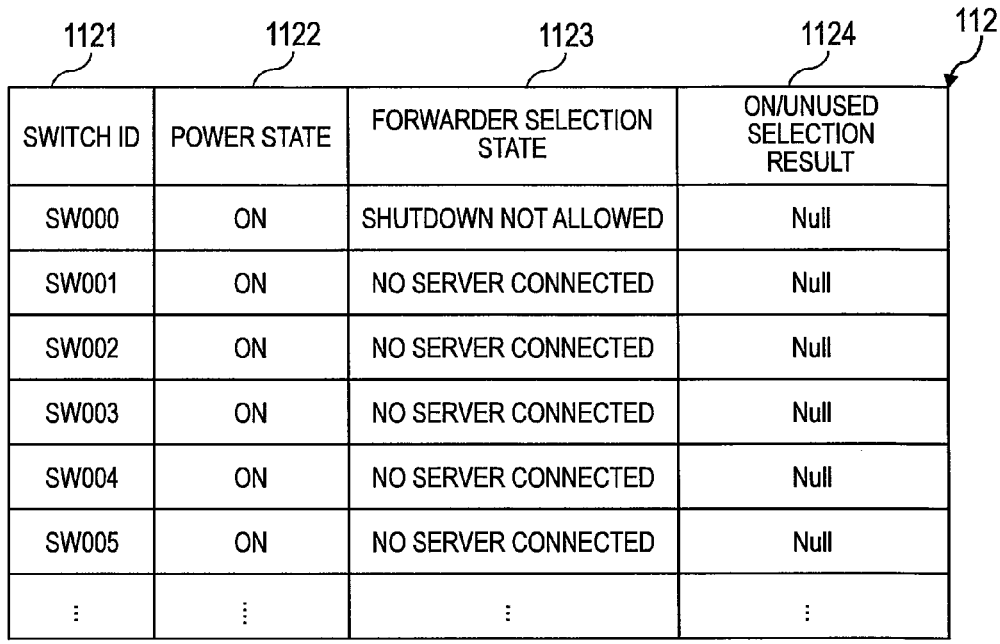
FIGS. 27A to 27C are diagrams illustrating transitions of the shutdown forwarder selection result obtained during execution of the shutdown port/forwarder selection process according to the first embodiment of this invention.
Figure 27B:
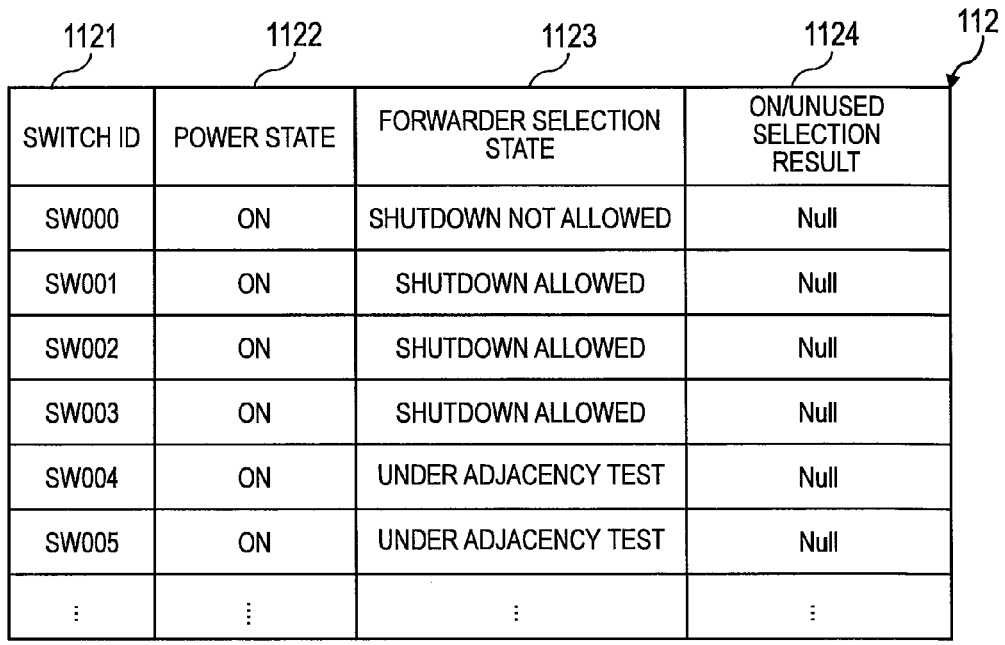
Figure 27C:
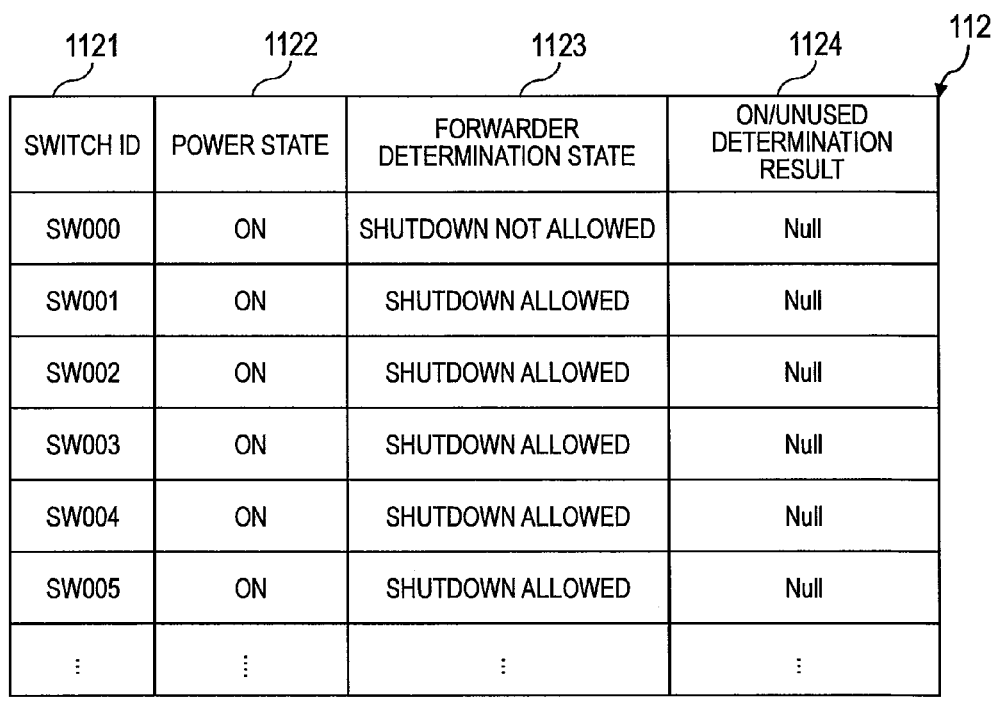

FIGS. 27A to 27C are diagrams illustrating transitions of the shutdown forwarder selection result 112 obtained during execution of the shutdown port/forwarder selection process according to the first embodiment of this invention.

The shutdown forwarder selection result 112 illustrated in FIG. 27A indicates a state in which the loop of the switch (S2302 to S2315) has ended.

The shutdown forwarder selection result 112 illustrated in FIG. 27B indicates a state in which the loop of the network (S2317 to S2327) is being executed.

The shutdown forwarder selection result 112 illustrated in FIG. 27C indicates a state in which the loop of the network (S2317 to S2327) is being executed.

With regard to the switches SW000 to SW004 illustrated in FIG. 1, if it is determined based on the connection information 108 whether or not the shutdown to the forwarder 409 is allowed, for example, the forwarder 409 of the switch SW000 connected to the WAN 3 is selected as "shutdown not allowed".

Further, with regard to the switches SW001 to SW003 connected to the server 5, if no task process is operating on the servers 5 connected to the switches SW001 to SW003, the forwarders 409 of the switches SW001 to SW003 are selected as "shutdown allowed".

Further, in FIG. 27B, the forwarders 409 of the switches SW004 and SW005 are determined as "under adjacency test".

In FIG. 27C, the shutdown of all the ports of the switch SW004 is allowed except the switch-connected port connected to the switch SW000 being the adjacent switch 4, and hence the forwarder 409 of the switch SW004 is selected as "shutdown allowed". The forwarder 409 of the switch SW005 is similarly selected as "shutdown allowed".

It should be noted that, in this embodiment, a configuration in which the power-saving network management server 1 and the virtual machine management server 2 are operated on different servers is illustrated, but this invention is not limited thereto and can be carried out by a different configuration. For example, a configuration may be employed in which programs executed on the power-saving network management server 1 and the virtual machine management server 2 are executed on a single server.

Next described is a screen for displaying a result of the shutdown selection (hereinafter, referred to as "shutdown selection result display screen"), which is generated by the power-saving network management server 1.

Figure 28:
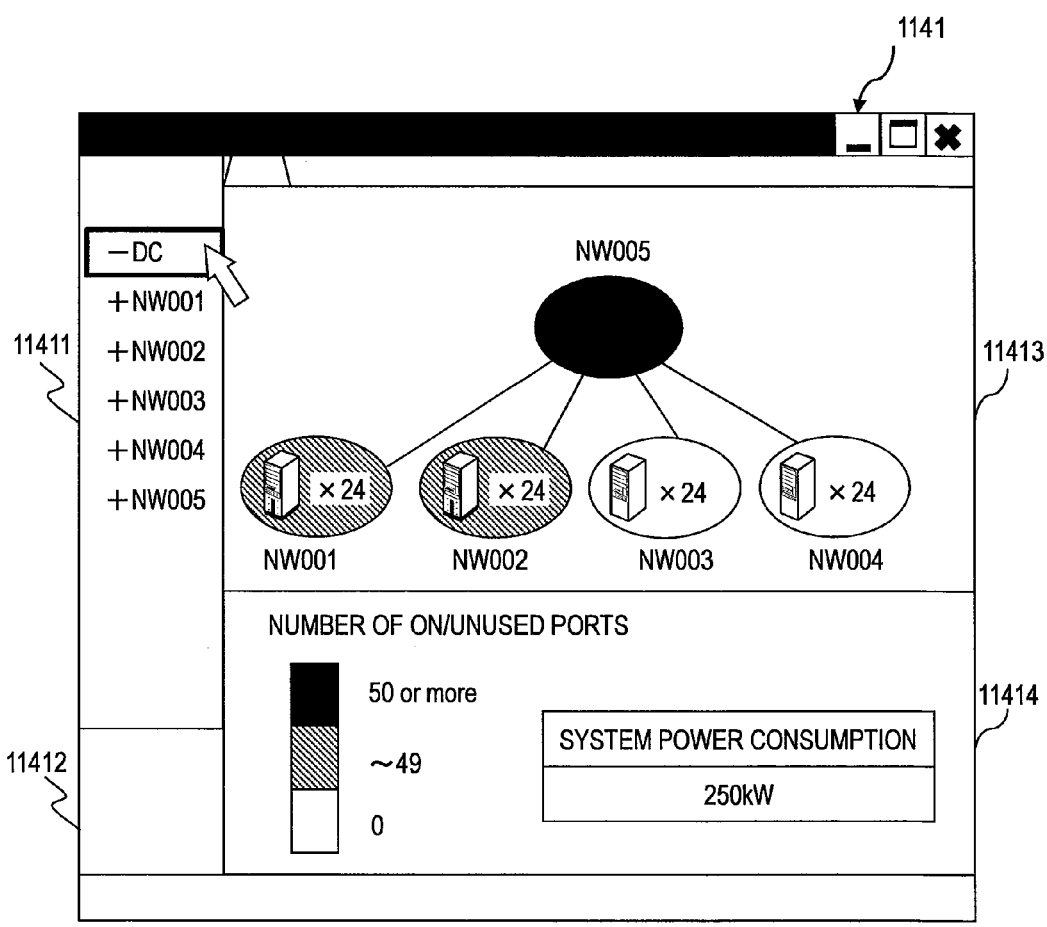
FIG. 28 is an explanatory diagram of an example of a shutdown selection result display screen within the data center system according to the first embodiment of this invention.

FIG. 28 is an explanatory diagram of an example of a shutdown selection result display screen 1141 within the data center system according to the first embodiment of this invention.

The shutdown selection result display screen 1141 is displayed to the operator by the power-saving network management server 1 executing the shutdown port selection result display program 114.

The shutdown selection result display screen 1141 includes a selection display section 11411, a display subject information display section 11412, an icon display section 11413, and a detailed information display section 11414.

The selection display section 11411 displays information for allowing the operator to select a subject for which the result of the shutdown selection is to be displayed.

In the example illustrated in FIG. 28, the identifiers of the networks within the data center are displayed in the selection display section 11411. Here, the identifier of the network is an identifier for uniquely identifying the network within the data center. It should be noted that the network includes at least the WAN 3, the switch 4, and the server 5.

In the example illustrated in FIG. 28, "DC" indicating the data center is selected by the operator, and the networks NW001 to NW005 within the data center are displayed.

The display subject information display section 11412 displays information on the display subject selected in the selection display section 11411. It should be noted that, in the example illustrated in FIG. 28, nothing is displayed in the display subject information display section 11412.

The icon display section 11413 displays the determination result of the shutdown propriety by using icons. This allows the operator to easily recognize the determination result of the shutdown propriety.

In the example illustrated in FIG. 28, the number of servers 5 provided to each of the networks and the number of on/unused ports are displayed. Specifically, the number of servers 5 provided to the network is displayed as a numerical value. Further, the number of on/unused ports is displayed by using a distinctive icon. Possible examples of the display using the distinctive icon include an expression using preset colors or a gradation and the like.

The detailed information display section 11414 displays details of the result of the shutdown determination. Displayed in the example illustrated in FIG. 28 are a correlation between a range of the number of on/unused ports and the display using the distinctive icon, and system power consumption. The system power consumption is a power consumed by the entire system within the data center.

The system power consumption is calculated when the power-saving network management server 1 executes the shutdown port selection result display program 114 to generate data for displaying the shutdown selection result display screen 1141. Specifically, the power-saving network management server 1 references the power information 120 to perform the calculation by adding the product of the multiplication of the port power 1203 and the total number of the ports of the switches within the data center system to the product of the multiplication of the forwarder power 1202 and the total number of the forwarders within the data center system.

Figure 29:
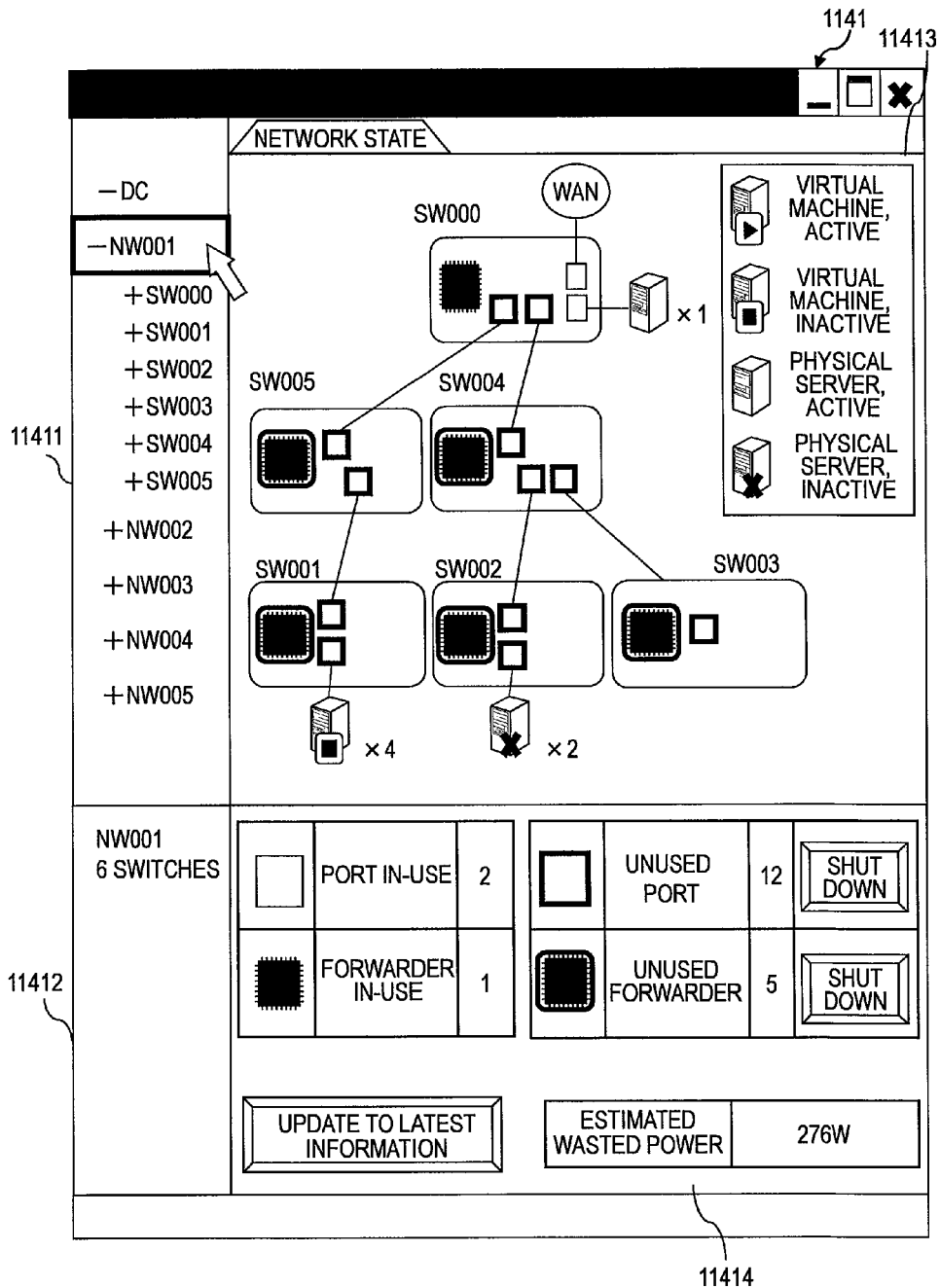
FIG. 29 is an explanatory diagram of an example of the shutdown selection result display screen obtained on a network basis according to the first embodiment of this invention.

FIG. 29 is an explanatory diagram of an example of the shutdown selection result display screen 1141 obtained on a network basis according to the first embodiment of this invention.

The example illustrated in FIG. 29 indicates a case where the operator selects the network NW001 on the shutdown selection result display screen 1141 illustrated in FIG. 28, which displays the determination result of the shutdown propriety of the network NW001.

In the example illustrated in FIG. 29, displayed in the selection display section 11411 are all the switches SW000 to SW005 within the network NW001 selected by the operator.

Displayed in the display subject information display section 11412 is information related to the network NW001 selected in the selection display section 11411. Specifically, the number of switches 4 included in the network NW001 is displayed.

Displayed in the icon display section 11413 is the determination result of the shutdown propriety of the switches SW000 to SW005 included in the network NW001. Specifically, the selection result of the shutdown propriety of the ports, the selection result of the shutdown propriety of the forwarders, the devices connected to the ports, and the states of the devices are displayed in the form of icons.

The WAN 3, the switch 4, and the server 5 (physical server or virtual machine) are displayed as the devices connected to the ports.

The states of the servers 5 include "virtual machine, active", "virtual machine, inactive", "physical server, active", and "physical server, inactive", and icons corresponding to the respective states are displayed in the icon display section 11413.

"Virtual machine, active" is a state in which a task is allocated to the virtual machine. "Virtual machine, inactive" is a state in which no task is allocated to the virtual machine. "Physical server, active" is a state in which a task is allocated to the physical server. "Physical server, inactive" is a state in which no task is allocated to the physical server.

In the example illustrated in FIG. 29, the servers 5 connected to the switches SW001 and SW002 are not operating, and hence an icon representing an "on/unused port" is displayed for the ports of the switches SW001 and SW002 connected to the servers 5. The switch SW003 is not connected to the server 5, and hence an icon representing an "on/unused port" is displayed for all the ports of the switch SW003.

Further, the server 5 to which a task is allocated is not connected to the switches SW001 to SW003, or no server 5 is connected thereto, and hence an icon representing an "unused forwarder" is displayed for the forwarders 409 of the switches SW001 to SW003

With regard to the switches SW004 and SW005, the forwarders 409 of all the switches 4 connected to the switches SW004 and SW005 except the switch SW000 are determined as "unused forwarders", and hence the icon representing an "unused forwarder" is displayed for the forwarders 409 of the switches SW004 and SW005. Here, the "unused forwarder" means the forwarder 409 whose on/unused selection result 1124 is "on/unused".

The switch SW000 is connected to the WAN 3 and the operating server 5, and hence an icon representing a "port in-use" is displayed for the ports connected to the WAN 3 and the server 5. Further, an icon representing a "forwarder in-use" is displayed for the forwarder 409 of the switch SW000.

The detailed information display section 11414 displays information indicating the details of the determination result of the shutdown propriety of the switches SW000 to SW005 included in the selected network NW001.

Specifically, boxes indicating determination results, icons corresponding to the determination results, and the numbers of ports and forwarders corresponding to the selection results and a box indicating the estimated wanted power are displayed.

The boxes indicating the determination results, the icons corresponding to the determination results, and the numbers of ports and forwarders corresponding to the selection results include boxes indicating: icons representing the port and the forwarder 409 selected as "shutdown not allowed"; and the numbers of ports and forwarders 409 selected as "shutdown not allowed".

In addition, the boxes indicating the determination results, the icons corresponding to the determination results, and the numbers of ports and forwarders corresponding to the selection results include boxes indicating: icons representing the port and the forwarder 409 selected as "shutdown allowed"; and the numbers of ports and forwarders 409 selected as "shutdown allowed". Further, a button for instructing the shutdown of the power supply is displayed in the boxes. The operator operates the button to thereby shut down the power supply to all the ports being "unused ports" or all the forwarders 409 being "unused forwarders".

Specifically, when the button for instructing the shutdown of the power supply is operated, the power-saving network management server 1 executes the power supply control program 115 to shut down the power supply to the specified ports or forwarders 409. It should be noted that, if it is not possible to shut down the power supply, the button for instructing the shutdown of the power supply is disabled.

Figure 34:
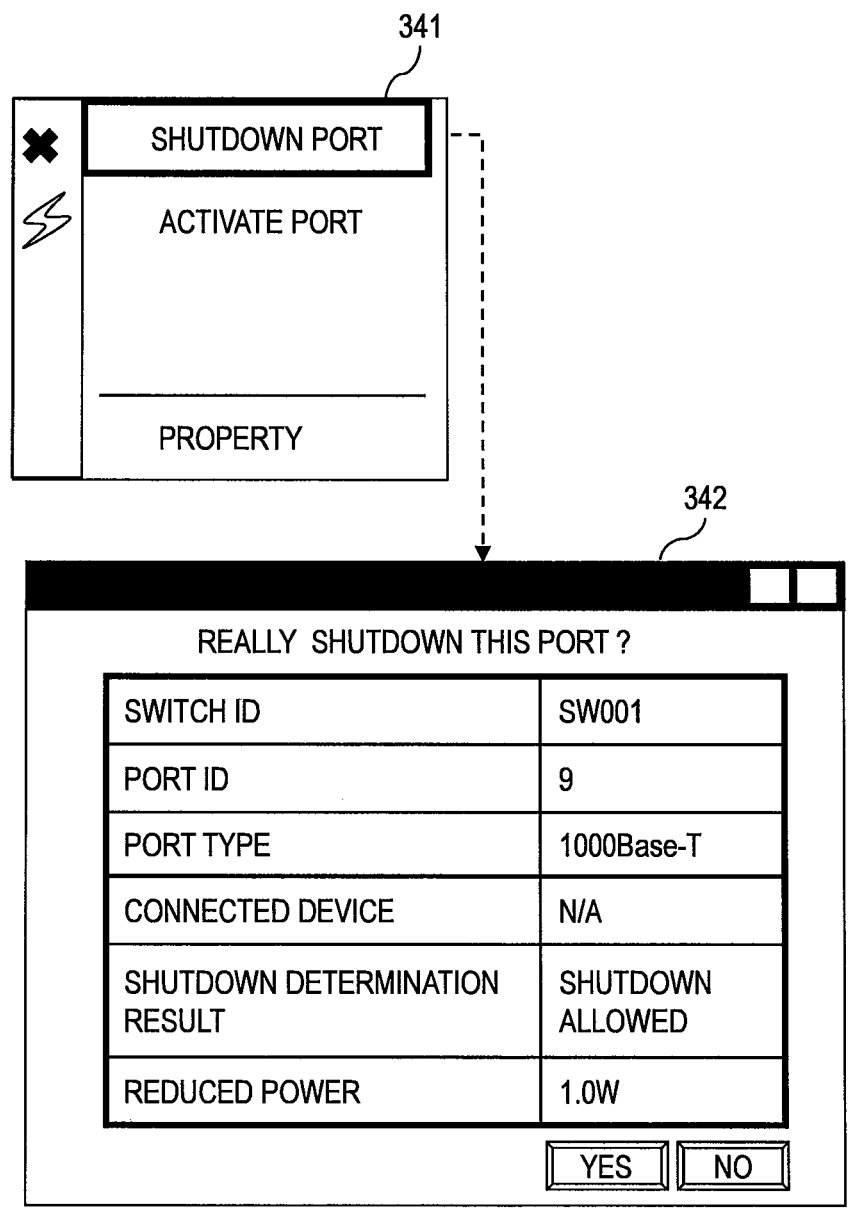
FIG. 34 is an explanatory diagram of a GUI for instructing a shutdown of the power supply on a port basis according to the first embodiment of this invention.

It should be noted that FIG. 34 is referenced to describe later a case where the power supply to the ports being "unused ports" or the forwarders 409 being "unused forwarders" are shut down individually.

The estimated wanted power is a power consumed in excess by the ports being "unused ports" and the forwarders 409 being "unused forwarders". The estimated wanted power is calculated by the power-saving network management server 1 referencing the power information 120 to perform the calculation by adding the product of the multiplication of the forwarder power 1202 and the number of the unused forwarders to the product of the multiplication of the port power 1203 and the number of the unused ports.

Further, the detailed information display section 11414 displays a button for performing an update to the latest information. When the operator operates the button, information is updated in the respective display sections.

The operator uses the shutdown selection result display screen 1141 to thereby grasp dump power consumption on a network basis and grasp which switch includes the on/unused port and the on/unused forwarder that have caused the dump power consumption.

FIGS. 30 to 33 are explanatory diagrams of examples of the shutdown selection result display screen 1141 obtained on a switch basis according to the first embodiment of this invention.

Figure 30:
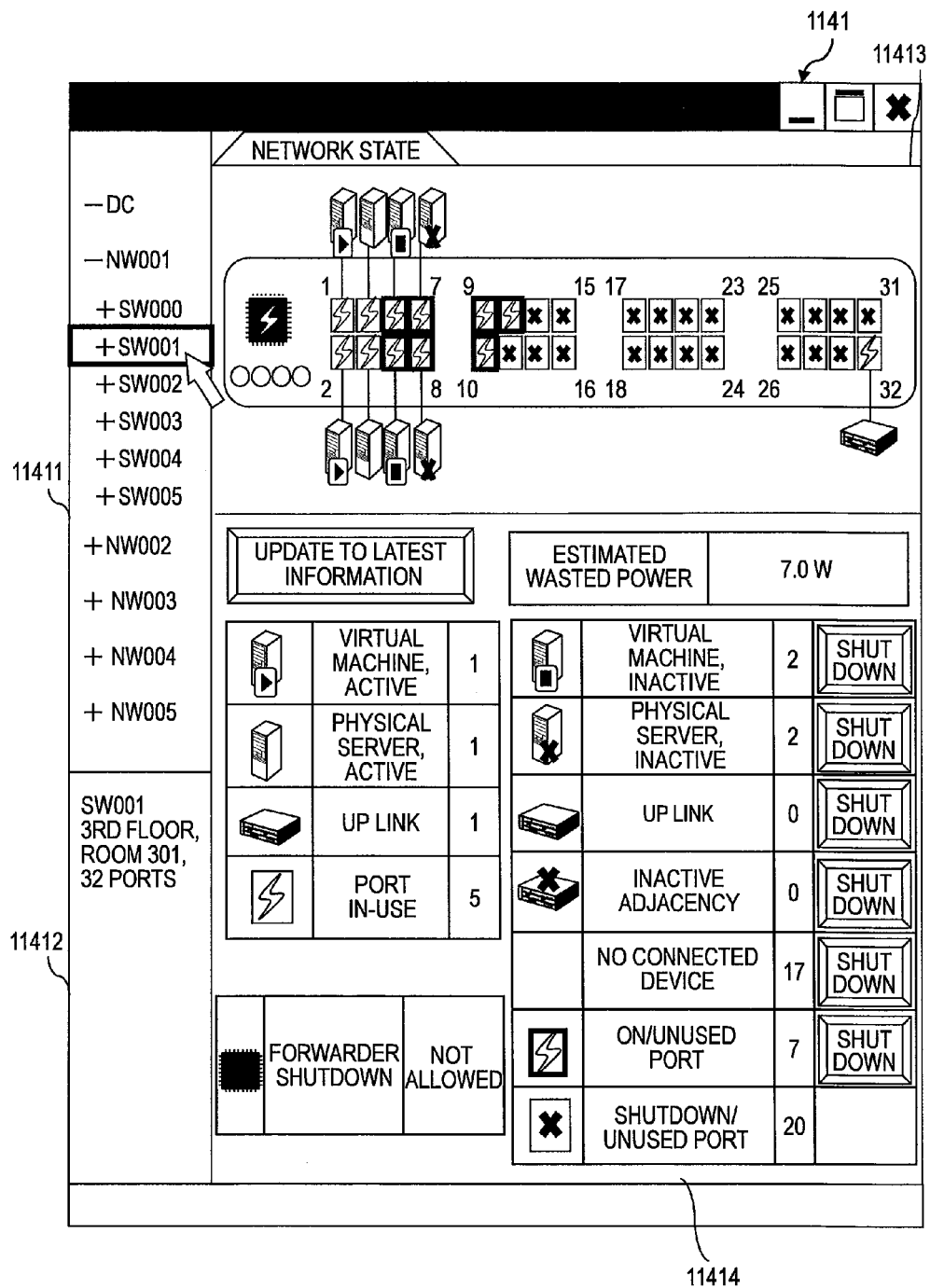
FIGS. 30 to 33 are explanatory diagrams of examples of the shutdown selection result display screen obtained on a switch basis according to the first embodiment of this invention.
Figure 31:
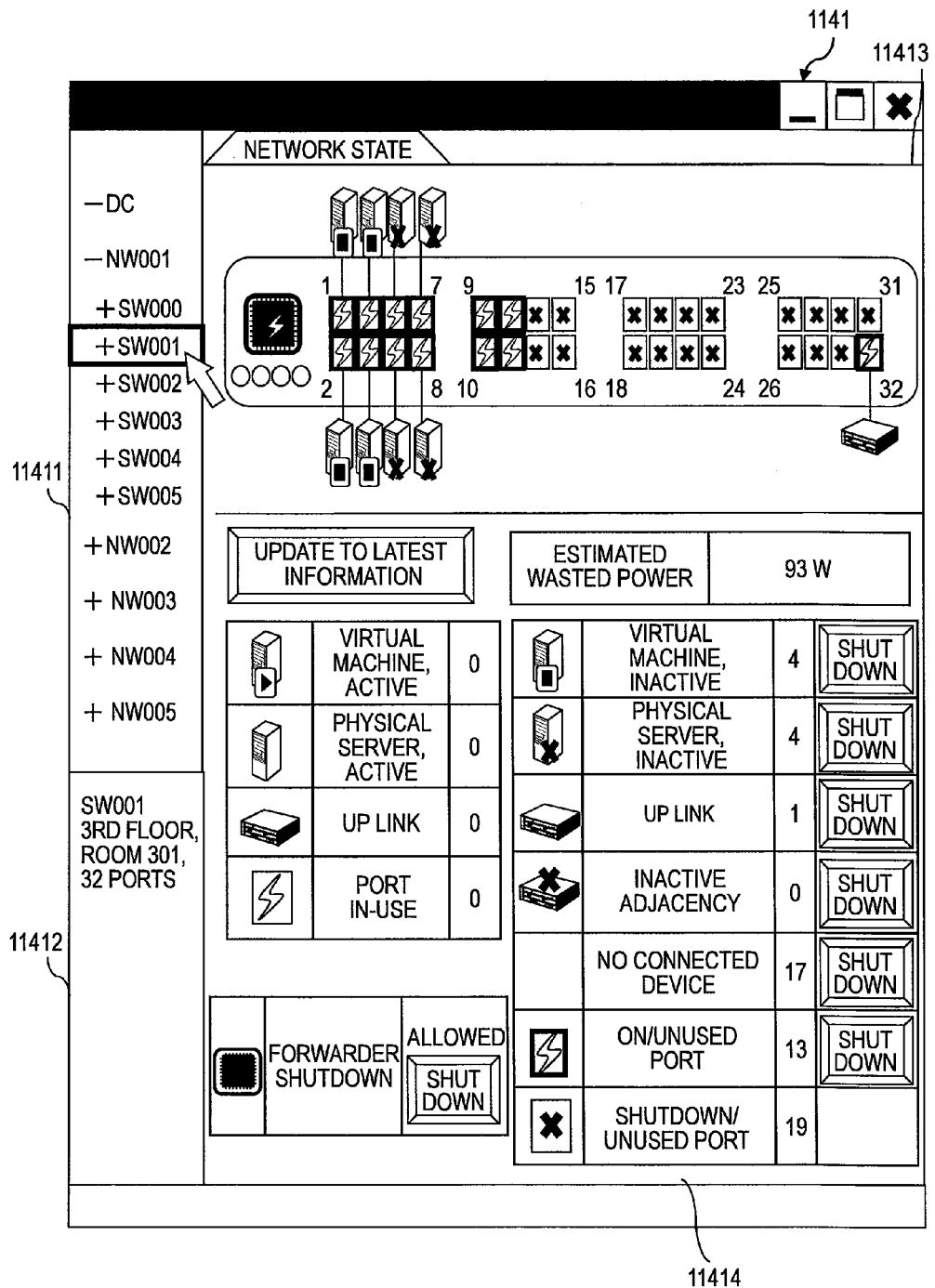
Figure 32:
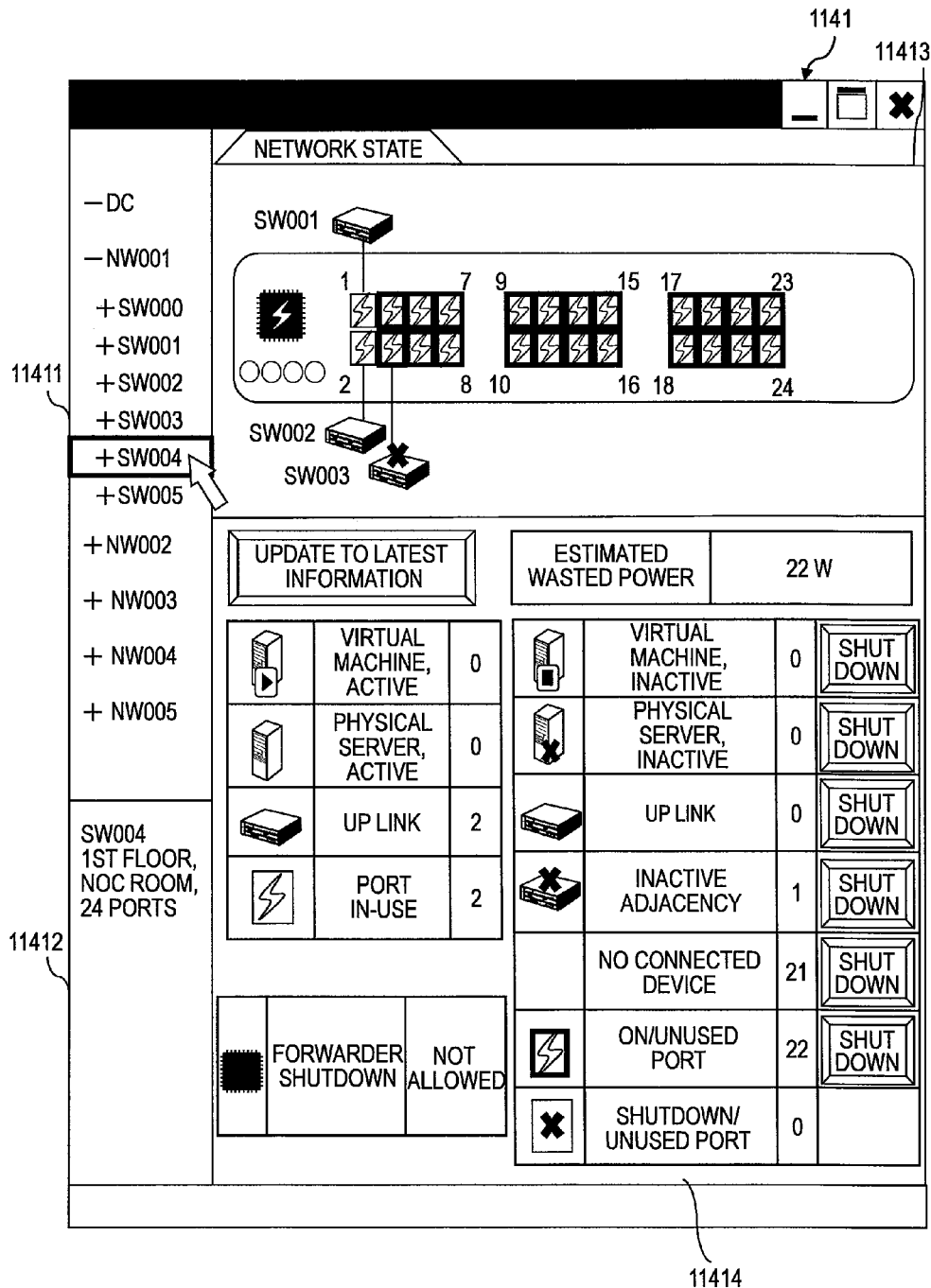
Figure 33:
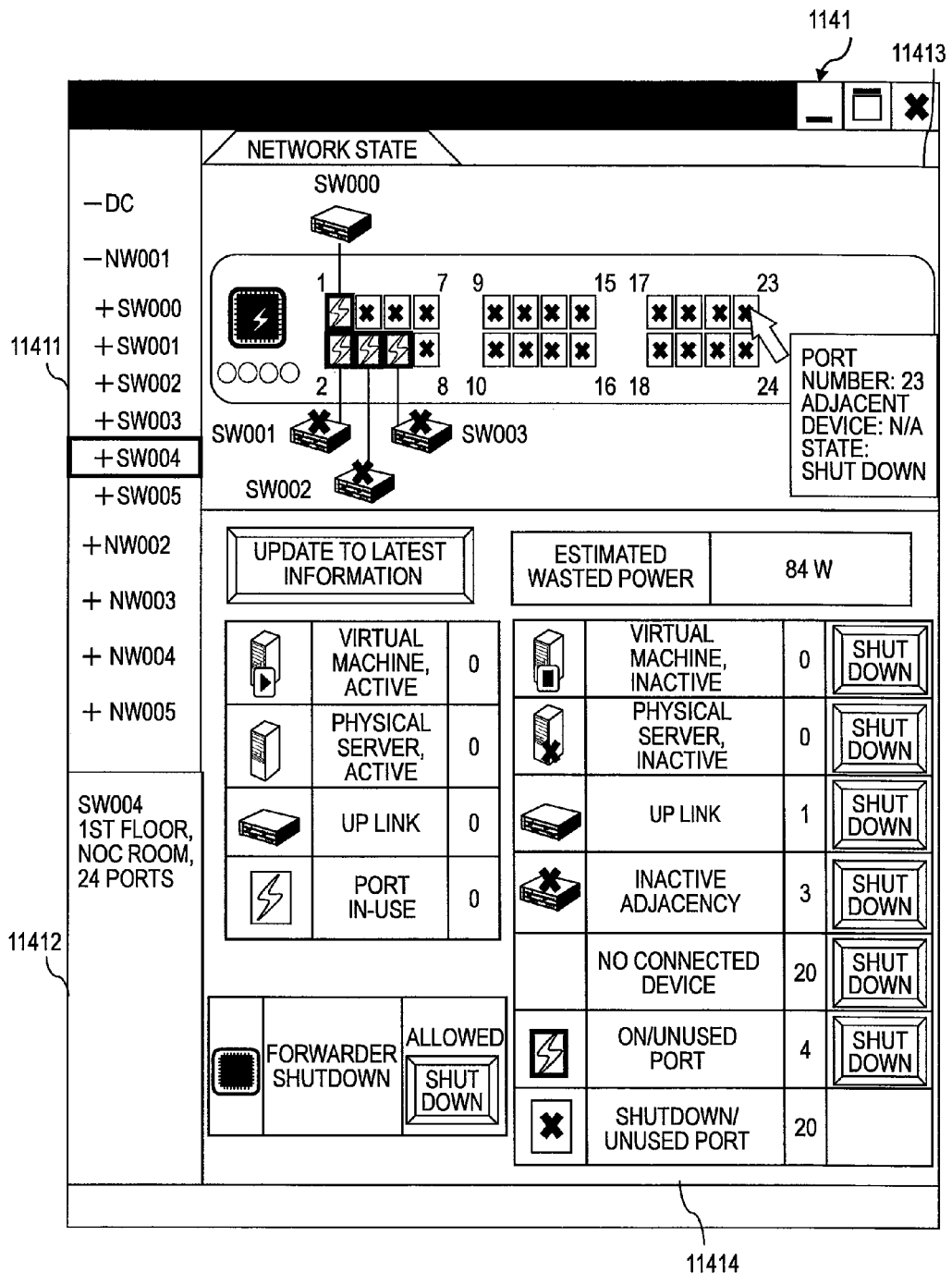

FIGS. 30 and 31 are diagrams illustrating the result display screen 1141 of the switch SW001. FIGS. 32 and 33 are diagrams illustrating the shutdown determination result display screen 1141 of the switch SW004. First described are FIGS. 30 and 31.

In the examples illustrated in FIGS. 30 and 31, the switch SW001 is selected in the selection display section 11411.

In the examples illustrated in FIGS. 30 and 31, the installation place of the switch SW001 and the number of ports provided to the switch SW001 are displayed in the display subject information display section 11412.

In the examples illustrated in FIGS. 30 and 31, the selection results of the shutdown propriety of the forwarder 409 and all the ports that are provided to the switch SW001 are displayed in the icon display section 11413. Specifically, the selection result of the shutdown propriety of the ports, the selection result of the shutdown propriety of the forwarder 409, the devices connected to the port, and the states of the devices are displayed in the form of icons.

The switch 4 and the server 5 (physical server or virtual machine) are displayed as the devices connected to the ports. The states of the servers are the same as those of FIG. 29.

The states of the switches 4 connected to the ports include "up link" and "inactive adjacency".

"Up link" is a state in which the switch 4 is connected directly or indirectly via another switch 4 to the WAN 3 or the server 5 to which a task is allocated. "Inactive adjacency" is a state in which the forwarder 409 of the switch 4 is selected as "shutdown allowed" and the switch 4 is not connected to the server 5 or another switch 4.

Icons corresponding to the respective states are displayed in the icon display section 11413.

In the example illustrated in FIG. 30, it is clear that the ports 1 and 2 are connected to the virtual machines being "virtual machines, active", the ports 3 and 4 are connected to the physical servers being "physical servers, active", the ports 5 and 6 are connected to the virtual machines being "virtual machines, inactive", and the ports 7 and 8 are connected to the physical servers being "physical servers, inactive". Further, it is clear that the port 32 is connected to the switch 4 being "up link".

Further, it is clear that the ports 1 to 4 and 32 are "ports in-use", the ports 5 to 11 are "on/unused ports", and the ports 12 to 31 are "shutdown/unused ports". Further, it is clear that the forwarder 409 is "shutdown not allowed".

In the example illustrated in FIG. 31, it is clear that the ports 1 to 4 are connected to the virtual machines being "virtual machines, inactive" and the ports 5 to 8 are connected to the physical servers being "physical servers, inactive". Further, it is clear that the port 32 is connected to the switch 4 being "up link".

Further, it is clear that the ports 1 to 12 and 32 are "on/unused ports" and the ports 13 to 31 are "shutdown/unused ports". Further, it is clear that the forwarder 409 is "shutdown allowed".

In the examples illustrated in FIGS. 30 and 31, the detailed information on the determination result of the shutdown propriety of the switch SW001 is displayed in the detailed information display section 11414.

Specifically, the boxes indicating the determination results, the icons corresponding to the determination results, and the numbers of switches 4, servers 5, ports, and forwarders 409 corresponding to the respective selection results, the box indicating the estimated wanted power, and a box indicating the result of the shutdown selection of the forwarder 409 are displayed.

In the examples illustrated in FIGS. 30 and 31, the boxes indicating the determination results, the icons corresponding to the determination results, and the numbers of switches 4, servers 5, ports, and forwarders 409 corresponding to the respective selection results include boxes indicating: icons representing the port determined as "shutdown not allowed", the switch 4 in an "up link" state connected to the port "in-use", and the server 5 to which a task is allocated; and the numbers of ports selected as "shutdown not allowed", switches 4 in an "up link" state connected to the port "in-use", and servers 5 to which a task is allocated.

Further, the boxes indicating the determination results, the icons corresponding to the determination results, and the numbers of switches 4, servers 5, ports, and forwarders 409 corresponding to the respective selection results include boxes indicating: icons representing the port selected as "shutdown allowed", the switch 4 in an "up link" state or an "inactive adjacency" state connected to the "on/unused port" or the "shutdown/unused port", and the server 5 to which no task is allocated; and the numbers of ports selected as "shutdown allowed", switches 4 in an "up link" state or an "inactive adjacency" state connected to the "on/unused port" or the "shutdown/unused port", and servers 5 to which no task is allocated.

Further, a button for instructing the shutdown of the power supply is displayed in each of the boxes. When the operator operates the button, the devices corresponding to the respective determination results all have the power supply shutdown.

It should be noted that FIG. 34 is referenced to describe later a case where the power supply to the ports being "on/unused ports" or the forwarders 409 being "unused forwarders" are shutdown individually.

The box indicating the estimated wanted power represents a power consumed in excess by the ports selected as "shutdown allowed", the switches 4, and the servers 5 to which no task is allocated. The calculation method for the estimated wanted power is the same as the calculation method for the estimated wanted power described with reference to FIG. 29.

The box indicating the result of the shutdown selection of the forwarder 409 includes the selection result for the forwarder 409 and an icon indicating the selection result. It should be noted that, if the selection result for the forwarder 409 is "shutdown allowed", the box displays the button for instructing the shutdown of the power supply. When the operator operates the button, the power supply to the forwarder 409 is shut down.

Further, the detailed information display section 11414 displays the button for performing an update to the latest information. When the operator operates the button, information is updated in the respective display sections.

In the example illustrated in FIG. 30, it is clear that the forwarder 409 is selected as "shutdown not allowed" because the switch SW001 is connected to the server 5 to which a task is allocated. Further, it is clear that the estimated wanted power is "7.0 W".

In the example illustrated in FIG. 31, it is clear that the forwarder 409 is selected as "shutdown allowed" because the switch SW001 is not connected to the server 5 to which a task is allocated and that the button for instructing the shutdown of the power supply to the forwarder 409 is displayed. Further, it is clear that the estimated wanted power is "93 W".

Next described are FIGS. 32 and 33.

In the examples illustrated in FIGS. 32 and 33, the switch SW004 is selected in the selection display section 11411.

In the examples illustrated in FIGS. 32 and 33, the installation place of the switch SW004 and the number of ports provided to the switch SW004 are displayed in the display subject information display section 11412.

The icon display section 11413 and the detailed information display section 11414 display the same contents as those of FIGS. 30 and 31.

In the example illustrated in FIG. 32, it is clear that the ports 1 and 2 are connected to the switches 4 being "up link" whose forwarder 409 is selected as "shutdown not allowed" and the port 4 is connected to the switch 4 being "inactive adjacency" whose forwarder 409 is selected as "shutdown allowed".

Further, it is clear that the ports 1 and 2 are "in-use" and the ports 3 to 24 are "on/unused ports".

In the example illustrated in FIG. 33, it is clear that the port 1 is connected to the switch 4 being "up link" and the ports 2, 4, and 6 are connected to the switches 4 being "inactive adjacency".

Further, it is clear that the ports 1, 2, 4, and 6 are "on/unused ports" and the ports 3, 5, and 7 to 24 are "shutdown/unused ports".

Further, when the icon representing the port 23 is operated (for example, clicked on) in the display subject information display section 11412, information related to the port 23 is displayed. In addition, another GUI is activated on the port, and such a display screen as illustrated in FIG. 34 is displayed.

In the example illustrated in FIG. 32, it is clear that the forwarder 409 is selected as "shutdown not allowed" because the switch 4 to which a task is allocated is connected and that the estimated wanted power caused by the on/unused ports is "22 W".

In the example illustrated in FIG. 33, it is clear that the forwarder 409 is selected as "shutdown allowed" because the switch 4 to which a task is allocated is not connected and that the estimated wanted power caused by the on/unused ports and the unused forwarder is "84 W".

FIG. 34 is an explanatory diagram of a GUI for instructing the shutdown of the power supply on a port basis according to the first embodiment of this invention.

The icon representing the port displayed in the icon display section 11413 is operated to thereby execute the power supply control program 115 and display a GUI (hereinafter, referred to as "port-basis shutdown instruction screen") GUI 341 for instructing the shutdown of the power supply on a port basis.

The port-basis shutdown instruction screen 341 displays "shutdown port" for shutting down the power supply to the port, "activate port" for starting the power supply to the port, and "property" for displaying information on the port.

In the example illustrated in FIG. 34, "shutdown port" is selected to display a dialog window 342 that displays detailed information on the port whose power supply is to be shutdown. In addition, the dialog window 342 displays a button for instructing the execution of the shutdown process and a button for aborting the execution of the shutdown process.

The operator uses the port-basis shutdown instruction screen 341 and the dialog window 342 to thereby enable suitable power control on a port basis.

It should be noted that the display method for the shutdown determination result display screen 1141, the port-basis shutdown instruction screen 341, and the dialog window 342 is a mere example, and a display method that allows a description character string, a display color, or another state to be distinguished may be used.

Further, in this embodiment, the operator instructs the shutdown of the power supply to the port or the forwarder 409, but the power-saving network management server 1 may automatically shut down the power supply to the port or the forwarder 409 based on the shutdown selection result.

According to the first embodiment of this invention, at the time of configuration of the network system or at the time of change in the configuration, the power-saving network management server 1 can suitably configure the switches 4 in the network system based on the task allocation with respect to the servers 5 and can display the configuration result to the operator.

Accordingly, the operator can accurately grasp the situations of the data center system and can suitably instruct the power savings of the data center system.

Second Embodiment

Next, a second embodiment of this invention is described. In the second embodiment of this invention, the power-saving network management server 1 starts or shuts down the power supply to the ports and the forwarders 409 of the switches 4 included in the network within the data center system in agreement with consolidation of tasks among a plurality of servers 5.

The configuration of the data center system, the configuration of the power-saving network management server 1, the configuration of the switch 4, and the information stored in the power-saving network management server 1 according to the second embodiment of this invention are the same as those of the first embodiment, and hence descriptions thereof are omitted.

Figure 35:
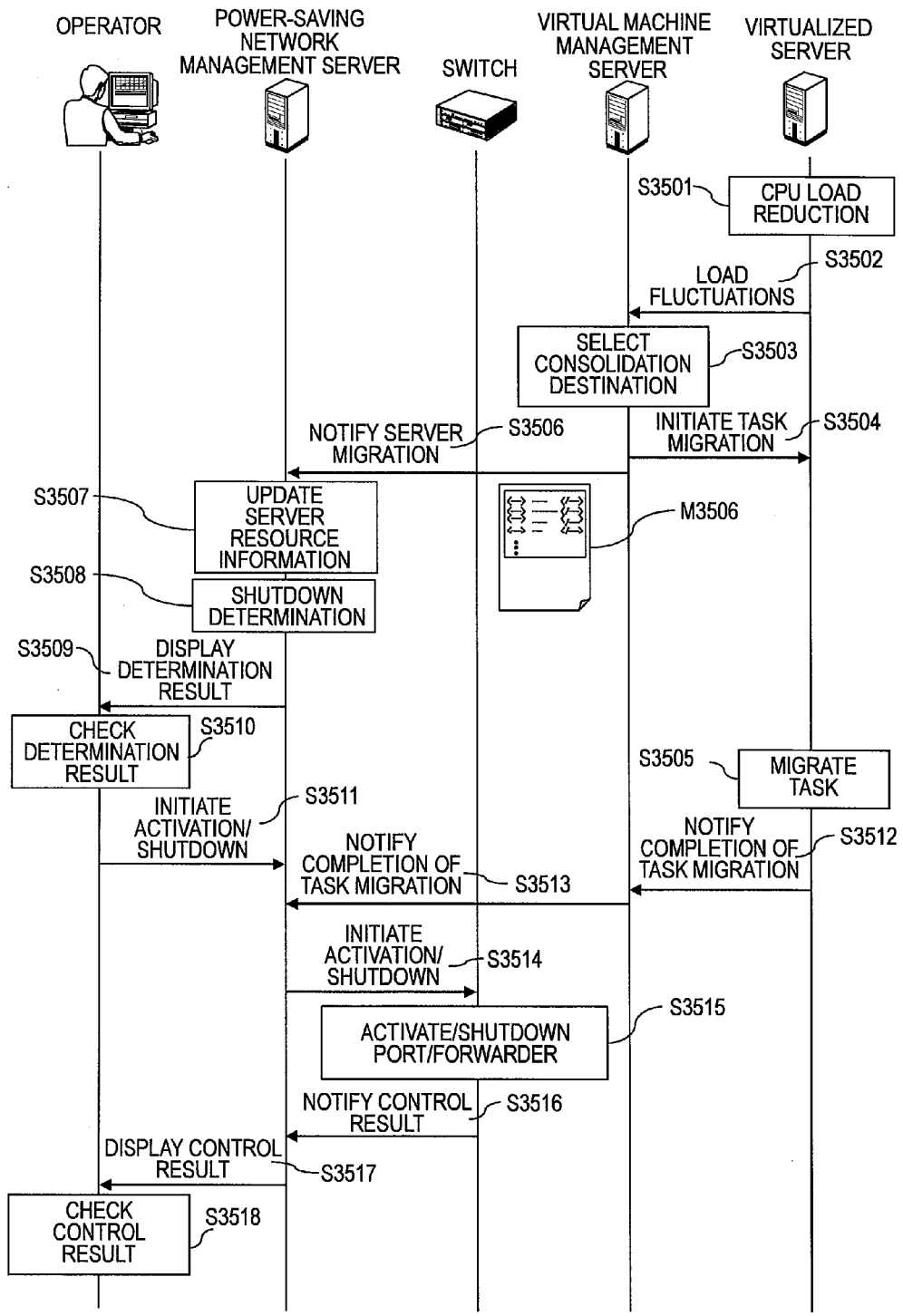
FIG. 35 is a sequence diagram illustrating flows of a shutdown determination process and a power control that are executed by the power-saving network management server according to a second embodiment of this invention.

FIG. 35 is a sequence diagram illustrating flows a shutdown determination process and the power control that are executed by the power-saving network management server 1 according to the second embodiment of this invention.

First, the virtualized server on which a virtual machine is operating detects reduction of a load on the virtualized server (S3501). Specifically, the virtualized server monitors the load on the virtualized server by determining whether or not a CPU load on the virtualized server is equal to or smaller than a preset threshold value.

The virtualized server transmits load fluctuations including information indicating the reduction of the load on the virtualized server to the virtual machine management server 2 (S3502).

The virtual machine management server 2 that has received the load fluctuations selects the server 5 onto which tasks are to be consolidated (S3503), and transmits initiation of migration to migrate the virtual machine, to the selected server 5 (S3504).

The virtualized server that has received the control from the virtual machine management server 2 migrates the tasks to the selected server 5 according to the control (S3505).

Further, the virtual machine management server 2 notifies the power-saving network management server 1 of contents of server migration M3506 including information related to the migration of the tasks (S3506). It should be noted that FIG. 36 is referenced to describe later the contents of server migration M3506.

The power-saving network management server 1 that has received the contents of server migration M3506 updates the server resource information 110 based on the information included in the received contents of server migration M3506 (S3507).

The power-saving network management server 1 determines whether or not the shutdown of the ports and the forwarder 409 of the switch 4 is allowed based on the updated server resource information 110 (S3508).

The power-saving network management server 1 generates the data for displaying the shutdown determination results to the operator, and displays the generated data to the operator as the determination results of the shutdown propriety (S3509).

The screens illustrated in FIGS. 28 to 34 are displayed as the determination results of the shutdown propriety to be displayed.

The operator checks the displayed determination results of the shutdown propriety (S3510), and uses such a GUI as illustrated in FIG. 34 to transmit an initiation of activation/shutdown including contents of the activate or the shutdown of the ports and the forwarder 409 to the power-saving network management server 1 (S3511).

Meanwhile, the server 5 notifies the virtual machine management server 2 of completion of migration including information indicating that the consolidation of tasks has been ended (S3512).

The virtual machine management server 2 that has received the completion of task migration notifies the power-saving network management server 1 of the completion of task migration (S3513).

The power-saving network management server 1 that has received the initiation of activation/shutdown and the completion of task migration, transmits the initiation of activation/shutdown to activate or shut down the power supply to the ports and the forwarder 409 to the respective switches 4 (S3514).

The switch 4 that has received the initiation of activation/shutdown from the power-saving network management server 1 activates or shuts down the power supply to the ports and the forwarder 409 according to the received initiation of activation/shutdown (S3515).

The switch 4 notifies the power-saving network management server 1 of the shutdown result, in order to inform that the power supply to the ports and the forwarder 409 has already been activated or shutdown (S3516).

The power-saving network management server 1 that has received the shutdown result generates data for displaying a control result based on the shutdown result and the completion of task migration, and displays the generated data to the operator as the control result (S3517).

Figure 37:
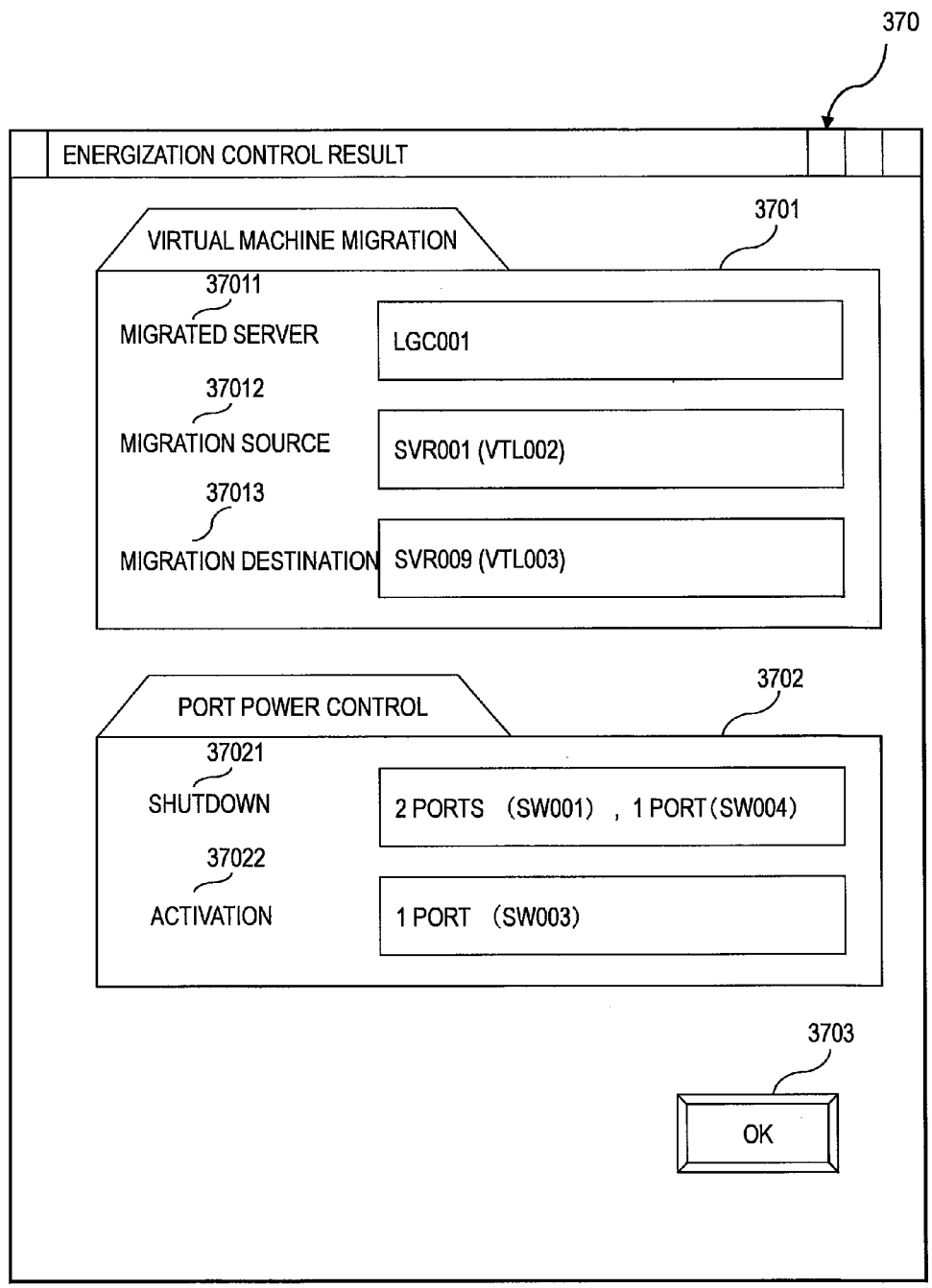
FIG. 37 is an explanatory diagram of an example of an energization control result GUI that displays the control result according to the second embodiment of this invention.

The operator checks the control result via an energization control result GUI 370 (see FIG. 37). FIG. 37 is referenced to describe later the energization control result GUI 370.

FIG. 36 is a diagram illustrating the contents of server migration M3506 according to the second embodiment of this invention.

The contents of server migration M3506 are structured in the form of an XML document, and includes identifiers of the virtualized servers, identifiers of the virtual machines, and identifiers of the logical servers of a migration source of a task and a migration destination of the task.

A <serverChangeNotification> tag included in the contents of server migration M3506 indicates that the contents of server migration M3506 are a message that notifies that a change in the layout of the servers has been completed.

Further, an eventType="move" attribute within the tag indicates that the server layout has been changed by the migration of the servers.

A sender attribute indicates that the virtual machine management server 2 having an identifier MNG002 is the transmission source of the contents of server migration M3506.

A <srcServer> tag and a <dstServer> tag indicate the server 5 of the migration source of the logical server and the server 5 of the migration destination thereof, respectively. The example illustrated in FIG. 36 indicates that the migration source of a logical server LG004 is a virtual machine VTL007 on the virtualized server server SVR003 and that the migration destination of the logical server LG004 is a virtual machine VTL002 on a virtualized server SVR.

FIG. 37 is an explanatory diagram of an example of the energization control result GUI 370 that displays the control result according to the second embodiment of this invention.

The energization control result GUI 370 is realized by executing the shutdown port selection result display program 114.

The energization control result GUI 370 is formed of a dialog window including a virtual machine migration area 3701, a port power control area 3702, and an OK 3703.

The virtual machine migration area 3701 is an area for displaying contents of the task migration. The virtual machine migration area 3701 includes a migrated server 37011, a migration source 37012, and a migration destination 37013.

The migrated server 37011 displays an identifier for uniquely identifying the migrated logical server within the data center system. The migration source 37012 displays an identifier for uniquely identifying the virtualized server of the migration source of the logical server within the data center system. The migration destination 37013 displays an identifier for uniquely identifying the server 5 of the migration destination of the logical server within the data center system.

The port power control area 3702 is an area for displaying the port to which the power supply has been activated or shut down.

The port power control area 3702 includes a shutdown 37021 and an activation 37022.

The shutdown 37021 displays the port to which the power supply has been shut down. The activation 37022 displays the port to which the power supply has been activated.

The OK 3703 is an operation button selected when the operator has checked the displayed control result.

The example illustrated in FIG. 37 indicates the energization control result GUI 370 obtained when the virtual machine VTL002 on the server SVR001 connected to the port 2 of the switch SW001 is migrated to a virtual machine VTL003 on the server SVR003 connected to the port 1 of the switch SW003.

According to the second embodiment of this invention, in agreement with the consolidation of tasks among a plurality of servers 5, the power-saving network management server 1 can suitably configure the switches 4 in the network system and can activate or shut down the power supply to the ports and the forwarders 409 of the necessary switches 4 based on the task allocation with respect to the servers 5.

This can realize the power savings of the data center system.

Third Embodiment

Next, a third embodiment of this invention is described. In the third embodiment of this invention, the power-saving network management server 1 performs control to start or shut down the power supply to the ports and the forwarders 409 of the switches 4 in agreement with startup of the virtual machine.

The configuration of the data center system, the configuration of the power-saving network management server 1, the configuration of the switch 4, and the information stored in the power-saving network management server 1 according to the third embodiment of this invention are the same as those of the first embodiment, and hence descriptions thereof are omitted.

Figure 38:
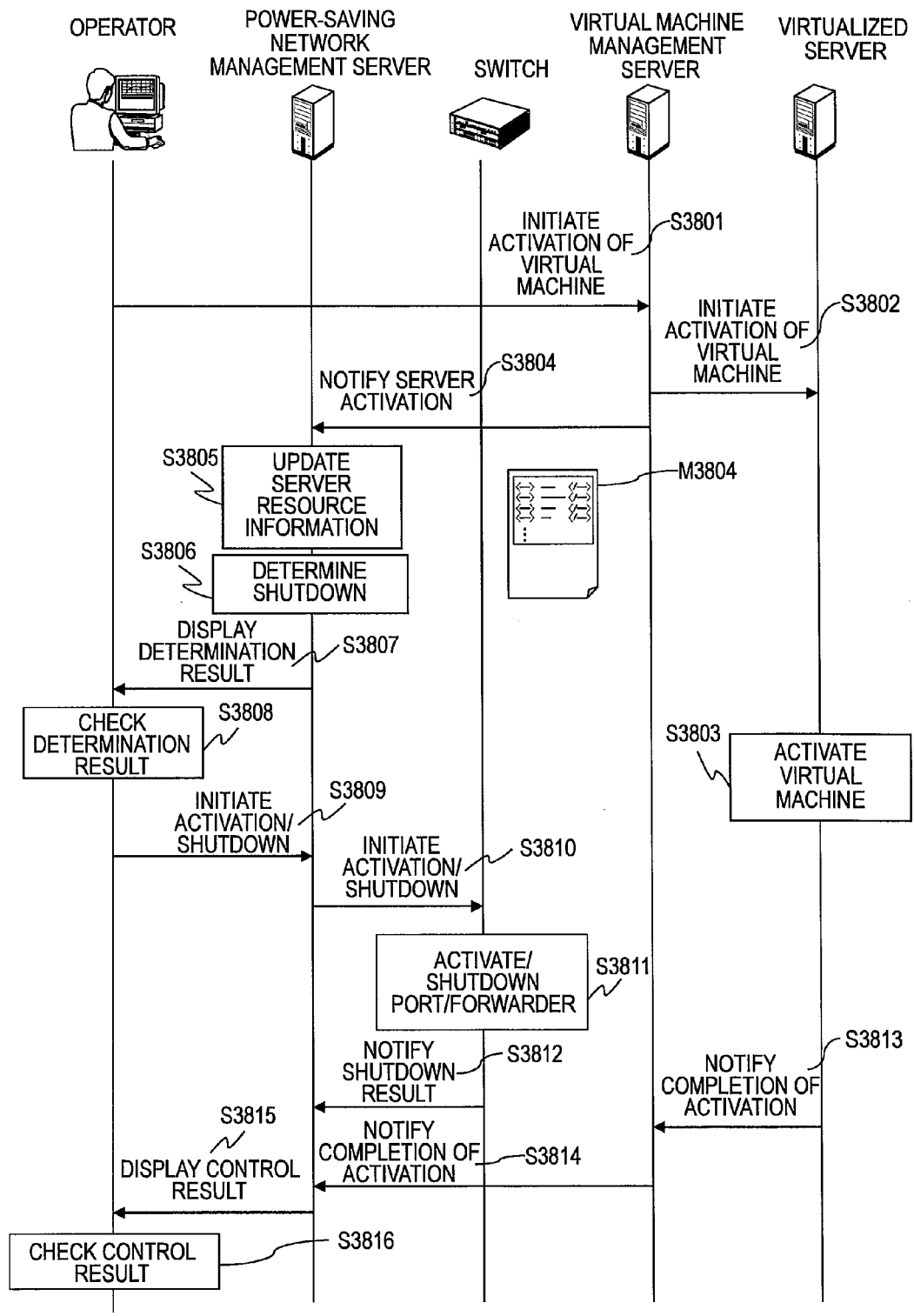
FIG. 38 is a sequence diagram illustrating flows of the shutdown determination process and the power control that are executed by the power-saving network management server according to a third embodiment of this invention.

FIG. 38 is a sequence diagram illustrating flows of a shutdown determination process and the power control that are executed by the power-saving network management server 1 according to the third embodiment of this invention.

First, the operator transmits an initiation of activation to activate the virtual machine based on a service resource request received from the customer to the virtual machine management server 2 (S3801).

The virtual machine management server 2 transmits an initiation of activation to activate the virtual machine to the virtualized server (S3802).

The virtualized server that has received the initiation of activation activates the virtual machine (S3803).

Further, the virtual machine management server 2 notifies the power-saving network management server 1 of the contents of server activation M3804 including information related to the server activation (S3804).

The power-saving network management server 1 that has received the contents of server activation M3804 updates the server resource information 110 based on the received contents of server activation M3804 (S3805).

The power-saving network management server 1 determines whether or not the shutdown of the ports and the forwarder 409 of the switch 4 is allowed based on the updated server resource information 110 (S3806).

The power-saving network management server 1 generates the data for displaying the determination results of the shutdown propriety to the operator, and displays the generated data to the operator as the determination results of the shutdown propriety (S3807).

The screens illustrated in FIGS. 28 to 34 are displayed as the determination results of the shutdown propriety to be displayed.

The operator checks the displayed determination results of the shutdown propriety (S3808), and uses a predetermined GUI to transmit an initiation of activation/shutdown for instructing the activation or the shutdown of the ports and the forwarder 409 to the power-saving network management server (S3809).

The power-saving network management server 1 that has received the initiation of activation/shutdown references the received initiation of activation/shutdown and the connection information 108, compares the current power state of the ports and the forwarder with the power state of the ports after the activation of the virtual machine, and transmits an initiation of activation/shutdown to activate or shut down the ports and the forwarder 409 in which fluctuations have occurred to the switch 4 (S3810).

The switch 4 that has received the initiation of activation/shutdown from the power-saving network management server 1 starts or shuts down the power supply to the ports and the forwarder 409 according to the received initiation of activation/shutdown (S3811).

The switch 4 notifies the power-saving network management server 1 of a notification of control result for informing that the power supply to the ports and the forwarder 409 has already been started or shut down to (S3812).

Further, the virtual machine on the virtualized server notifies the virtual machine management server 2 of completion of activation to the virtual machine management server 2 (S3813).

The virtual machine management server 2 that has received the notification of completion of activation notifies the power-saving network management server 1 of the received notification of completion of activation (S3814).

The power-saving network management server 1 that has received the notification of control result or the notification of completion of activation generates data for displaying the control result, and displays the generated data to the operator as the control result (S3815).

The operator checks the control result via the shutdown determination result display screen 1141 (S3816).

FIG. 39 is a diagram illustrating the contents of server activation M3804 according to the third embodiment of this invention.

The contents of server migration M3804 are structured in the form of an XML document, and includes identifiers of the operational virtualized servers, identifiers of the operational virtual machines, and identifiers of the logical servers.

A<serverChangeNotification> tag included in the contents of server activation M3804 indicates that the contents of server activation M3804 are a message that notifies that a change in the layout of the servers has been completed.

Further, the eventType="allocation" attribute within a tag included in the contents of server activation M3804 indicates that the change in the server layout is caused by new allocation of the logical server.

A sender attribute indicates that the virtual machine management server 2 having an identifier MNG002 is the transmission source of the contents of server activation M3804.

The <logicalServer> tag included in the contents of server activation M3804 indicates the newly-allocated logical server. In the example illustrated in FIG. 39, the allocation destination of a logical server LG013 is the virtual machine VTL003 on the server SVR001.

Figure 40:
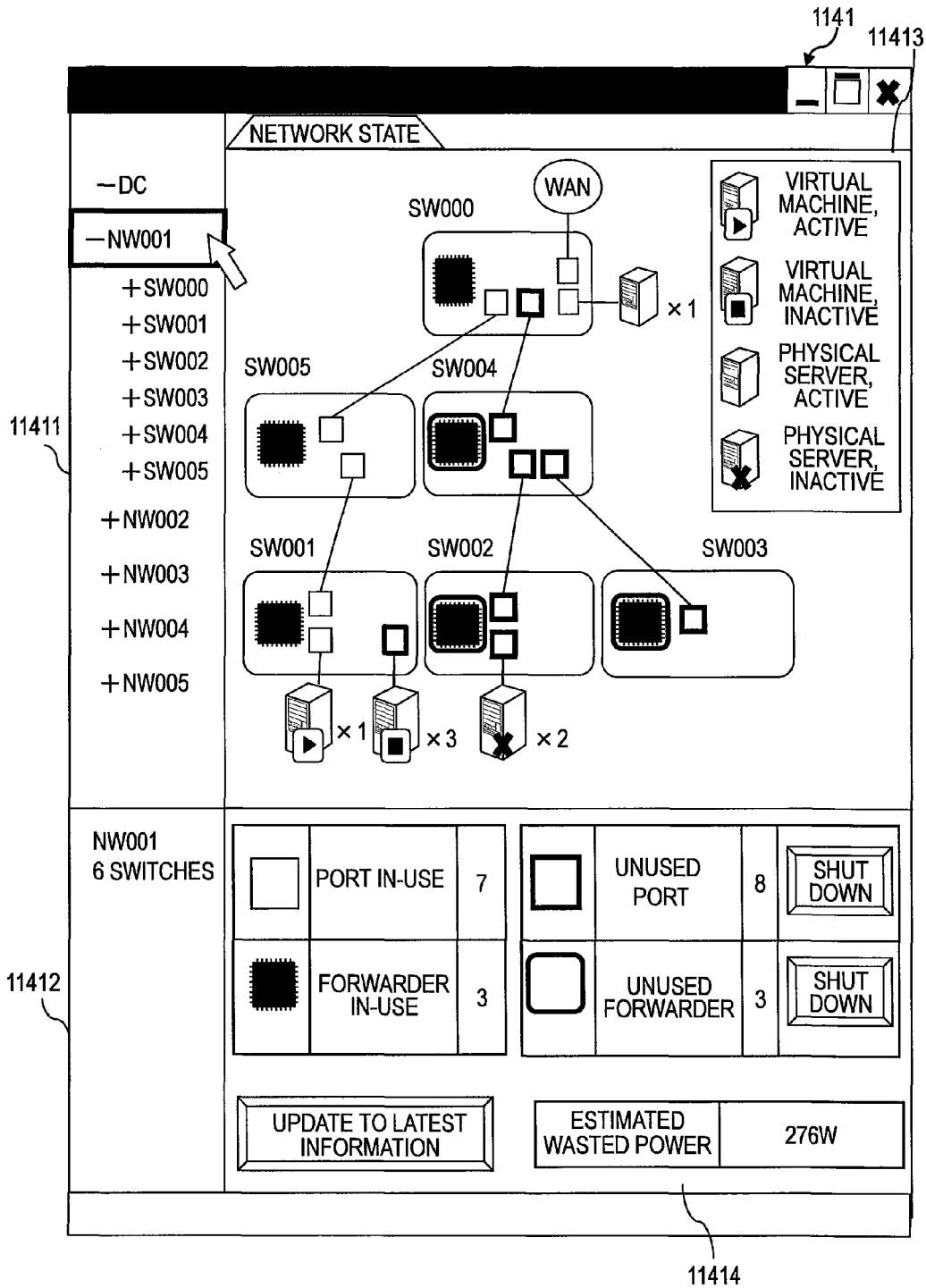
FIG. 40 is an explanatory diagram of an example of the shutdown determination result display screen according to the third embodiment of this invention.

FIG. 40 is an explanatory diagram of an example of the shutdown determination result display screen 1141 according to the third embodiment of this invention.

The shutdown determination result display screen 1141 has the same structure as that of FIG. 29, and hence a description thereof is omitted.

In the example illustrated in FIG. 40, the switch SW002 is connected to the physical server to which no task is allocated, and the switch SW003 is not connected to the server 5.

Further, the switch SW001 is connected to the virtual machine to which a task is allocated and the virtual machine to which no task is allocated.

The switch SW001 is connected to the virtual machine to which a task is allocated, and hence the power supply to the forwarder 409 is started. Further, the power supply to the forwarder 409 of the switch SW005 connected to the switch SW001 is started. Further, the power supply to the port of the switch SW000 connected to the switch SW005 is started.

According to the third embodiment of this invention, for the task allocation with respect to the servers 5, the power-saving network management server 1 can suitably configure the switches 4 in the network system and can start or shut down the power supply to the ports and the forwarders 409 of the necessary switches 4 based on the task allocation with respect to the servers 5.

This can realize the power savings of the data center system.

The invention claimed is:

1. A power-saving network management server, which is coupled to a network system including a plurality of network devices and manages a state of power supply to the plurality of network devices, the network system being coupled to a server, and each of the plurality of network devices having a port,
the power-saving network management server comprising:
a processor; and
a memory coupled to the processor and storing instructions that, when executed by the processor cause the processor to:
store network configuration information for managing a coupling state of the plurality of network devices and the server, and task allocation information for managing allocation of a task to the server;
determine whether a shutdown of a power supply to the port of each of the plurality of network devices is allowed based on the network configuration information and the task allocation information;
generate display information for displaying a determination result as to a shutdown propriety of the power supply to at least one of the ports of the plurality of network devices based on a plurality of port determination results which are a result of the shutdown propriety of the power supply to the port of each of the plurality of network devices;
output the display information;
receive adjacent device information indicating a coupling relationship of coupled network devices and the information related to the allocation of the task to the server;
update the network configuration information and the task allocating information based on the adjacent device information and the information related to the allocation of the task to the task server;

determine starting or stopping of the power supply to the port of each of the plurality of network devices based on the updated network configuration information and the task allocation information; and generate display information for displaying a determination result of the starting or stopping of the power supply to the port of the plurality of network devices based on the port determination results.

2. The power-saving network management server according to claim 1, wherein
the memory further stores instructions that, when executed by the processor cause the processor to:
determine the shutdown of the power supply to a forwarder of each of the plurality of network devices based on the port determination results;
store a determination result of the shutdown propriety of the power supply to the forwarder of each of the plurality of network devices, in the memory as a switch determination result; and
control the power supply to the forwarder of the plurality of network devices based on the switch determination result.

3. The power-saving network management server according to claim 2, wherein the memory further stores instructions that, when executed by the processor cause the processor to:
reference the switch determination result;
extract the plurality of network devices for which the shutdown propriety of the power supply to the forwarder of each of the network devices has not been determined;
select one of the network devices from among the plurality of extracted network devices;
determine whether the shutdown of the power supply to the forwarder of the selected network device is allowed based on the switch determination results regarding other network devices coupled to the selected network device;
store the determination result of the shutdown propriety of the power supply to the forwarder of the selected network device, in the memory as a network determination result; and
control the power supply to the forwarders of the plurality of network devices included in the network system based on the network determination results regarding all the extracted network devices.

4. The power-saving network management server according to claim 3, wherein
each of the network devices has at least one port, and
wherein the memory further stores instructions that, when executed by the processor cause the processor to:
select one of the network devices from among the plurality of extracted network devices in order by placing a higher priority to the network device having a smaller number of ports compared to a coupled network device.

5. The power-saving network management server according to claim 3, wherein
the selected network device includes a plurality of ports to which the network device is coupled,
wherein the memory further stores instructions that, when executed by the processor cause the processor to:
determine, in the determining of the shutdown propriety of the power supply to the forwarder of the selected network device based on the switch determination results regarding the forwarders of the other network devices coupled to the selected network device, that the power supply to the forwarder of the selected network device can be stopped if it is determined that the power supply to the forwarders of all the other network devices coupled to the other ports except one of the other network devices coupled to the port of the selected network device can be shutdown.

6. The power-saving network management server according to claim 3, wherein the memory further stores instructions that, when executed by the processor cause the processor to:
generate determination result display data based on the port determination result, the switch determination result, and the network determination result.

7. The power-saving network management server according to claim 6, wherein the determination result display data includes:
data for displaying the determination result of the shutdown propriety of the power supply to the port and the forwarder of the plurality of network devices;
data for displaying the determination result on a network basis; and
data for displaying power consumption calculated based on the determination result of the shutdown propriety of the power supply to the port and the forwarder of the plurality of network devices.

8. A network system, comprising:
a plurality of network devices, each of the network devices having a port; and
a power-saving network management server that manages a state of power supply to the plurality of network devices, wherein
the network system is coupled to a server and a management server that manages the server,
the power-saving network management server stores network configuration information for managing a coupling state of the plurality of network devices and the server, and task allocation information for managing allocation of a task to the server,
the network device transmits adjacent device information indicating a coupling relationship of coupled network devices to the power-saving network management server,
the management server transmits information related to the allocation of the task to the task server to the power-saving network management server, wherein
the power-saving network management server comprises:
a processor; and
a memory coupled to the processor and storing instructions that, when executed by the processor cause the processor to:
determine whether a shutdown of a power supply to the port of each of the plurality of network devices is allowed based on the network configuration information and the task allocation information;
generate display information for displaying a determination result as to a shutdown propriety of the power supply to at least one of the ports of the plurality of network devices based on a plurality of port determination results which are a result of the shutdown propriety of the power supply to the port of each of the plurality of network devices;
output the display information;
receive adjacent device information indicating a coupling relationship of coupled network devices and the information related to the allocation of the task to the server;
update the network configuration information and the task allocating information based on the adjacent device information and the information related to the allocation of the task to the task server;
determine starting or stopping of the power supply to the port of each of the plurality of network devices based on the updated network configuration information and the task allocation information; and generate display information for displaying a determination result of the starting or stopping of the power supply to the port of the plurality of network devices based on the port determination results.

9. The network system according to claim 8, wherein the memory further stores instructions that, when executed by the processor cause the processor to:

determine the shutdown of the power supply to a forwarder of each of the plurality of network devices based on the port determination result;

store a determination result of the shutdown propriety of the power supply to the forwarder of each of the plurality of network devices, in the memory as a switch determination result; and control the power supply to the forwarder of the plurality of network devices based on the switch determination result.

10. The network system according to claim 9, wherein the memory further stores instructions that, when executed by the processor cause the processor to:

reference the switch determination result;

extract the plurality of network devices for which the shutdown propriety of the power supply to the forwarder of each of the network devices has not been determined;

select one of the network devices from among the plurality of extracted network devices;

determine whether the shutdown of the power supply to the forwarder of the selected network device is allowed based on the switch determination results regarding other network devices coupled to the selected network device;

store the determination result of the shutdown propriety of the power supply to the forwarder of the selected network device, in the memory as a network determination result; and control the power supply to the forwarders of the plurality of network devices included in the network system based on the network determination results regarding all the extracted network devices.

11. The network system according to claim 10, wherein each of the network devices have at least one port, and wherein the memory further stores instructions that, when executed by the processor cause the processor to:

select one of the network devices from among the plurality of extracted network devices in order by placing a higher priority to the network device having a smaller number of ports compared to a coupled network device.

12. The network system according to claim 10, wherein the selected network device includes a plurality of ports to which the network device is coupled, and wherein the memory further stores instructions that, when executed by the processor cause the processor to:

determine, in the determining of the shutdown propriety of the power supply to the forwarder of the selected network device based on the switch determination results regarding the forwarders of the other network devices coupled to the selected network device, that the power supply to the forwarder of the selected network device can be stopped if it is determined that the power supply to the forwarders of all the other network devices coupled to the other ports except one of the other network devices coupled to the port of the selected network device can be shutdown.

13. The network system according to claim 10, wherein the memory further stores instructions that, when executed by the processor cause the processor to:

generate determination result display data based on the port determination result, the switch determination result, and the network determination result.

14. The network system according to claim 13, wherein the determination result display data includes:

data for displaying the determination result of the shutdown propriety of the power supply to the port and the forwarder of the plurality of network devices;

data for displaying the determination result on a network basis; and data for displaying power consumption calculated based on the determination result of the shutdown propriety of the power supply to the port and the forwarder of the plurality of network devices.

15. A power control method for a network system, the network system comprising:

a plurality of network devices, each of the network devices having a port; and a power-saving network management server that manages a state of power supply to the plurality of network devices, the network system being coupled to a server and a management server that manages the server, the power control method comprising:

storing, in the power-saving network management server, network configuration information for managing a coupling state of the plurality of network devices and the server and task allocation information for managing allocation of a task to the task server;

transmitting, by the network devices, adjacent device information indicating a coupling relationship of coupled network devices to the power-saving network management server;

transmitting, by the management server, information related to the allocation of the task to the task server to the power-saving network management server;

determining, by the power-saving network management server, whether a shutdown of a power supply to the port of each of the plurality of network devices is allowed based on the network configuration information and the task allocation information;

generating display information for displaying a determination result as to a shutdown propriety of the power supply to at least one of the ports of the plurality of network devices based on the plurality of port determination results which are a result of the shutdown propriety of the power supply to the port of each of the plurality of network devices;

outputting the display information;

receiving adjacent device information indicating a coupling relationship of coupled network devices and the information related to the allocation of the task to the server;

updating the network configuration information and the task allocating information based on the adjacent device information and the information related to the allocation of the task to the task server;

determining starting or stopping of the power supply to the port of each of the plurality of network devices based on the updated network configuration information and the task allocation information; and generating display information for displaying a determination result of the starting or stopping of the power supply to the port of the plurality of network devices based on the port determination result.

16. The power-saving network management server according to claim 1,
wherein the memory further stores instructions that, when executed by the processor cause the processor to:
control the power supply to the port of the plurality of network devices based on the port determination result.

17. The power-saving network management server according to claim 1,
wherein at least one of the network devices is coupled to the server via the port thereof,
wherein the memory further stores instructions that, when executed by the processor cause the processor to:
determine whether at least one of the ports of the network devices is coupled to the server based on the updated network configuration information;
determine whether the server is allocated to a predetermined task based on the updated task allocation information, in a case where the at least one of the ports of the network devices is coupled to the server;
shut down the power supply to the port which is coupled to the server, in a case where the server is not allocated to the predetermined task.

* * * * *